(«12») United States Patent
Rodriguez et al.

(10) Patent No.: US 12,032,977 B2
(45) Date of Patent: Jul. 9, 2024

(54) CONTAINER-FIRST ARCHITECTURE

(71) Applicant: Intel Corporation, Santa Clara, CA (US)

(72) Inventors: Bryan J. Rodriguez, Gilbert, AZ (US); Kshitij A. Doshi, Tempe, AZ (US); Ned M. Smith, Beaverton, OR (US); Michael G. Millsap, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 17/440,701

(22) PCT Filed: May 11, 2020

(86) PCT No.: PCT/US2020/032403
§ 371 (c)(1),
(2) Date: Sep. 17, 2021

(87) PCT Pub. No.: WO2020/231952
PCT Pub. Date: Nov. 19, 2020

(65) Prior Publication Data
US 2022/0171648 A1    Jun. 2, 2022

Related U.S. Application Data

(60) Provisional application No. 62/846,419, filed on May 10, 2019.

(51) Int. Cl.
*G06F 9/455* (2018.01)
*G06F 9/50* (2006.01)

(52) U.S. Cl.
CPC .......... *G06F 9/455* (2013.01); *G06F 9/45533* (2013.01); *G06F 9/45558* (2013.01);
(Continued)

(58) Field of Classification Search
None
See application file for complete search history.

(56) References Cited

U.S. PATENT DOCUMENTS 9,223,966 B1 * 12/2015 Satish ................ G06F 9/45558
10,719,369 B1 * 7/2020 Aithal ................ H04L 63/0263
(Continued)

FOREIGN PATENT DOCUMENTS

WO    WO-2018005500 A1 *  1/2018  ............. G06F 9/485

OTHER PUBLICATIONS

Randazzo et al., "Kata Containers: An Emerging Architecture for Enabling MEC Services in Fast and Secure Way", IEEE, May 2019. (Year: 2019).*

(Continued)

*Primary Examiner* — Qing Yuan Wu
(74) *Attorney, Agent, or Firm* — Alliance IP, LLC

(57) ABSTRACT

In one embodiment, a computing device comprises memory circuitry and processing circuitry. The memory circuitry is to store a plurality of container images, comprising: a first container image comprising a first set of applications; and a second container image comprising a virtual machine, a guest operating system, and a second set of applications. The processing circuitry is to: instantiate a plurality of containers on a host operating system, wherein the plurality of containers comprises a first container and a second container; execute the first set of applications in the first container, wherein the first set of applications is to be executed on the host operating system; and execute the virtual machine in the second container, wherein the guest operating system is to be executed on the virtual machine and the second set of applications is to be executed on the guest operating system.

25 Claims, 22 Drawing Sheets

(52) U.S. Cl.
CPC .. *G06F 9/5077* (2013.01); *G06F 2009/45562* (2013.01); *G06F 2009/45583* (2013.01)

(56) References Cited

U.S. PATENT DOCUMENTS

| | | | |
|---|---|---|---|
| 2017/0344292 A1* | 11/2017 | Sterin | G06F 3/0605 |
| 2017/0371703 A1* | 12/2017 | Wagner | G06F 9/485 |
| 2017/0371706 A1* | 12/2017 | Wagner | G06F 9/485 |
| 2018/0285139 A1 | 10/2018 | Shapira et al. | |
| 2018/0314846 A1 | 11/2018 | Schultz et al. | |
| 2018/0357086 A1 | 12/2018 | Kinsella et al. | |
| 2019/0042320 A1 | 2/2019 | Prince et al. | |
| 2019/0108064 A1 | 4/2019 | Stafford et al. | |
| 2020/0304526 A1* | 9/2020 | Abraham | G06F 21/577 |

OTHER PUBLICATIONS

PCT International Preliminary Report on Patentability issued in International Patent Application No. PCT/US2020/032403, dated Nov. 25, 2021; 7 pages.
PCT International Search Report and Written Opinion issued in International Patent Application No. PCT/ US2020/032403, dated Aug. 24, 2020.

\* cited by examiner

CONTAINER-FIRST ARCHITECTURE

CROSS-REFERENCE TO RELATED APPLICATIONS

This Application is a national stage application under 35 U.S.C. § 371 of PCT International Application Serial No. PCT/US2020/032403, filed on May 11, 2020 and entitled CONTAINER-FIRST ARCHITECTURE, which application claims the benefit of the filing date of U.S. Provisional Patent Application Ser. No. 62/846,419, filed on May 10, 2019, and entitled CONTAINER-FIRST VIRTUALIZATION ARCHITECTURE. The disclosures of the prior applications are considered part of and are hereby incorporated by reference in their entirety in the disclosure of this application.

FIELD OF THE SPECIFICATION

This disclosure relates in general to the field of computing systems, and more particularly, though not exclusively, to a container-first architecture for software applications.

BACKGROUND

Virtual machines (VMs) and containers can be used to provide virtualized environments for running software applications. When used together, virtual machines and containers are typically used in a "hypervisor-first" virtualization architecture where containers are deployed on VMs rather than directly on the host physical machine. For example, in a hypervisor-first virtualization architecture, all software applications run on VMs, either directly on the corresponding guest OS of a VM or inside a container on the guest OS of the VM.

This hypervisor-first virtualization architecture has various downsides. For example, this approach relies heavily on VMs, as every application runs on a VM rather than directly on the host physical machine, and separate VMs are typically launched for different applications and/or tenants, even if those applications are designed to run on the same operating system. As a result of this heavy reliance on VMs, a hypervisor-first virtualization architecture often consumes significant resources, requires duplicative instances of the same guest OS to be maintained across multiple VMs, and precludes applications from executing directly on the host physical machine. A hypervisor-first virtualization architecture also requires additional complexity relating to manageability. For example, not only do the containers on each VM need to be managed, but each VM on the host physical machine also needs to be managed. Other drawbacks of a hypervisor-first approach include: (a) memory fragmentation; (b) multiple independent resource schedulers leads to enduring utilization imbalances; (c) shared memory based transports become problematic; (d) OS licenses are more expensive to multiple OS instances; (e) debugging has to include considerations of virtualization errata; (f) FaaS cold launch overheads mount, as new VMs have to be spun up in lieu of FaaS containers; and (g) it is difficult to track down timing and synchronization related performance anomalies across chains of microservices and/or functions.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
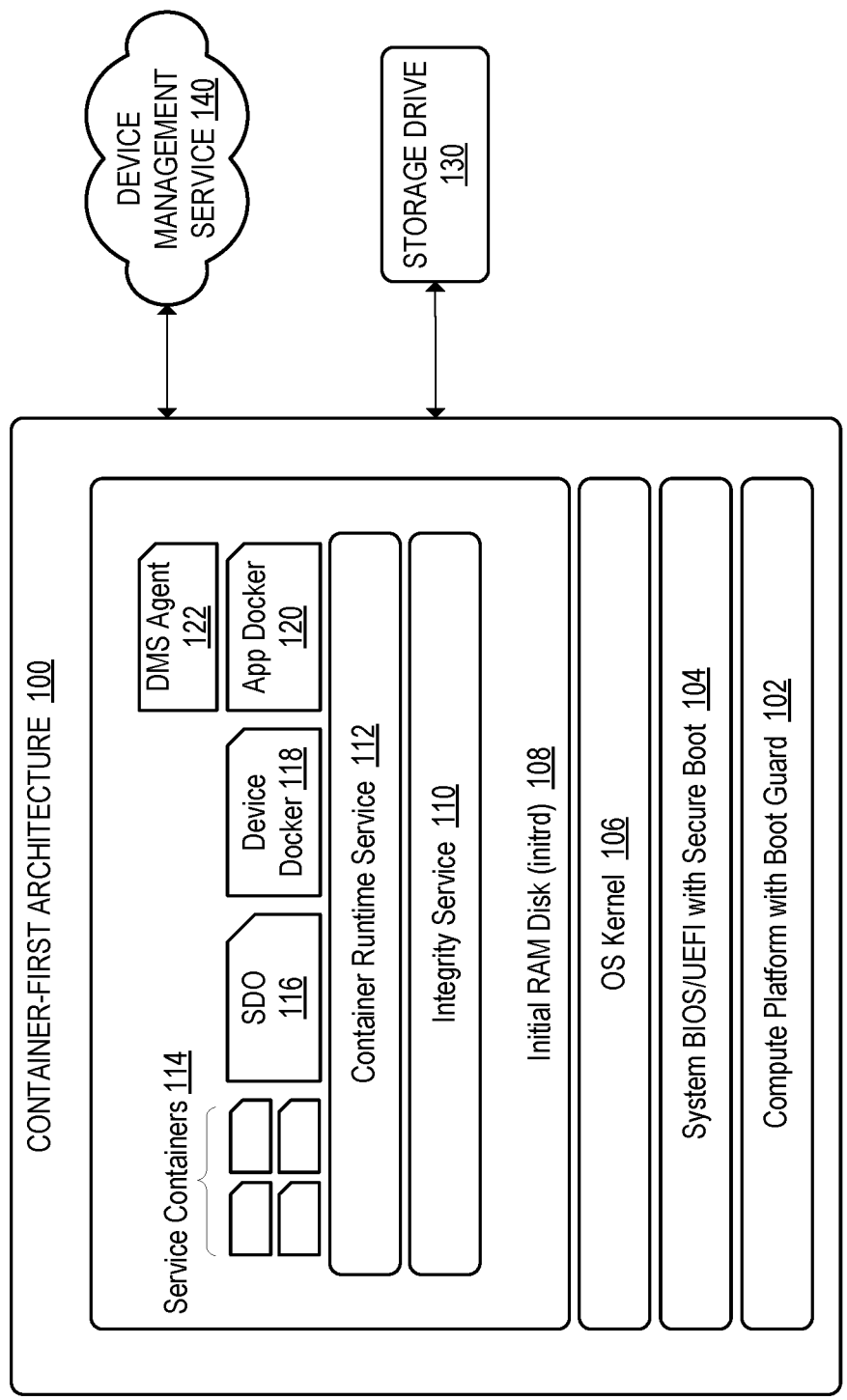
FIG. 1 illustrates an example embodiment of a container-first architecture.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Container-First Architecture

Current Linux operating system distributors (e.g., Ubuntu, RedHat) provide comfort in validating that their version of the Linux kernel works with the open source utilities and libraries included in each of their releases. The base operating system in these models is relatively large for edge deployments, and consequently, this results in a large attack surface.

Fundamentally, a Linux operating system is made up of the Linux kernel, an initial RAM disk, and a filesystem on the hard drive. To run processes on the Linux Kernel, the kernel needs a way to "init" the system, or bootstrap the user space and manage user processes. Until recently, Unix System V (SysV) (originally released in 1983 by AT&T) was commonly used to handle the "init" or bootstrapping of the Linux operating system. Within the past few years, however, most Linux distributions have transitioned to "SystemD" to perform the "init" process.

When a Linux operating system boots, the bootloader loads the Linux Kernel (vmlinz) and the initial RAM disk (initrd) into memory. After the kernel initializes, initrd provides the bare minimum drivers to "init" the system, which provides access to the larger hard drive on the system. Once the "root" partition is mounted, the "init" process pivots to the hard drive filesystem and executes SystemD to begin bootstrapping all the startup processes. The files on the filesystem are software libraries and binaries to support the running processes and user utilities and binaries to manage the system.

From a container perspective, this can be viewed as one massive root privileged namespace, where all the resources and process IDs are contained in one large bubble. The number of attack surfaces is much larger, and once logged in as root, there are plenty of utilities and information that can be leveraged to discover a security hole. In addition, manageability and orchestration can be very challenging due to the sheer number of files that need to be maintained, have their integrity validated, and so forth.

Accordingly, this disclosure presents various embodiments of a "container-first" architecture that addresses the shortcomings described above.

FIG. 1 illustrates an example embodiment of a container-first architecture 100. In the illustrated embodiment, the container-first architecture 100 includes a compute platform 102 (e.g., an Intel Architecture (IA) compute platform), a system BIOS 104, an operating system (OS) kernel 106 (e.g., a Linux kernel from any distribution), and an immutable initial RAM disk (initrd) 108 with a container runtime service 112 for bootstrapping the OS 106. In some embodiments, the Linux kernel 106 and the immutable initial RAM disk 108 can be packaged with a very small storage footprint (e.g., roughly 250 MB).

As described further below, the container runtime service 112 provides a service for bootstrapping the OS 106 on top of a container runtime. In some embodiments, for example, the container runtime service 112 may be implemented on top of the container runtime provided by ContainerD. ContainerD is a container runtime that manages the complete container lifecycle of its host system, from image transfer and storage to container execution and supervision to low-level storage to network attachments and beyond. In other embodiments, however, the container runtime service 112 may be implemented using other types of container runtime environments.

In the illustrated embodiment, after the Linux kernel 106 boots, instead of pivoting to SystemD to perform the typical "init" process, the container-first architecture 100 pivots to the container runtime service 112 (e.g., ContainerD) as the process used to bootstrap the user space. All processes that are initialized have their own namespace and are containerized, including ntpd (Network Time Protocol daemon), crontab, dhcpd (Dynamic Host Configuration Protocol daemon), user login, terminal, and so forth. The only files persisted on a storage drive 130 are the Docker databases (/var/lib/dev-docker and /var/lib/app-docker) and the system hostname and other miscellaneous files (/etc).

Before the container runtime 112 (e.g., ContainerD) "inits" or bootstraps the operating system, an integrity service 110 verifies the integrity of the filesystem. As its first task, the integrity service 110 unlocks the encrypted filesystem on the storage drive 130 using a key pulled from a trusted platform module (TPM) on the compute platform 102 or a derived aggregate hash of the memory serial number, drive serial number, motherboard serial and PCI tree (e.g., such as a DICE root of trust). After the storage drive 130 is mounted, the integrity service 110 verifies the integrity of containers, files, and optionally partitions based on a "hash" manifest that was generated during manufacturing and system updates. Once integrity is verified with success, the integrity service 110 executes the container runtime service 112 (e.g., ContainerD) to bootstrap the system.

At first boot of the compute platform 102, various service containers 114 are processed once in privileged mode. The service containers 114 may include containerized versions of various common operating system services, such as sysfs, sysctl, dhcpd, wpa, ntpd, and/or modprobe, among other examples.

The secure device onboarding (SDO) service 116 and the device docker service 118 run as privileged processes. The final process—the application docker 120 service—is executed in a non-privileged container. All of these containers are inside the initial RAM disk 108 and are used to help bootstrap the system.

The device docker 118 is the only service that can manage the EFI System Partition (ESP) on the storage drive 130. No container service is able to "bind" the physical host partition regardless of their privilege. The device docker 118 only executes approved system update containers and is a conduit for privileged device access from the application docker service 120. The application docker service 120 does not have privileged access, but certain devices (e.g., /dev/kvm or/dev/acrn) are passed in to allow containers to execute with virtual machines (VMs) inside of them. In this manner, because the "host" filesystem is never exposed through the container runtime 112 and each Docker service has its own namespace inside the container runtime 112 namespace, even if an attacker succeeds in performing a container breakout, the breakout is limited to an isolated sub-namespace.

The purpose of the application docker service 120 is to run non-privileged containers, which are managed by a device management service (DMS) agent 122. Through a device management service (DMS) 140 in a centrally managed location, an operator can facilitate the delivery of OCI compliant containers to manage and orchestrate down to the platform. In addition, the application docker service 120 is responsible for joining the container orchestrator to other base platforms.

The secure device onboarding (SDO) service 116 facilities verification of the authenticity of the runtime operating system with the underlying physical hardware (e.g., confirming the integrity through Intel Architecture hardware identity), and provides the onboarding token to allow the DMS agent 122 to connect to the DMS 140 in a central location and in a secure manner. Verification involves proving that the integrity and origin of the container software, firmware, and hardware that hosts the container is authentic as produced by its various manufactures. The verifier acts on behalf of the tenant or an agent of the tenant who supplies/provisions tenant-specific content, such as a workload, tenant keys, tenant policies, and tenant configuration data. Onboarding results in the combining of the pre-onboarded container (e.g., software, firmware, hardware, container attestation keys) and post-onboarded container (e.g., workload, data protection and tenant identity keys, tenant data). This combining of pre-onboarded and post-onboarded context can be referred to as "attestation swizzling." The resultant "swizzled" attestation image attests to both the pre-onboarded and post-onboarded container.

From this point, an edge operator can orchestrate and manage any OCI-compliant container built from any Linux distribution and execute it on the container-first architecture 100. Since no "shell" (e.g., an application that enables a user to execute commands, typically for administration purposes) is included by default, the edge operator can send down a shell container from their favorite Linux distributor and perform any of the desired functions (e.g., debugging and/or other administrative tasks). If there is any sense of malicious activity, the container can be stopped and revoked.

This "container-first" architecture 100 provides complete abstraction from the Linux kernel 106 and the file system distribution, which provides numerous advantages. For example, this architecture gives an operator the flexibility to run any container from any Linux distributor on this platform. Moreover, since the operating system files are slim and simple, this architecture simplifies manageability and orchestration and minimizes the attack surface. Further, since everything running on the platform is containerized, these objects can be hashed and inventoried during runtime to verify their validity before execution, thus further improving security. Finally, as described further below, this architecture allows virtual machines to be deployed within containers, thus leveraging the benefits of both containers and virtual machines in some cases.

Figure 22:
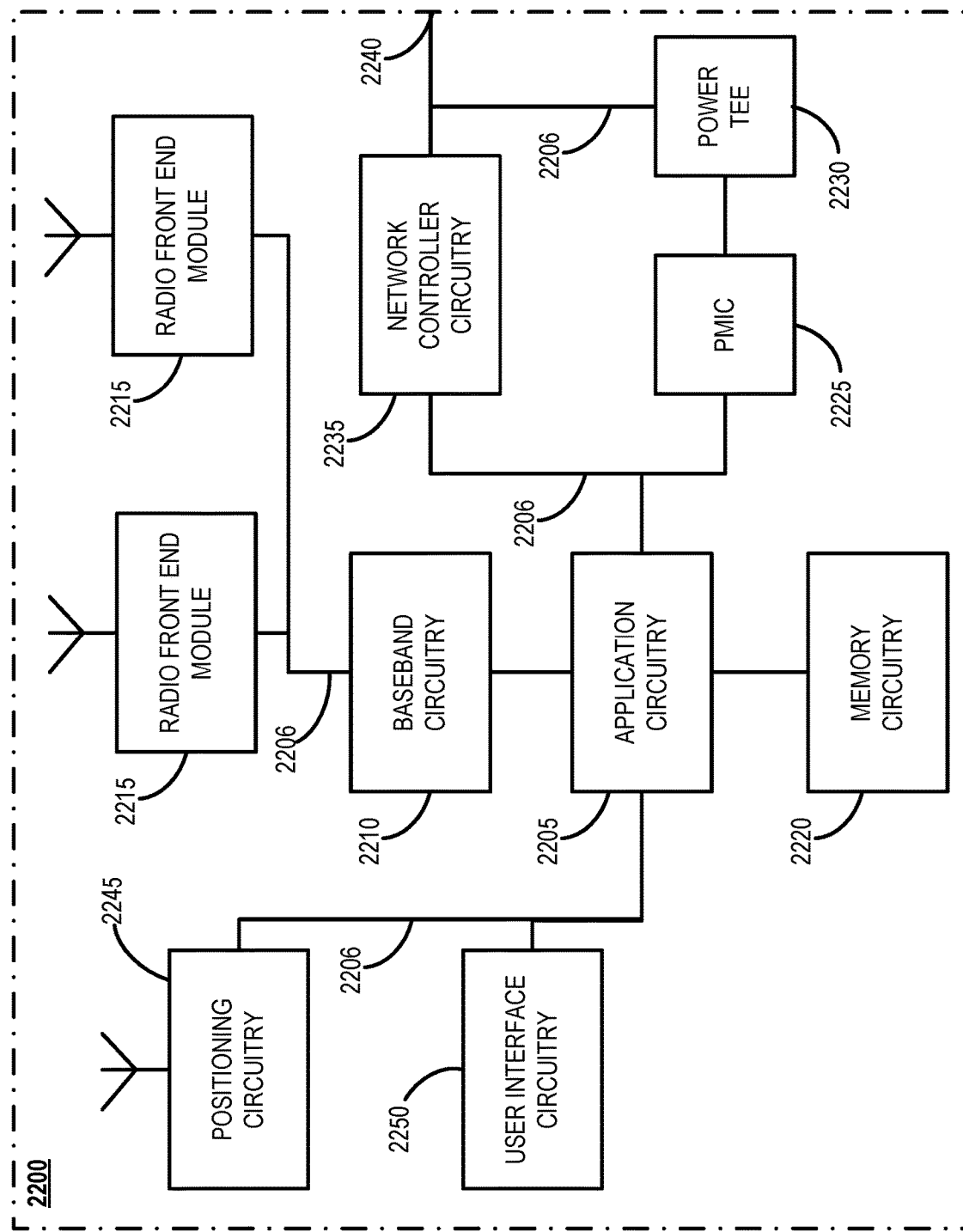
FIG. 22 illustrates an example of infrastructure equipment in accordance with various embodiments.
Figure 23:
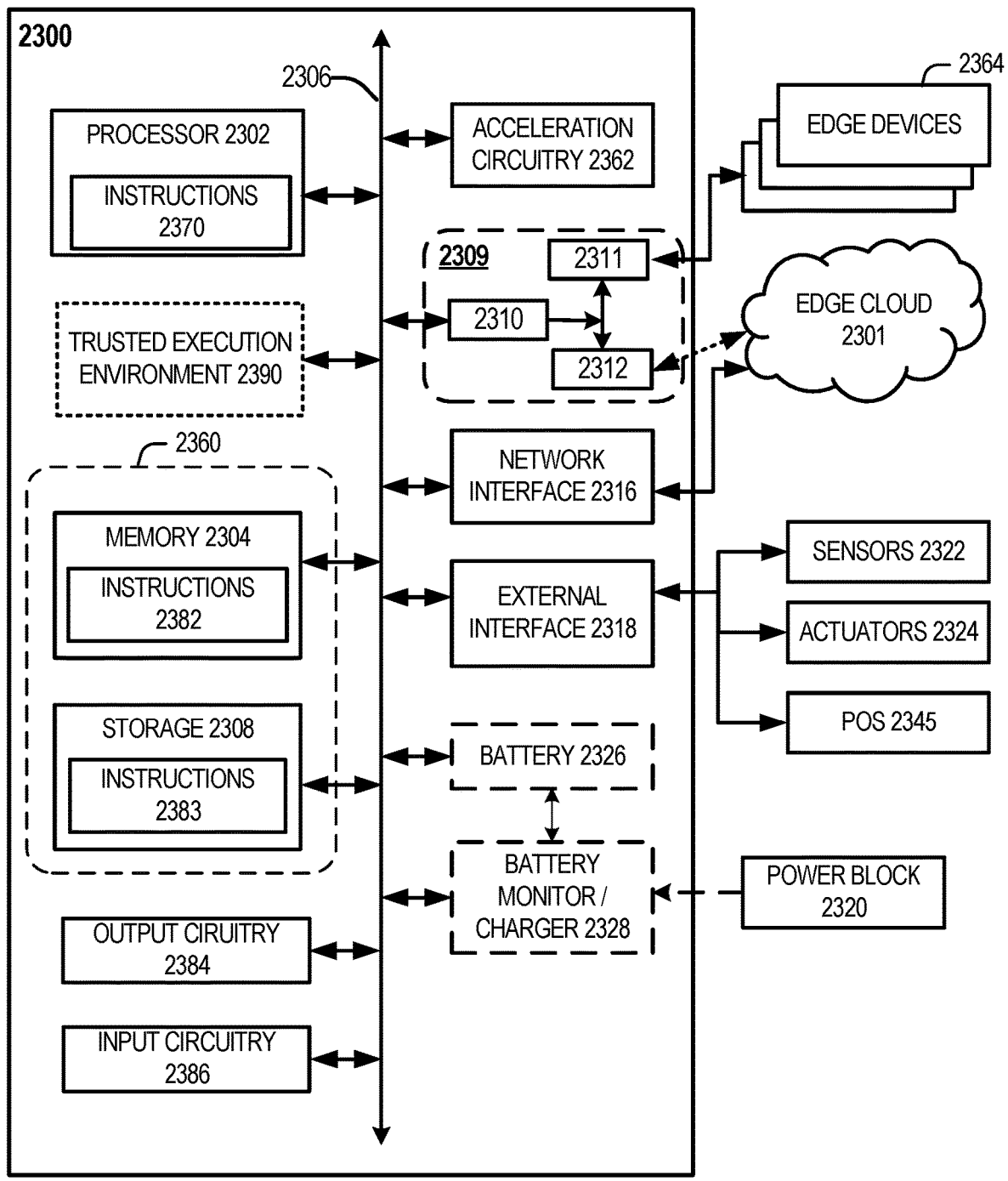
FIG. 23 illustrates an example embodiment of a computing platform.

In various embodiments, container-first architecture 100 may be implemented using any of the computing devices, platforms, systems, architectures, and/or environments presented throughout this disclosure, such as the edge, fog, and cloud computing environments of FIGS. 12-16, the infrastructure equipment of FIG. 22, and/or the computing platform of FIG. 23, among other examples.

Virtualization on a Container-First Architecture

Virtual machines (VMs) and containers can be leveraged to run software applications out-of-the-box on any computing infrastructure while also providing isolation, such as on heterogeneous computing infrastructure deployed in the cloud, at the edge, and/or in the "fog" (e.g., anywhere from the edge to the cloud). In particular, virtual machines provide virtualization of the underlying "bare-metal" computing hardware (e.g., hardware-level virtualization), while containers provide virtualization of the operating system (OS) (e.g., OS-level virtualization).

For example, with respect to virtual machines, the underlying computing hardware or physical machine typically executes a hypervisor or virtual machine manager (VMM)—either standalone or on top of a host OS—which creates and manages virtual machines, and each virtual machine executes its own guest OS that runs one or more software application(s). Thus, while the hypervisor is executed directly on the physical machine, the software applications are executed indirectly on the respective virtual machines, thus abstracting the software applications from the underlying physical machine. In this manner, multiple software applications associated with different operating systems and/or tenants can run in different virtual machines, while remaining isolated from each other.

Containers, on the other hand, run software applications within isolated runtime environments while sharing the same OS kernel. For example, each container is an isolated user-space instance that can be used to run one or more software applications, and multiple containers for different software applications can be instantiated on the same OS kernel. In this manner, software applications in different containers can share the same OS kernel while remaining isolated from each other. Moreover, each container is typically instantiated from a corresponding image that bundles a particular software application with all of its dependencies (e.g., application(s), tools, libraries, configuration files, and so forth), thus ensuring that the software application runs out-of-the-box on any machine running the appropriate operating system.

Because containers can share the same host OS, they avoid certain inefficiencies of virtual machines, which each run their own guest OS on top of the host OS. For example, unlike virtual machines, containers can share the same host OS kernel without being hypervised or abstracted from the underlying physical machine, thus allowing software applications running inside the containers to execute directly on the physical machine. Thus, containers are faster and more lightweight than virtual machines, but they still provide the appearance of full virtualization.

However, because containers share the same OS kernel, they can only run software applications designed for the same type of operating system. As a result, containers lack the flexibility of virtual machines to run multiple software applications designed for different operating systems.

Moreover, while containers do provide isolation (e.g., via Linux namespaces and/or control groups (cgroups)), they do not provide the same level of isolation as virtual machines. For example, because containers share the same OS kernel, all containers are impacted if any one container causes the OS to crash (e.g., due to a bug or a malicious attack), while for VMs, only the problematic VM will crash. Thus, the security attack vector is larger for containers than VMs (e.g., a fork bomb can crash an entire system when using containers but only a single VM when using VMs).

Figure 3:
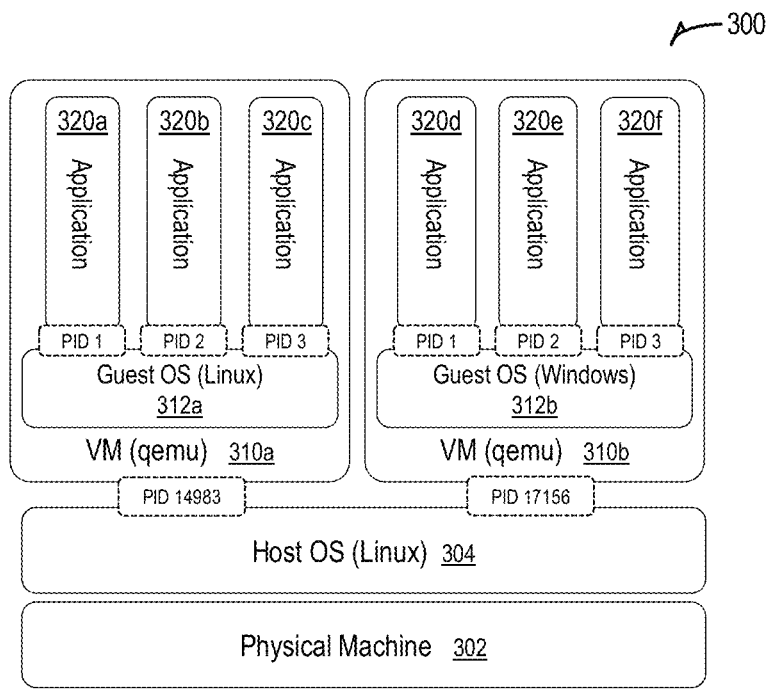
FIG. 3 illustrates an example computing environment with virtual machines.
Figure 4:
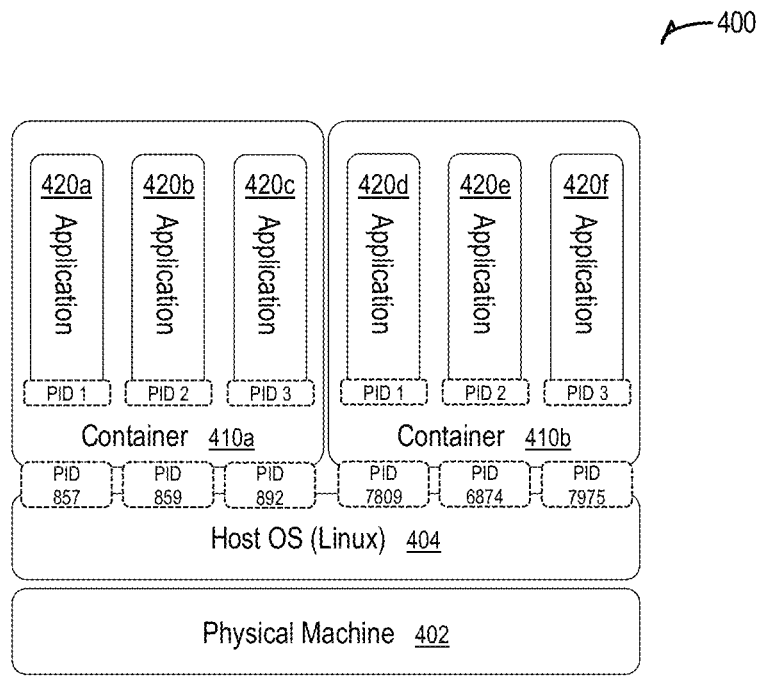
FIG. 4 illustrates an example computing environment with containers.
Figure 5:
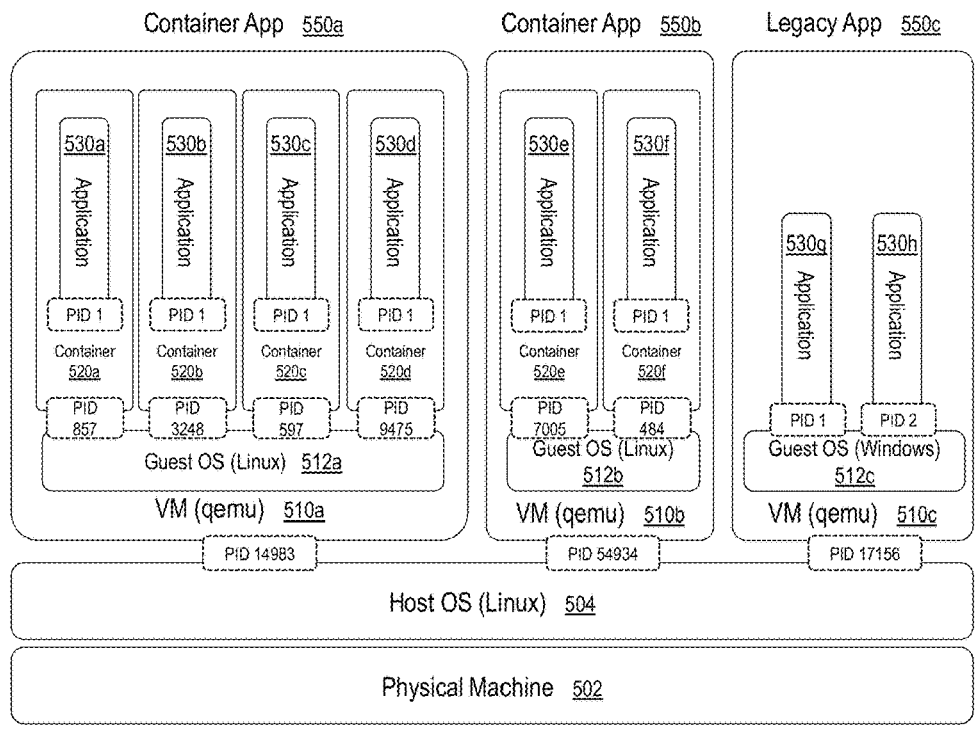
FIG. 5 illustrates an example computing environment with both virtual machines and containers in a "hypervisor-first" virtualization architecture.

Virtual machines and containers can either be used separately (e.g., as shown in FIGS. 3 and 4) or together (e.g., as shown in FIG. 5). When used together, virtual machines and containers are typically used in a "hypervisor-first" virtualization architecture where containers are deployed on VMs (e.g., as shown in FIG. 5) rather than directly on the host physical machine. In a hypervisor-first virtualization architecture, for example, all software applications run on VMs, either directly on the corresponding guest OS of a VM or inside a container on the guest OS of the VM. Thus, a hypervisor-first virtualization architecture relies primarily on virtual machines but provides the flexibility to deploy containers within the virtual machines. While this hypervisor-first approach can leverage certain benefits of both virtual machines and containers, it has various downsides. For example, this hypervisor-first approach relies heavily on VMs, as every application runs on a VM rather than directly on the host physical machine, and separate VMs are typically launched for different applications and/or tenants, even if those applications are designed to run on the same operating system. As a result of this heavy reliance on VMs, a hypervisor-first virtualization architecture often consumes significant resources, requires duplicative instances of the same guest OS to be maintained across multiple VMs, and precludes applications from executing directly on the host physical machine (e.g., as close to bare-metal as possible).

Accordingly, this disclosure presents various embodiments of a "container-first" virtualization architecture where virtual machines are deployed within containers. In a container-first virtualization architecture, for example, software applications primarily run inside containers on the host OS, while certain applications (e.g., applications that run on other non-native operating systems and/or that require greater isolation) may run on VMs that are deployed inside containers on the host OS. Thus, a container-first virtualization architecture relies primarily on containers yet still provides the flexibility to deploy VMs.

Figure 2:
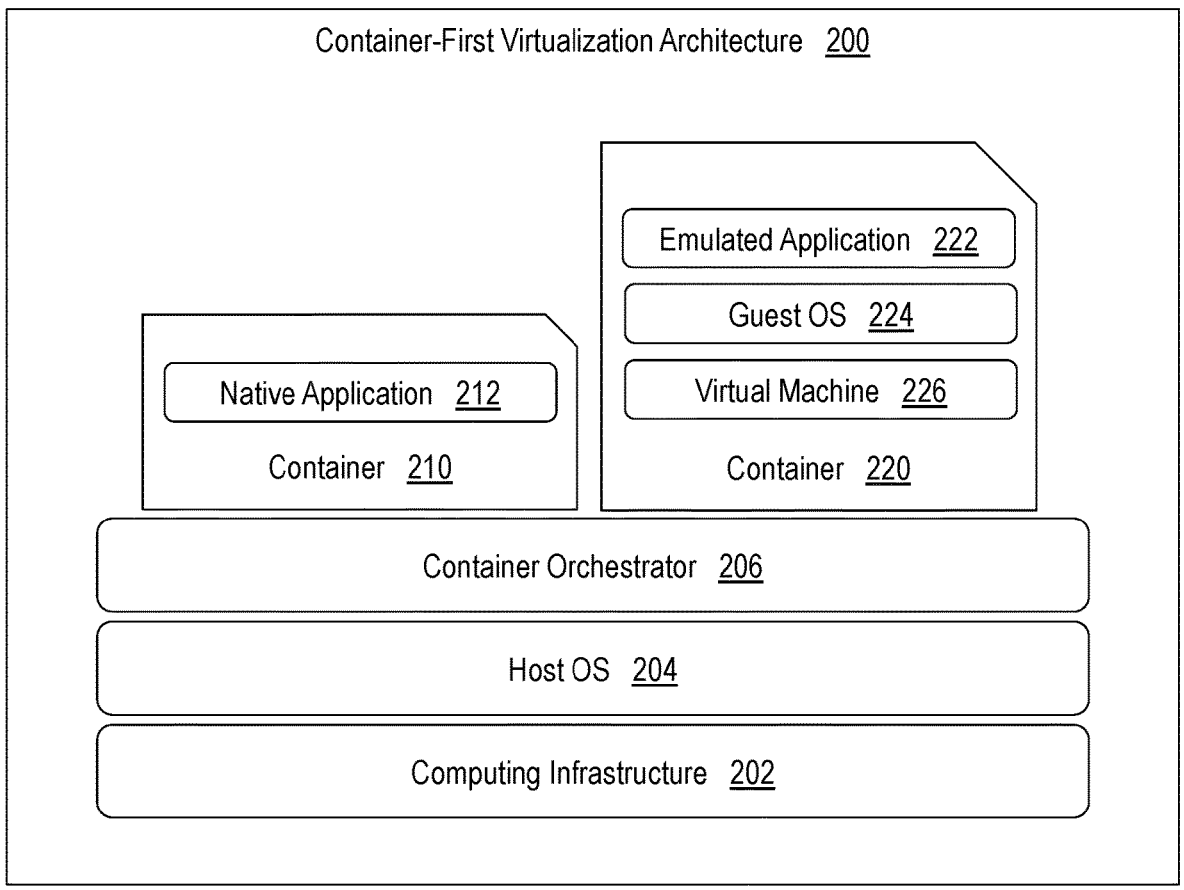
FIG. 2 illustrates an example of virtualization on a container-first architecture.

FIG. 2 illustrates an example of virtualization on a container-first architecture 200. In the illustrated example, the container-first virtualization architecture 200 includes a computing infrastructure 202, a host operating system (OS) 204, a container orchestrator 206, and containers 210, 220.

The computing infrastructure 202 can include any combination of computing hardware distributed across any number of computing nodes, such as one or more physical or virtual machines. The host operating system (OS) 204 can include any suitable operating system (e.g., Linux) running on the computing infrastructure 202.

The container orchestrator 206 is responsible for creating and orchestrating containers 210, 220 across the underlying computing infrastructure 202, which may include either a single node or a cluster of nodes that are treated as a single virtual system. In some embodiments, for example, the container orchestrator 206 may be implemented using Docker Swarm, Kubernetes, HashiCorp Nomad, and/or any other suitable container orchestration service.

In the illustrated example, the container orchestrator 206 is running two containers 210 and 220. Container 210 is running a native application 212 on the host OS 204, while container 220 is running an emulated application 222 on a guest OS 224 inside a virtual machine 226. Thus, in this example, the container-first virtualization architecture 200 is running a containerized native application 212 alongside an emulated application 222 on a containerized VM 226.

This "container-first" architecture 200 provides various advantages over traditional architectures that use VMs only, containers only, or VMs and containers together in a "hypervisor-first" architecture. In particular, this container-first architecture enables containers to run non-native or legacy applications for other operating systems, improves performance (e.g., by relying primarily on containers and reducing the number of VMs that need to be deployed), and extends various benefits of containers to VMs (e.g., greater workload management for VMs, dynamic instantiation of VMs based on hardware characteristics, hardware affinity or group affinity for VMs based on hardware characteristics).

For example, the ability to run VMs within containers enables a container to run a non-native application for another operating system using a VM. In this manner, a container operating system can support legacy applications for other operating systems using an emulated hypervised software stack. For example, a Windows or Android application can run within a container on Linux by instantiating a VM within the container and then running the non-native OS and application within the VM.

This model provides the best performance possible when running native applications next to non-native or legacy applications, as it primarily relies on containers for native applications while limiting the use of VMs to the non-native or legacy applications. For example, native applications can run primarily or exclusively inside containers on the host OS (without using VMs), while non-native or legacy applications can run on VMs instantiated within containers on the host OS. In this manner, native applications and workloads are executed directly on the underlying physical machine or bare-metal, while VMs are only used for non-native or legacy applications, which reduces the number of VMs that need to be deployed, and thus improves the overall system performance.

The container-first architecture 200 can also be leveraged to dynamically instantiate and configure VMs based on the hardware characteristics of the underlying physical machines on which they are deployed, and/or provide hardware affinity or group affinity to deploy VMs on physical machines with specified hardware characteristics. In particular, running a VM inside a container allows the VM to dynamically start based on hardware characteristics, meaning the container can configure the VM with optimal hypervisor performance settings based on the underlying computing hardware it is running on. For example, the VM can be configured based on the number and/or type of CPUs and/or CPU cores, memory capacity, GPUs, network interface controller(s), accelerators (e.g., FPGAs, ASICs), and/or any other peripheral devices or controllers.

As an example, in a clustered environment with an Intel Core i7 and an Intel Xeon, a containerized VM at instantiation can analyze the underlying hardware and automatically change the QEMU binary switch values at runtime. In particular, the Intel Core i7 contains an integrated GPU, and when the containerized VM is executed on that hardware it will adjust the QEMU binary switches to take advantage of the GPU for acceleration. However, if the containerized VM is orchestrated to land on the Intel Xeon, which does not include an integrated GPU, it will adjust the QEMU switch to virtualize the GPU across the Xeon threads.

The ability to dynamically tailor the VM configuration can also be leveraged to provide dynamically licensed hardware and software capabilities, along with billing and attestation for those capabilities, such as Software-defined Silicon (SDSi) and/or dynamically minted and provisioned value-added services and service acceleration through programmable silicon or programmable silicon features. For example, a tenant in this architecture may interact with an SDSi interface to spin up an extra core by furnishing a contract or attestation for it. As another example, dynamically provisioned storage may be provided on a pay-as-you-go basis through either SDSi or a thin-provisioning file system on the host.

For example, the SDSi model expects to deliver a contract (that defines the hosting environment requirements including hardware, firmware, software, location and other "attestable" attributes) to the container hosting service. The container hosting service responds with attestation evidence that offers a possible solution based on actual/available container hosting resources. The SDSi aware orchestrator appraises the evidence using the SDSi contract to verify that the contractual requirements can be met by the pledged container environment. If appraisal reveals a 'yes' or 'approved' result, then the tenant specific context can be "onboarded" with the attested container. It is possible for the SDSi hardware to dynamically reconfigure itself to better meet the contract requirements. Therefore, a SDSi solution might reconfigure itself prior to generating attestation evidence so that the evidence reveals a revised hardware/firmware/software environment that better meets the needs of the contract. SDSi is by definition 'mutable' hardware; but it can achieve the desired security result of a secure 'immutable' container hosting environment by employing hardware root of trust capabilities such as hardware latches that creates an environment that is immutable by the tenant, orchestrator, or container (hardware/firmware/software) until the container completes or its lifecycle terminates—which may include processing of payment for a particular SDSi configured environment. This cycle repeats for a next workload. In this manner, pay-as-you-go can be interpreted in terms of a container lifecycle.

The ability to implement a VM within a container can also be leveraged to provide various other enhancements. For example, the container base for a VM can intercept and transform VM input/output (IO) so that it may be compressed, encrypted, replicated, logged, deduplicated, and so forth. In this manner, the container base environment can, in an application and OS transparent manner, create support for high reliability, security, data transfer efficiency, and integrity checking capabilities. The container base for a VM can also enable data virtualization via smartNIC or computable storage capabilities without complicating VM or application logic. For example, the container base may broker storage and networking operations, or apply filtering on data, via standard software or through smartNICs that appear to the VM-based environment as peer microservices.

The container-first architecture 200 can also be leveraged to extend various other benefits of containers to VMs. For example, because the VMs are inside containers, all the perks of containerization can be extended to the VMs, such as VM delivery via container management, orchestration, versioning, and container state roll back. For example, container orchestration software (e.g., Docker) can be leveraged to distribute and deploy containerized VMs and applications (including bios/firmware updates over the air), provide fluid patching and upgrading of VMs (e.g., by updating and patching the container VM stack rather than maintaining long-lived VMs), migrate VM workloads between physical nodes, provide built-in snapshotting for VMs using the container overlay filesystem, and so forth.

In some embodiments, VMs within containers can be a dynamic of SDSi mutability where configuration of the hardware virtualization (e.g., Intel VT-x technology) depends on the SDSi context having been established (mutable state) and remains available until the container lifecycle completes. Thus, some embodiments may include the equivalent of a hardware virtualization (VT-x) enable/disable bit in a model-specific register (MSR) that can be configured at container granularity. Further, some embodiments may also include SGX enclaves and TDX domains, FPGA designs, or other accelerators as possible runtime protection environments—both with and without having SDSi controls for hardware mutability.

In this manner, a container-first architecture enables hardware configuration controls that normally have platform-wide scope (e.g., configurable via MSRs) to be controlled with per-tenant or per-container scope via an SDSi interface/controls. Moreover, in some embodiments, there may be hardware latches/mutexes that allow container-level granular control of 'execution-mode' versus 'configuration-mode,' where attestation is available in both modes but may be further isolated so as not to pose a security risk to these modes.

The container-first architecture 200 can also achieve better isolation and security for applications than native containers alone, as it enables the level of isolation and security provided by VMs to be extended to containers.

The container-first architecture 200 also enables the host OS to be very slim (e.g., 70-100 MB in some cases), as the host OS only needs to include the container orchestration engine (e.g., the Linux Kernel with ContainerD at pid 1).

This container-first virtualization architecture can also be leveraged to implement a variety of other enhancements, including the following:

(i) the container runtime (e.g., ContainerD) can layer around each wrapped VM to provide policy guided telemetry aggregation and filtering, which can be used for security and efficiency while also enhancing transparency;

(ii) a common toolset (e.g., BusyBox) can be included in each minted container and/or VM wrapper to provide automated single pane management through a single scripting environment;

(iii) secure container storage interface (CSI) extensions can be used to permit disaggregation of persistent memory in a container-or-VM agnostic manner, while simplifying cross-VM data sharing through both persistent and volatile memory;

(iv) persistent memory can be used to store the OS image and/or the initial RAM disk (initrd) in an immutable state, thus removing disks from being an attack surface before they are securely on-boarded; and (v) container runtimes can include a set of utilities for process tracing, packet capture, event monitoring and auditing, and so forth, for seamless observability across containerized executions regardless of whether they go through VMs.

Moreover, given an SDSi negotiated hosting environment, the expected OS drivers and software stack may change to better take advantage of the customized hardware environment. Thus, the above enhancements (and/or other enhancements) may be configured and applied dynamically using a 'late-binding' approach to software stack configuration and compilation (e.g., using just-in-time compilation or binary-translation thunking layers).

In some embodiments, the container-first virtualized architecture 200 may implement a containerized VM using the following:

(1) a bootable partition with an operating system captured inside a file image or a raw partition on a physical drive;

(2) a hypervisor to launch a VM from the bootable partition (e.g., using the QEMU binary to launch the virtual machine using Kernel-based Virtual Machine (KVM) hypervised acceleration on the Linux kernel); and (3) an initialization script to dynamically configure and launch the VM based on detected hardware characteristics (e.g., detect hardware characteristics and configure any environment variables or parameters (e.g., memory size, vCPU count, and so forth) in order to execute the QEMU binary with the appropriate switches).

The hypervisor can be implemented using QEMU, which is an application that runs virtual machines on the Linux kernel using Kernel-based Virtual Machine (KVM) hypervised acceleration.

Moreover, a container engine such as Docker can be used to run the QEMU binary in a container. Appendix A illustrates an example of a base dockerfile that can be used to instantiate a container running QEMU. This dockerfile contains the base layer of a containerized VM and can be used by other dependent dockerfiles to launch containerized VMs using specific VM images.

In addition, the example dockerfile in Appendix A defines an "ENTRYPOINT" based on a file named "bootstrapVm.sh," which means the "bootstrapVm.sh" script will run when the container is first instantiated. The file "bootstrapVm.sh" is a script that performs the dynamic analysis of the hardware the VM is executed on. For example, based on the hardware characteristics, it will adjust the QEMU binary switches accordingly to provide optimal performance for the VM. For example, if the hardware has a GPU it will attempt to virtualize the GPU to accelerate the VM's video performance.

Next, an image for a particular virtual machine must be created. For example, a virtual machine can be created using any suitable virtualization software (e.g., KVM/QEMU, VirtualBox, VMware, HyperV, or Xen). When creating the virtual machine, it may be preferable to create the disk drive as file (e.g., KVM/QEMU uses the file format "QCOW2," while VMware uses the format "VMDK."). Then, proceed with the process of installing the desired software, such as an operating system, patches, the software stack required to run the application service, and finally the application itself.

Once the software is installed, configure the application to launch at start time (e.g., by adding or modifying a startup script to launch the application), and perform any remaining configuration or modifications that may be desired. Finally, shutdown the virtual machine, and copy the resulting hard disk image file to a target folder.

Next, in the same folder as the resulting VM image, add a dockerfile that instantiates a containerized VM from the VM image. Appendix B illustrates an example of a dependent dockerfile that can be used to instantiate a containerized QEMU VM from a particular VM image. In the example dockerfile from Appendix B, the first line with "FROM kvm:1.0.5" is a reference to the container that was built using the base dockerfile from Appendix A. Finally, build the container—once the build is complete, a docker image will be produced with all the tools required to run the VM in a container. At this point, the container can then be orchestrated across computing infrastructure in the manner described throughout this disclosure (e.g., based on the container lifecycle contexts of FIGS. 19 and 21).

In various embodiments, container-first architecture 200 may be implemented using any of the computing devices, platforms, systems, architectures, and/or environments presented throughout this disclosure, such as the edge, fog, and cloud computing environments of FIGS. 12-16, the infrastructure equipment of FIG. 22, and/or the computing platform of FIG. 23, among other examples.

Figure 6:
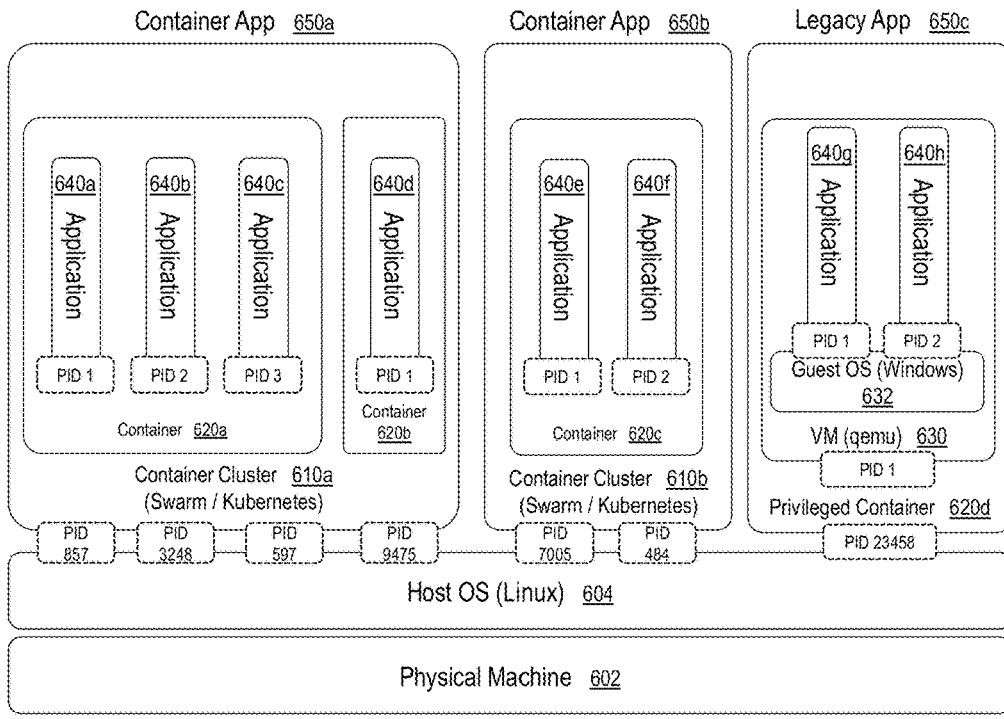
FIG. 6 illustrates an example computing environment with both virtual machines and containers in a "container-first" virtualization architecture.

FIGS. 3-6 illustrate examples of various computing environments implemented using different virtualization architectures. For example, FIG. 3 illustrates an example computing environment with virtual machines, FIG. 4 illustrates an example computing environment with containers, FIG. 5 illustrates an example computing environment with both virtual machines and containers in a "hypervisor-first" virtualization architecture, and FIG. 6 illustrates an example computing environment with both virtual machines and containers in a "container-first" virtualization architecture.

As depicted in FIGS. 3-6, a fundamental difference between virtual machines and containers is where the process IDs (PIDs) for the applications are actually attached. In VMs, an application is attached to the virtual kernel and the host kernel is running a single VM engine. An application inside a container, however, is attached to the host kernel. Thus, every application (or process) in a container is processed by the physical host kernel, while every application (or process) in a VM is processed by a virtual kernel and that virtual kernel is processed by the physical host kernel.

Secure and Scalable Container-First Architecture for Edge Platforms

Figure 7A:
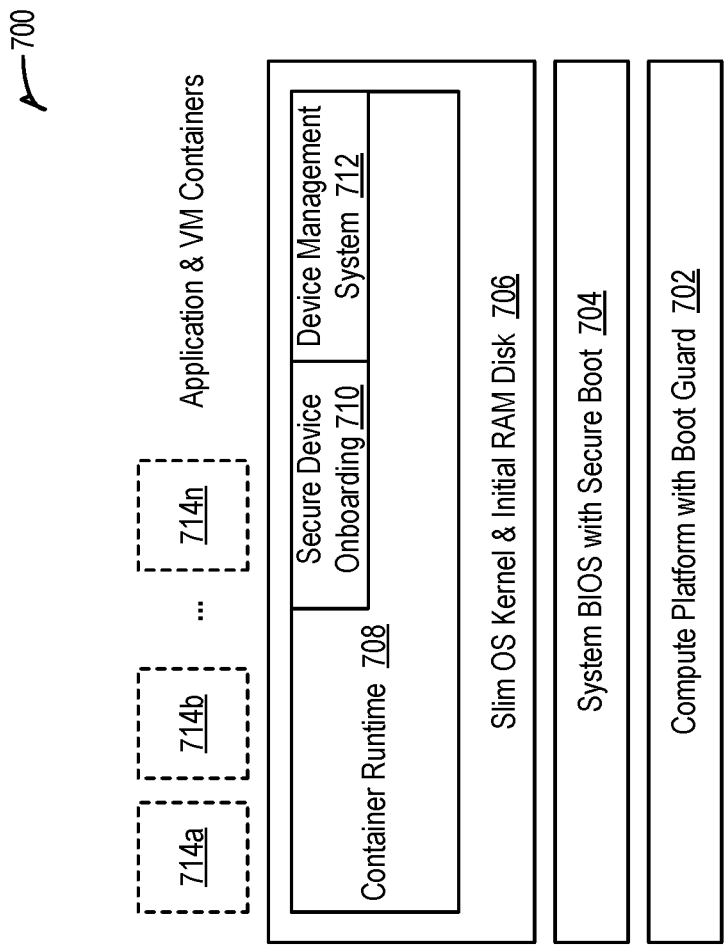
FIG. 7A illustrates an example of a secure and scalable container-first architecture for edge platforms.

FIG. 7A illustrates an example of a secure and scalable container-first architecture 700 for edge platforms. The illustrated architecture 700 enables customers to deliver a secure, scalable, and low-cost foundation for edge platforms using a container-first virtualization approach. In particular, architecture 700 provides security from the beginning of the boot process by establishing a chain of trust that extends from the bare-metal hardware to the containers. Further, architecture 700 can be easily scaled from a single node/instance to thousands of nodes/instances.

In the illustrated embodiment, container-first architecture 700 includes a compute platform 702 with boot guard technology, a system BIOS 704 with a secure bootloader, a slim operating system (OS) kernel and initial RAM disk 706, a container runtime 708 with secure device onboarding (SDO) 710 and Device Management System (DMS) agent 712, and a collection of containers 714a-n for applications and/or virtual machines (VMs).

The compute platform 702 leverages boot guard technology to verify on boot that the platform firmware (e.g., system BIOS 704) is known and trusted. In some embodiments, for example, the compute platform 702 may be implemented using an Intel Architecture (IA) platform with Intel Boot Guard technology.

The system BIOS 704 includes a slim bootloader that leverages secure boot technology to boot the operating system (OS) 706 in a secure and tamper-resistant manner. The slim bootloader includes secure, lightweight, and highly optimized boot firmware that only allows a verified and authorized operating system to boot and is resistant to physical tampering. Moreover, in some embodiments, the slim bootloader may support integration with cloud-based Hardware Security Module (HSM) services to provide key management.

The operating system (OS) 706 may be implemented as a slim, immutable, and container-first OS. In this context, "immutable" may refer to any type of protections or restrictions intended to prevent changes or modifications by unauthorized entities, such as unauthorized supply chain entities, customers, original equipment manufacturers (OEMs), original design manufacturers (ODMS), original component manufacturers (OCMs), and/or malicious actors, among other examples.

In some embodiments, for example, the OS 706 may be a minimal, distribution-less Linux OS, which is referred to herein as "Zero Linux." Zero Linux includes a slim Linux kernel, an immutable initial RAM disk (initrd) that is used as the final root filesystem (e.g., without performing pivot_root), and a container runtime 708 (e.g., ContainerD) that is initialized after system integrity is verified, as the first system bootstrap process (e.g., process ID or PID 1) to provide a container-first runtime environment.

Any additional software components, such as applications and hypervisors/VMs, run inside containers 714*a-n* on the container runtime 708. However, the integrity and/or authenticity of the container images are verified before the containers are launched. In some embodiments, for example, an initialization process in the OS kernel 706 may verify hash values and/or attestation keys associated with the container images.

In this manner, the container-first architecture 700 provides a chain of trust that extends from the underlying hardware (e.g., via Boot Guard technology of the compute platform 702) to the containers associated with the applications, hypervisors/VMs, and all other software components. For example, the platform firmware or BIOS 704, the OS image 706, and the respective container images 714*a-n* are fully verified at each boot, thus ensuring that the entire software stack is known and trusted. Moreover, the OS is minimal and immutable, and the container runtime 708 can run without superuser or root privileges, thus significantly limiting the attack surface for the compute platform.

In some embodiments, the container-first architecture 700 may also support ACRN-based profiles, full-disk encryption (FDE) using a Trusted Platform Module (TPM) protected key, Total Memory Encryption (TME), and/or integration with cloud-based Hardware Security Module (HSM) services for key management, among other examples.

Further, in some embodiments, the container runtime 708 may include secure device onboarding (SDO) 710 and device management system (DMS) 712 functionality to facilitate automated onboarding and remote management of compute platform 702.

Secure device onboarding (SDO) 710 (e.g., Intel SDO) enables the compute platform 702 to be drop-shipped and powered on to dynamically provision to a customer's edge or IoT platform of choice in seconds. For example, SDO 710 provides zero-configuration onboarding of the compute platform 702 using secure, remote provisioning methods (e.g., just-in-time (JIT) provisioning), which eliminates the need for expensive onsite technicians, enables build-to-inventory models for device manufacturing and production, and scales the number of devices that can be securely and automatically deployed in production environments.

Device Management System (DMS) agent 712 leverages secure, remote container management technologies (e.g., Portainer) to remotely manage the compute platform 702, such as by securely adding and updating containers 714*a-n*, securely updating the BIOS/firmware and/or operating system 706, providing integration with SDO 710 for onboarding, and so forth.

In this manner, secure device onboarding (SDO) 710 and device management system (DMS) 712 functionality are leveraged to facilitate automated onboarding, management, and scaling of edge platforms.

In various embodiments, container-first architecture 700 may be implemented using any of the computing devices, platforms, systems, architectures, and/or environments presented throughout this disclosure, such as the edge, fog, and cloud computing environments of FIGS. 12-16, the infrastructure equipment of FIG. 22, and/or the computing platform of FIG. 23, among other examples.

Figure 7B:
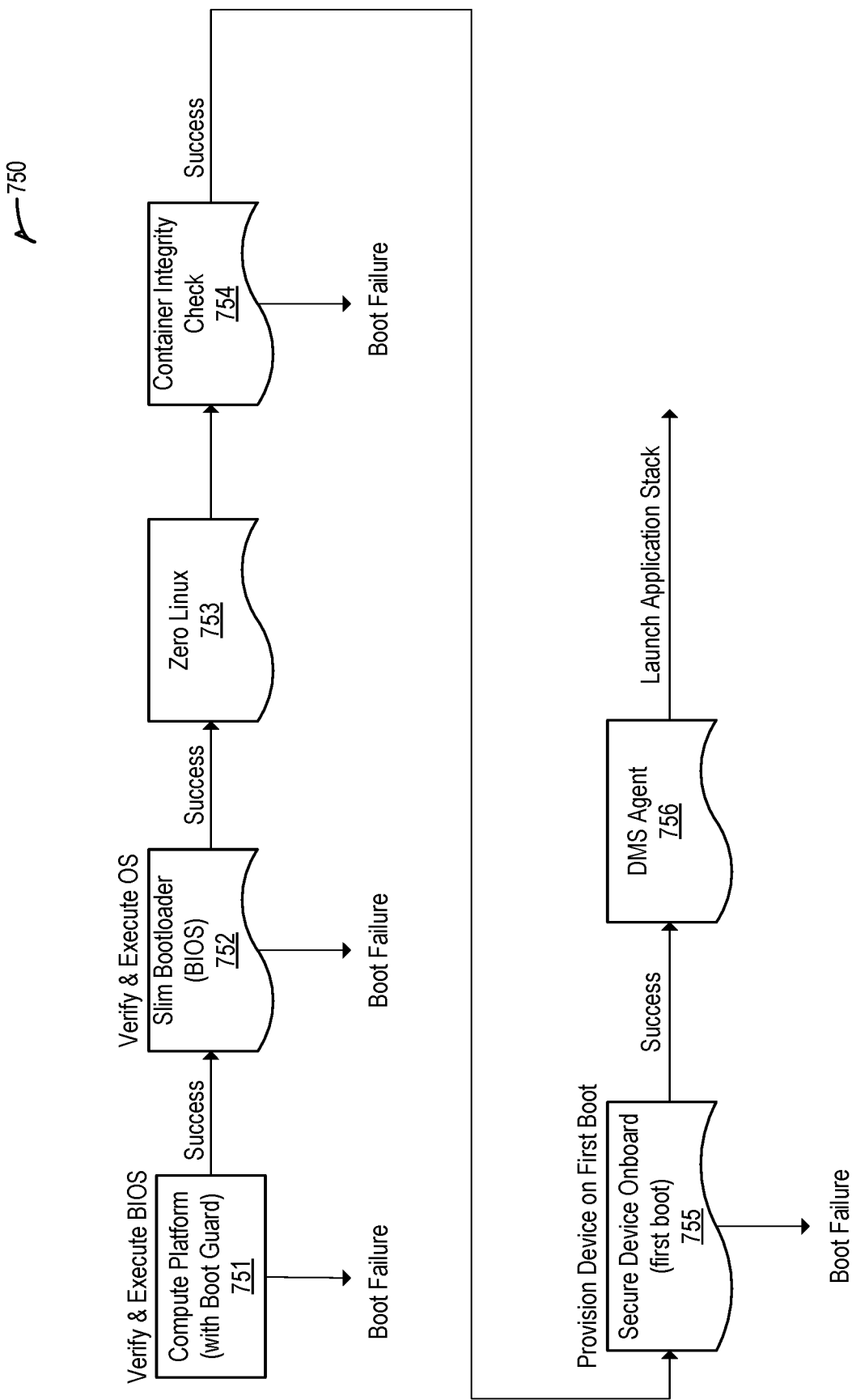
FIG. 7B illustrates an example boot process for a secure and scalable container-first architecture for edge platforms.

FIG. 7B illustrates an example of the boot process 750 for a compute platform implemented using the container-first architecture 700 of FIG. 7A. In the illustrated example, the boot process 750 begins when the compute platform 751 is booted or powered on. Upon booting, the compute platform 751 leverages Boot Guard technology to verify and execute the system BIOS/firmware. The system BIOS then leverages a slim bootloader 752 to verify and execute the "Zero Linux" operating system (OS) image 753, and the Zero Linux OS then performs a container integrity check 754 on any container images that will be instantiated on the compute platform. If the compute platform is being booted for the first time, secure device onboarding 755 is leveraged to automatically provision the compute platform on the edge or IoT platform of the particular customer or operator. A device management system (DMS) agent 756 (e.g., Portainer) is then launched to deploy and remotely manage the remaining application stack inside containers on the compute platform.

At this point, the boot process 750 may be complete. If any of the verifications performed throughout the boot process 750 are unsuccessful (e.g., the verifications performed at blocks 751, 752, 754, and 755), a boot failure occurs and the boot process terminates.

DICE Root of Trust for Container-First Architectures

Figure 8:
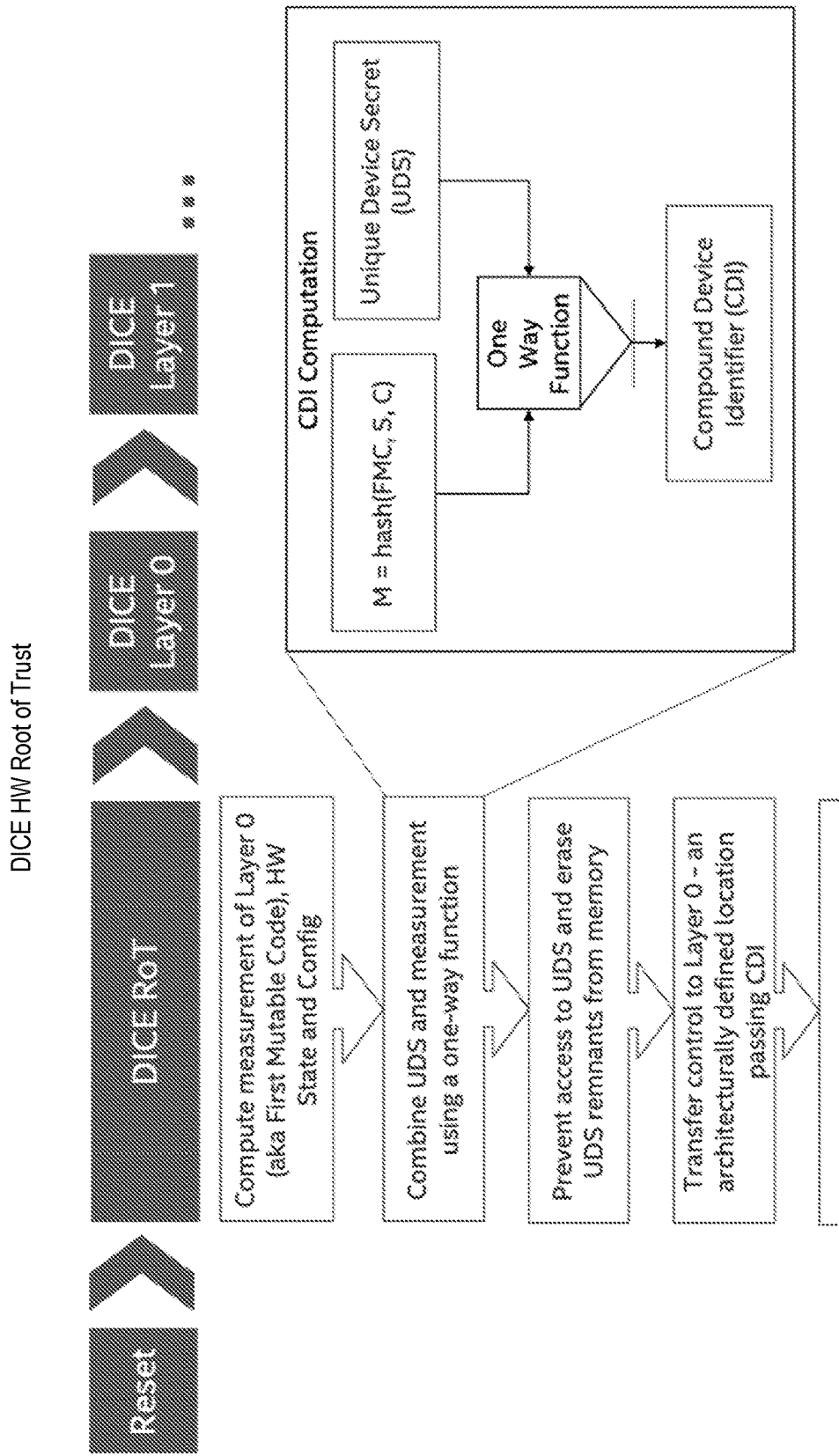
FIG. 8 illustrates an example of establishing a hardware root of trust using a Device Identifier Composition Engine (DICE).

Device Identifier Composition Engine (DICE) refers to a family of hardware and software techniques for providing hardware-based cryptographic device identity, attestation, and data encryption. For example, DICE can be used to establish a hardware root of trust for a device by breaking up the boot process into layers and using a Unique Device Secret (UDS) to create a unique secret for each successive layer. In this manner, if malware is present at any stage of the boot process, the device is automatically re-keyed and the secrets remain protected. FIG. 8 illustrates an example of establishing a hardware root of trust using DICE.

Figure 9B:
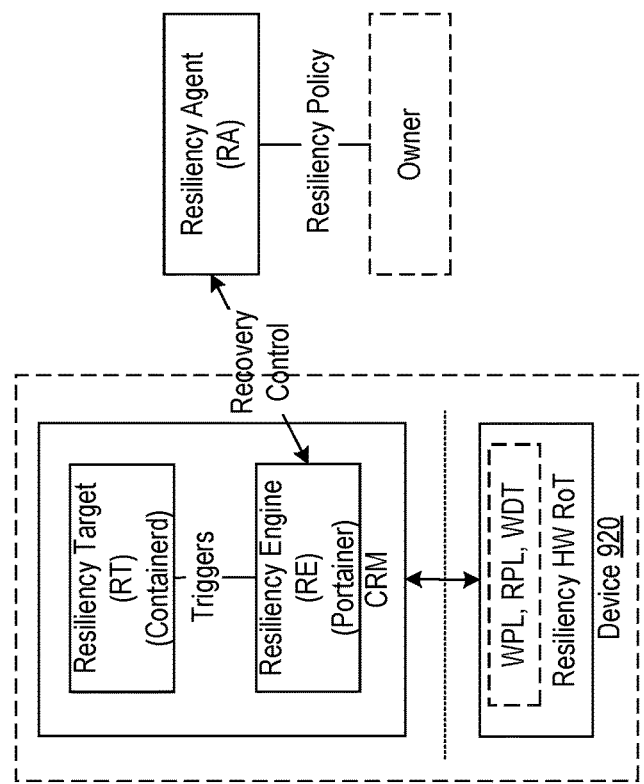
FIGS. 9A-B illustrate examples of devices that leverage DICE and cyber resiliency (CyRes) engines to establish a hardware root of trust for a container-first architecture.
Figure 9A:
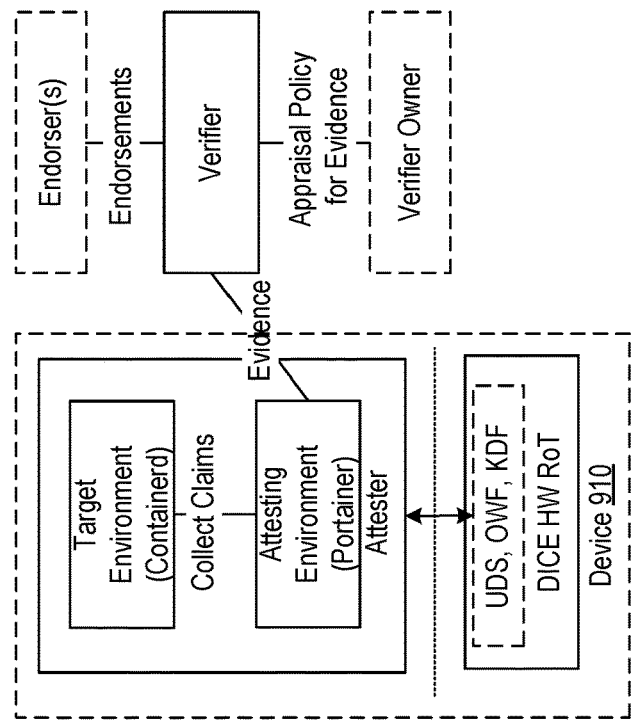

FIGS. 9A-B illustrate examples of devices 910, 920 that leverage DICE and cyber resiliency (CyRes) engines to establish a hardware root of trust for a container-first architecture (e.g., container-first architectures 100, 700 of FIGS. 1, 7A). In particular, these examples show how a container management architecture such as Portainer might look as both a DICE Layer supported by DICE HW Root of Trust (RoT) and as a CyRes (e.g., NIST SP800-193) Resiliency Engine and HW RoT. The Portainer module is a layered element of the "built for container" approach where the "more trusted" behavior of the Portainer module is at a lower (e.g., more primitive) and therefore more trusted layer than the ContainerD runtime and hosted container applications. There may also be other memory and execution environment isolations in place (e.g., Intel SGX, ARM TrustZone, ACRN hypervisor with Secure World isolation), but even if it is simply a different OS process, there is a level of improved isolation. ContainerD may already be isolated from other applications, and some implementations would not see an issue with bringing the full ContainerD functionality into a "TCB" (Trusted Computing Base) of the Portainer "TCB," but different deployments will have different security and reliability/resiliency requirements that may benefit from layered isolation.

In FIG. 9A, the DICE RoT device 910 depends on the following requirements:
(1) a Unique Device Secret (UDS) (e.g., from a physical unclonable function (PUF));
(2) a One-Way Function (OWF) (e.g., SHA2);
(3) a Key Derivation Function (KDF) (e.g., HMAC);
(4) a Key Generation Function (e.g., ECDSA Key Gen); and
(5) Secure Time.

The DICE RoT uses the UDS (PUFS) fuses to establish a unique secret value in the HW RoT that has sufficient cryptographic entropy to support unique identity and key generation functions (e.g., 256 bits of randomness). The RoT measures the Attesting Environment (or it is provisioned at manufacturing time) and generates the Compound Device Identity (CDI) that the Attesting Environment uses to collect claims about the Target Environment (TE), which includes measuring (e.g., hashing) the TE code. It may also collect environmental variables, such as which modes of operation are extant, including debug mode, recovery mode, unconfigured mode, and any other mode that indicates an unsecure state. The collected claims are digitally signed (along with a Nonce from the Verifier) or with a timestamp value from an optional Secure Time Root of Trust component and sent to the Verifier.

In FIG. 9B, the CyRes RoT device 920 depends on the following requirements:
(1) a Write-Protection Latch (WPL);
(2) a Read-Protection Latch (RPL); and
(3) a cyber-resilient Watchdog Timer (WDT).

Devices meeting this profile also allow the Resiliency Agent (RA) to force the device to reset itself, resulting in control being transferred to the Resiliency Engine (RE) for device health assessment and remediation. The means by which the management controller forces the device to reset itself may vary depending on the Watchdog Time utilized. In the case of an Authenticated Watchdog Timer (AWDT), the RA forces reset by withholding deferral tickets. However, a device that uses an AWDT can reset itself if network connectivity is lost. If this is not acceptable, then alternative attention trigger technologies should be used. If the AWDT is used, vendors must trade off the maximum time a device should run before forcibly returning control to the RE for assessment and recovery, with the risk of unwanted AWDT-initiated service interruptions. For "IoT-style" devices that mostly perform functions when online, a timeout value in the range of hours to days may be suitable.

Figure 10:
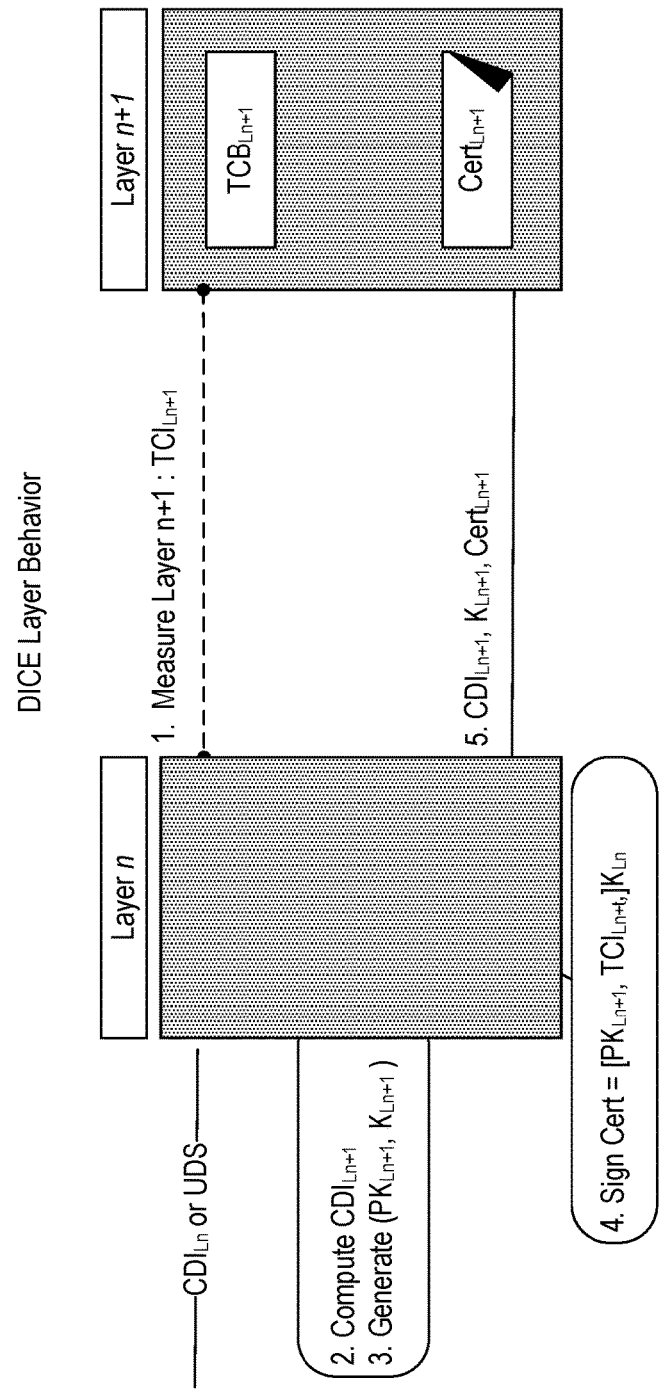
FIG. 10 illustrates an example of DICE layer behavior for a container first architecture.
Figure 11:
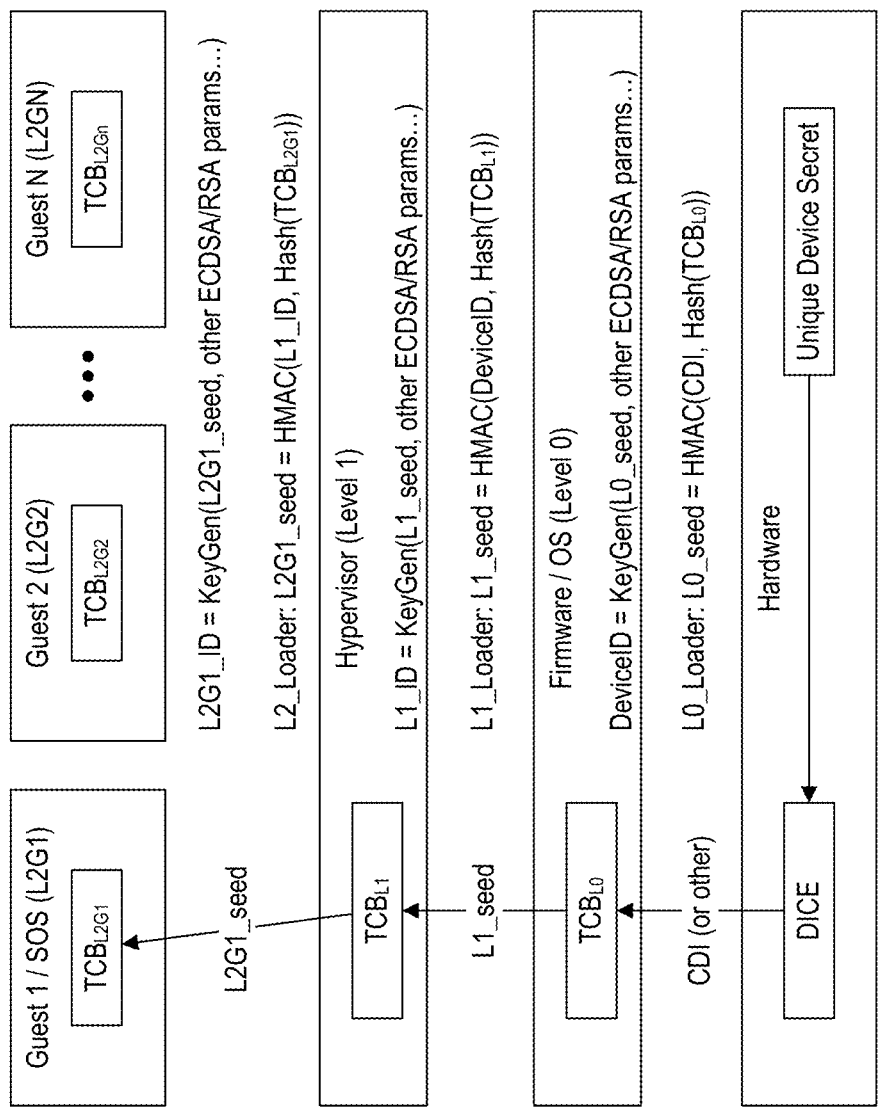
FIG. 11 illustrates an example of extending a DICE Compound Device Identity (CDI) to a virtual machine.

FIG. 10 illustrates an example of DICE layer behavior for a container first architecture (e.g., container-first architectures 100, 700 of FIGS. 1, 7A), and FIG. 11 illustrates an example of extending a DICE Compound Device Identity (CDI) to a virtual machine.

Example Computing Environments

The following sections present various examples of computing devices, systems, architectures, and environments that may be used to implement the container-first architecture described throughout this disclosure.

Edge, Fog, and Cloud Architectures

Figure 12:
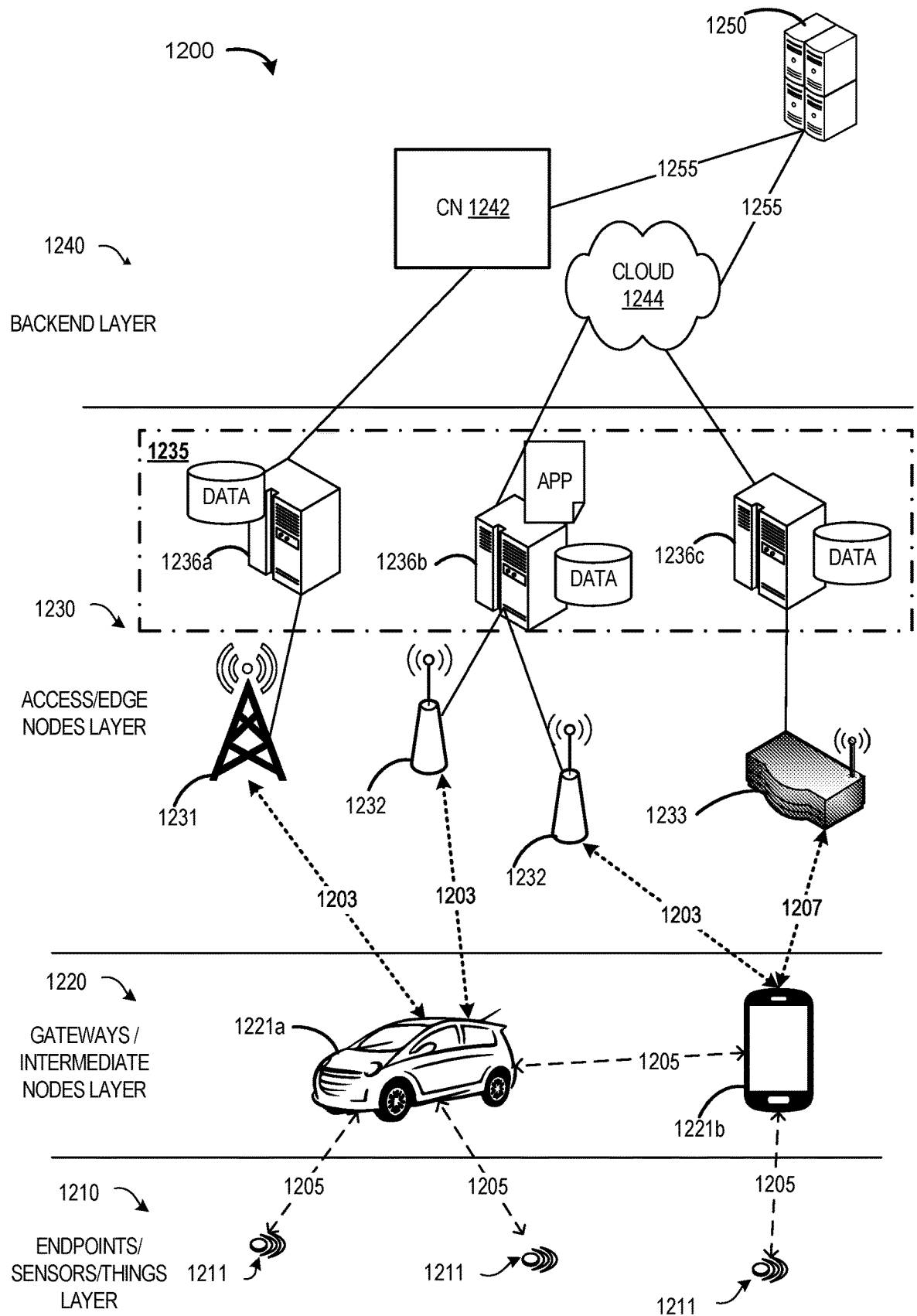
FIG. 12 illustrates an example edge computing environment in accordance with various embodiments.

FIG. 12 illustrates an example edge computing environment 1200 in accordance with various embodiments. FIG. 12 specifically illustrates the different layers of communication occurring within the environment 1200, starting from endpoint sensors or things layer 1210 (e.g., operating in an Internet of Things (IoT) network topology) comprising one or more IoT devices 1211 (also referred to as edge endpoints 1210 or the like); increasing in sophistication to gateways or intermediate node layer 1220 comprising one or more user equipment (UEs) 1221a and 1221b (also referred to as intermediate nodes 1220 or the like), which facilitate the collection and processing of data from endpoints 1210; increasing in processing and connectivity sophistication to access node layer 1230 (or "edge node layer 1230") comprising a plurality of network access nodes (NANs) 1231, 1232, and 1233 (collectively referred to as "NANs 1231-1233" or the like) and a plurality of edge compute nodes 1236a-c (collectively referred to as "edge compute nodes 1236" or the like) within an edge computing system 1235; and increasing in connectivity and processing sophistication to a backend layer 1210 comprising core network (CN) 1242 and cloud 1244. The processing at the backend layer 1210 may be enhanced by network services as performed by a remote application server 1250 and/or other cloud services. Some or all of these elements may be equipped with or otherwise implement some or all aspects of the LPP embodiments discussed infra.

The environment 1200 is shown to include end-user devices, such as intermediate nodes 1220 and endpoints 1210, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1231, 1232, and/or 1233. The NANs 1231-1233 are arranged to provide network connectivity to the end-user devices via respective links 1203, 1207 between the individual NANs and the one or more UEs 1211, 1221.

As examples, the communication networks and/or access technologies may include any combination of wireless technologies, including cellular technology such as LTE, MuLTEfire, and/or NR/5G (e.g., as provided by Radio Access Network (RAN) node 1231 and/or RAN nodes 1232), WiFi or wireless local area network (WLAN) technologies (e.g., as provided by access point (AP) 1233 and/or RAN nodes 1232), and/or the like, as well as wired technologies, such as electrical (e.g., a "copper interconnect"), optical (e.g., fiber optic), and/or any other conductive/transmissive physical communication mediums.

Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1220 include UE 1221a and UE 1221b (collectively referred to as "UE 1221" or "UEs 1221"). In this example, the UE 1221a is illustrated as a vehicle UE, and UE 1221b is illustrated as a smartphone (e.g., handheld touchscreen mobile computing device connectable to one or more cellular networks). However, these UEs 1221 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1210 include UEs 1211, which may be IoT devices (also referred to as "IoT devices 1211"), which are uniquely identifiable embedded computing devices (e.g., within the Internet infrastructure) that comprise a network access layer designed for low-power IoT applications utilizing short-lived UE connections. The IoT devices 1211 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1211 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1211 can utilize technologies such as M2M or MTC for exchanging data with an MTC server (e.g., a server 1250), an edge server 1236 and/or edge computing system 1235, or device via a PLMN, ProSe or D2D communication, sensor networks, or IoT networks. The M2M or MTC exchange of data may be a machine-initiated exchange of data.

The IoT devices 1211 may execute background applications (e.g., keep-alive messages, status updates, etc.) to facilitate the connections of the IoT network. Where the IoT devices 1211 are, or are embedded in, sensor devices, the IoT network may be a WSN. An IoT network describes an interconnecting IoT UEs, such as the IoT devices 1211 being connected to one another over respective direct links 1205. The IoT devices may include any number of different types of devices, grouped in various combinations (referred to as an "IoT group") that may include IoT devices that provide one or more services for a particular user, customer, organizations, etc. A service provider (e.g., an owner/operator of server 1250, CN 1242, and/or cloud 1244) may deploy the IoT devices in the IoT group to a particular area (e.g., a geolocation, building, etc.) in order to provide the one or more services. In some implementations, the IoT network may be a mesh network of IoT devices 1211, which may be termed a fog device, fog system, or fog, operating at the edge of the cloud 1244. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1244 to Things (e.g., IoT devices 1211). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 1230) and/or a central cloud computing service (e.g., cloud 1244) for performing heavy computations or computationally burdensome tasks. On the other hand, edge cloud computing consolidates human-operated, voluntary resources, as a cloud. These voluntary resource may include, inter-alia, intermediate nodes 1220 and/or endpoints 1210, desktop PCs, tablets, smartphones, nano data centers, and the like. In various implementations, resources in the edge cloud may be in one to two-hop proximity to the IoT devices 1211, which may result in reducing overhead related to processing data and may reduce network delay.

In some embodiments, the fog may be a consolidation of IoT devices 1211 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 1244. The fog operating at the edge of the cloud 1244 may overlap or be subsumed into an edge network 1230 of the cloud 1244. The edge network of the cloud 1244 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1236 or edge devices). The Fog layer resides on top of the edge layer and is a consolidation of networking devices such as the intermediate nodes 1220 and/or endpoints 1210 of FIG. 12.

Data may be captured, stored/recorded, and communicated among the IoT devices 1211 or, for example, among the intermediate nodes 1220 and/or endpoints 1210 that have direct links 1205 with one another as shown by FIG. 12. Analysis of the traffic flow and control schemes may be implemented by aggregators that are in communication with the IoT devices 1211 and each other through a mesh network. The aggregators may be a type of IoT device 1211 and/or network appliance. In the example of FIG. 12, the aggregators may be edge nodes 1230, or one or more designated intermediate nodes 1220 and/or endpoints 1210. Data may be uploaded to the cloud 1244 via the aggregator, and commands can be received from the cloud 1244 through gateway devices that are in communication with the IoT devices 1211 and the aggregators through the mesh network. Unlike the traditional cloud computing model, in some implementations, the cloud 1244 may have little or no computational capabilities and only serves as a repository for archiving data recorded and processed by the fog. In these implementations, the cloud 1244 centralized data storage system and provides reliability and access to data by the computing resources in the fog and/or edge devices. Being at the core of the architecture, the Data Store of the cloud 1244 is accessible by both Edge and Fog layers of the aforementioned edge-fog network.

As mentioned previously, the access networks provide network connectivity to the end-user devices 1220, 1210 via respective NANs 1231-1233. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 1231, 1232. This virtualized framework allows the freed-up processor cores of the NANs 1231, 1232 to perform other virtualized applications, such as virtualized applications for LPP embodiments discussed herein.

The UEs 1221, 1211 may utilize respective connections (or channels) 1203, each of which comprises a physical communications interface or layer. The connections 1203 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. In some embodiments, the UEs 1211, 1221 and the NANs 1231-1233 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1211, 1221 and NANs 1231-1233 may operate using LAA, enhanced LAA (eLAA), and/or further eLAA (feLAA) mechanisms. The UEs 1221, 1211 may further directly exchange communication data via respective direct links 1205, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

The UEs 1211, 1221 are capable of measuring various signals or determining/identifying various signal/channel characteristics. Signal measurement may be performed for cell selection, handover, network attachment, testing, and/or other purposes. The measurements collected by the UEs 1211, 1221 may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 1231-1233 reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215, IEEE 802.11, Part 11: "Wireless LAN Medium Access Control (MAC) and Physical Layer (PHY) specifications, IEEE Std.", and/or the like. The same or similar measurements may be measured or collected by the NANs 1231-1233.

The UE 1221*b* is shown to be configured to access an access point (AP) 1233 via a connection 1207. In this example, the AP 1233 is shown to be connected to the Internet without connecting to the CN 1242 of the wireless system. The connection 1207 can comprise a local wireless connection, such as a connection consistent with any IEEE 802.11 protocol, wherein the AP 1233 would comprise a wireless fidelity (WiFi®) router. In embodiments, the UEs 1221 and IoT devices 1211 can be configured to communicate using suitable communication signals with each other or with any of the AP 1233 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1231 and 1232 that enable the connections 1203 may be referred to as "RAN nodes" or the like. The RAN nodes 1231, 1232 may comprise ground stations (e.g., terrestrial access points) or satellite stations providing coverage within a geographic area (e.g., a cell). The RAN nodes 1231, 1232 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1231 is embodied as a NodeB, evolved NodeB (eNB), or a next generation NodeB (gNB), and the RAN nodes 1232 are embodied as relay nodes, distributed units, or Road Side Unites (RSUs). Any other type of NANs can be used.

Any of the RAN nodes 1231, 1232 can terminate the air interface protocol and can be the first point of contact for the UEs 1221 and IoT devices 1211. In some embodiments, any of the RAN nodes 1231/1232 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. In embodiments, the UEs 1211, 1221 can be configured to communicate using OFDM communication signals with each other or with any of the NANs 1231, 1232 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RAN function(s) operated by the RAN or individual NANs 1231-1232 organize downlink transmissions (e.g., from any of the RAN nodes 1231, 1232 to the UEs 1211, 1221) and uplink transmissions (e.g., from the UEs 1211, 1221 to RAN nodes 1231, 1232) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1211, 1221 at each transmission time interval (TTI). A TTI is the duration of a transmission on a radio link 1203, 1205, and is related to the size of the data blocks passed to the radio link layer from higher network layers.

The NANs 1231/1232 may be configured to communicate with one another via respective interfaces or links (not shown), such as an X2 interface for LTE implementations (e.g., when CN 1242 is an Evolved Packet Core (EPC)), an Xn interface for 5G or NR implementations (e.g., when CN 1242 is an Fifth Generation Core (5GC)), or the like. The NANs 1231 and 1232 are also communicatively coupled to CN 1242. In embodiments, the CN 1242 may be an evolved packet core (EPC) network, a NextGen Packet Core (NPC) network, a 5G core (5GC), or some other type of CN. The CN 1242 may comprise a plurality of network elements, which are configured to offer various data and telecommunications services to customers/subscribers (e.g., users of UEs 1221 and IoT devices 1211) who are connected to the CN 1242 via a RAN. The components of the CN 1242 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 1242 may be referred to as a network slice, and a logical instantiation of a portion of the CN 1242 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1242 components/functions.

The CN 1242 is shown to be communicatively coupled to an application server 1250 and a network 1250 via an IP communications interface 1255. the one or more server(s) 1250 comprise one or more physical and/or virtualized systems for providing functionality (or services) to one or more clients (e.g., UEs 1221 and IoT devices 1211) over a network. The server(s) 1250 may include various computer devices with rack computing architecture component(s), tower computing architecture component(s), blade computing architecture component(s), and/or the like. The server(s) 1250 may represent a cluster of servers, a server farm, a cloud computing service, or other grouping or pool of servers, which may be located in one or more datacenters. The server(s) 1250 may also be connected to, or otherwise associated with one or more data storage devices (not shown). Moreover, the server(s) 1250 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1250 offer applications or services that use IP/network resources. As examples, the server(s) 1250 may provide traffic management services, cloud analytics, content streaming services, immersive gaming experiences, social networking and/or microblogging services, and/or other like services. In addition, the various services provided by the server(s) 1250 may include initiating and controlling software and/or firmware updates for applications or individual components implemented by the UEs 1221 and IoT devices 1211. The server(s) 1250 can also be configured to support one or more communication services (e.g., Voice-over-Internet Protocol (VoIP) sessions, PTT sessions, group communication sessions, social networking services, etc.) for the UEs 1221 and IoT devices 1211 via the CN 1242.

The cloud 1244 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1244 include application capabilities type, infrastructure capabilities type, and platform capabilities type. A cloud capabilities type is a classification of the functionality provided by a cloud service to a cloud service customer (e.g., a user of cloud 1244), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1244 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; Function as a Service (FaaS) to the applications running in the edge devices (e.g., smartphones or IoT) to accelerate their workloads and applications; Acceleration FaaS (AFaaS) an FaaS implementation where functions are implemented and executed in a hardware accelerator, which may be used to further improve edge FaaS capability; Conflict Analysis as a Service (CAaaS); crypto-services (e.g., TLS-aaS, DTLS-aaS); Edge-as-a-Service (EaaS) Orchestration as a Service (OaaS); and/or other like cloud services including various anything-as-a-service (X-aaS) offerings.

In some embodiments, the cloud 1244 may represent a network such as the Internet, a local area network (LAN) or a wide area network (WAN) including proprietary and/or enterprise networks for a company or organization, or combinations thereof. The cloud 1244 may be a network that comprises computers, network connections among the computers, and software routines to enable communication between the computers over network connections. In this regard, the cloud 1244 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1244 may be via a wired and/or a wireless connection using the various communication protocols discussed infra. More than one network may be involved in a communication session between the illustrated devices. Connection to the cloud 1244 may require that the computers execute software routines which enable, for example, the seven layers of the OSI model of computer networking or equivalent in a wireless (cellular) phone network and/or a wired network. Cloud 1244 may be used to enable relatively long-range communication such as, for example, between the one or more server(s) 1250 and one or more UEs 1221 and IoT devices 1211. In some embodiments, the cloud 1244 may represent the Internet, one or more cellular networks, local area networks, or wide area networks including proprietary and/or enterprise networks, TCP/Internet Protocol (IP)-based network, or combinations thereof. In such embodiments, the cloud 1244 may be associated with network operator who owns or controls equipment and other elements necessary to provide network-related services, such as one or more base stations or access points, one or more servers for routing digital data or telephone calls (e.g., a core network or backbone network), etc. The backbone links 1255 may include any number of wired and/or wireless technologies, and may be part of a LAN, a WAN, or the Internet. In one example, the backbone links 1255 are fiber backbone links that couple lower levels of service providers to the Internet, such as the CN 1212 and cloud 1244.

In embodiments, the edge compute nodes 1236 may include or be part of an edge system 1235 (or edge network 1235). The edge compute nodes 1236 may also be referred to as "edge hosts 1236" or "edge servers 1236." The edge system 1235 includes a collection of edge servers 1236 (e.g., MEC hosts/servers 1236-1 and 1236-2 of FIG. 13) and edge management systems (not shown by FIG. 12) necessary to run edge computing applications (e.g., MEC Apps 1336 of FIG. 13) within an operator network or a subset of an operator network. The edge servers 1236 are physical computer systems that may include an edge platform (e.g., MEC platform 1337 of FIG. 13) and/or virtualization infrastructure (e.g., VI 1338 of FIG. 13), and provide compute, storage, and network resources to edge computing applications. Each of the edge servers 1236 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1220 and/or endpoints 1210. The VI of the edge servers 1236 provide virtualized environments and virtualized resources for the edge hosts, and the edge computing applications may run as VMs and/or application containers on top of the VI. One example implementation of the edge system 1235 is a MEC system 1235, which is discussed in more detail infra with respect to FIG. 13. It should be understood that the disclosed MEC systems and services deployment examples are only one illustrative example of edge computing systems/networks 1235, and that the example embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

As shown by FIG. 12, each of the NANs 1231, 1232, and 1233 are co-located with edge compute nodes (or "edge servers") 1236a, 1236b, and 1236c, respectively. These implementations may be small-cell clouds (SCCs) where an edge compute node 1236 is co-located with a small cell (e.g., pico-cell, femto-cell, etc.), or may be mobile micro clouds (MCCs) where an edge compute node 1236 is co-located with a macro-cell (e.g., an eNB, gNB, etc.). The edge compute node 1236 may be deployed in a multitude of arrangements other than as shown by FIG. 12. In a first example, multiple NANs 1231-1233 are co-located or otherwise communicatively coupled with one edge compute node 1236. In a second example, the edge servers 1236 may be co-located or operated by RNCs, which may be the case for legacy network deployments, such as 3G networks. In a third example, the edge servers 1236 may be deployed at cell aggregation sites or at multi-RAT aggregation points that can be located either within an enterprise or used in public coverage areas. In a fourth example, the edge servers 1236 may be deployed at the edge of CN 1242. These implementations may be used in follow-me clouds (FMC), where cloud services running at distributed data centers follow the UEs 1221 as they roam throughout the network.

In any of the aforementioned embodiments and/or implementations, the edge servers 1236 provide a distributed computing environment for application and service hosting, and also provide storage and processing resources so that data and/or content can be processed in close proximity to subscribers (e.g., users of UEs 1221, 1211) for faster response times The edge servers 1236 also support multi-tenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1236 from the UEs 1211/1221, CN 1242, cloud 1244, and/or server(s) 1250, or vice versa. For example, a device application or client application operating in a UE 1221/1211 may offload application tasks or workloads to one or more edge servers 1236. In another example, an edge server 1236 may offload application tasks or workloads to one or more UE 1221/1211 (e.g., for distributed ML computation or the like).

Figure 13:
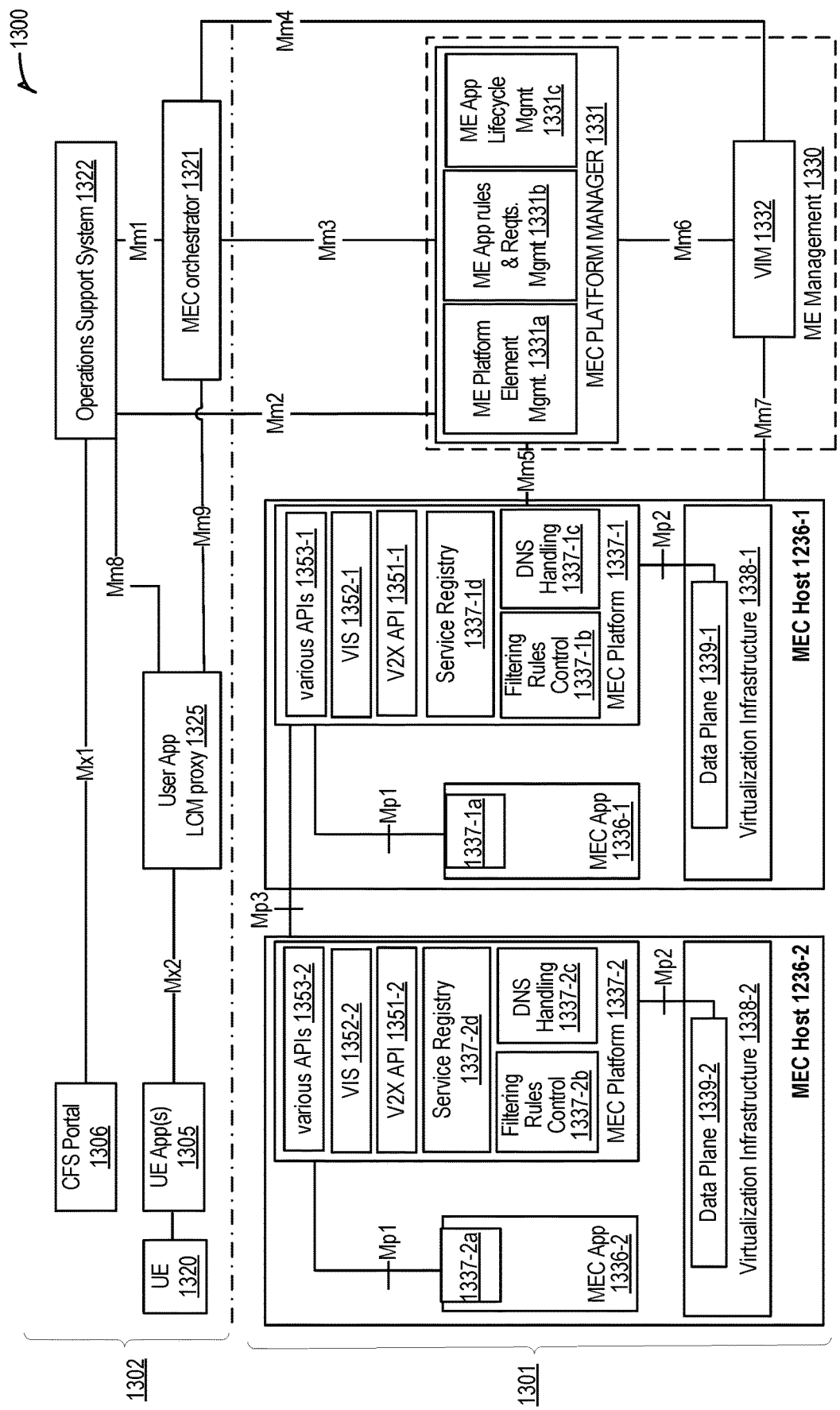
FIG. 13 depicts a block diagram for an example MEC system architecture according to various embodiments.

FIG. 13 depicts a block diagram for an example MEC system architecture 1300 according to various embodiments. The MEC system architecture 1300 may correspond to the edge computing system 1235 of FIG. 12. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP LTE-V2X based protocols) need to exchange data, provide data to aggregation points and access to data in databases which provide an overview of the local situation derived from a multitude of sensors (by various cars, roadside units, etc.).

The illustrated logical connections between various entities of the MEC architecture 1300 may be access-agnostic and not dependent on a particular deployment. MEC enables implementation of MEC applications (MEC Apps) 1336-1 and 1336-2 (collectively referred to as "MEC Apps 1336" or the like) as software-only entities that run on top of a Virtualization Infrastructure (VI) 1338-1 and 1338-2 (collectively referred to as "VI 1338" or the like), which is located in or close to the network edge. A MEC app 1336 is an application that can be instantiated on a MEC host 1236 within the MEC system 1300 and can potentially provide or consume MEC services 1337a. The term "user application" in the context of MEC refers to an MEA 1336 that is instantiated in the MEC system 1300 in response to a request from a user (e.g., UE 1221) via a device application. FIG. 13 shows the general entities involved, and these entities can be grouped into multi-access edge system level 1302, multi-access edge host level 1301, and network level entities (not shown). The multi-access edge host level 1301 includes a MEC host 1236-1 and MEC Host 1236-2 (which may be the same or similar to the MEC servers 1236 discussed previously, and re collectively referred to as "MEC host 1236" or the like) and Multi-access Edge (ME) management 1330, which provide functionality to run MEC Apps 1336 within an operator network or a subset of an operator network. The multi-access edge system level 1302 includes multi-access edge system level management 1302, UE 1320 (which may be the same or similar to the intermediate nodes 1220 and/or endpoints 1210 discussed herein), and third party entities. The network level (not shown) includes various external network level entities, such as a 3GPP network (e.g., CN 1242 of FIG. 12), a local area network (e.g., a LAN, WLAN, PAN, etc.), and an external network (e.g., CN 1242 and/or cloud 1244 of FIG. 12). The multi-access edge host level 1301 includes multi-access edge host level management and one or more MEC hosts 1236. The multi-access edge host level management may include various components that handle the management of the multi-access edge specific functionality of a particular MEC platform 1337, MEC host 1236, and the MEC Apps 1336 to be run. The MEC host 1236 includes the MEC platform 1337, MEC Apps 1336, and VI 1338.

The MEC system 1300 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 1300 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 1236 is an entity that contains an MEC platform 1337 and VI 1338 which provides compute, storage, and network resources for the purpose of running MEC Apps 1336. Each of the VIs 1338 includes a respective data plane (DP) 1339 (including DP 1339-1 and 1339-2) that executes respective traffic rules 1337-1*b* and 1337-2*b* (collectively referred to as "traffic rules 1337*b*") received by the MEC platform 1337, and routes the traffic among applications (e.g., MEC Apps 1336), MEC services 1337-1*a* and 1337-2*a* (collectively referred to as "MEC services 1337*a*"), DNS server/proxy (see e.g., via DNS handling entities 1337-1*c* and 1337-2*c*), 3GPP network, local networks, and external networks. The MEC DP 1338*a* may be connected with the (R)AN nodes 1231 and CN 1242 of FIG. 12, and/or may be connected with the AP 1233 of FIG. 12 via a wider network, such as the internet, an enterprise network, or the like. The other entities depicted and/or discussed herein may be the same or similar as those discussed with regard to FIG. 12.

The MEC platforms 1337-1 and 1337-2 (collectively referred to as "MEC platform 1337" or the like) within a MEC host 1236 may be a collection of essential functionality required to run MEC Apps 1336 on a particular VI 1338 and enable them to provide and consume MEC services 1337*a*, and that can provide itself a number of MEC services 937*a*. The MEC platform 1337 can also provide various services and/or functions, such as offering an environment where the MEC Apps 1336 can discover, advertise, consume and offer MEC services 1337*a* (discussed infra), including MEC services 1337*a* available via other platforms when supported. The MEC platform 1337 may be able to allow authorized MEC Apps 1336 to communicate with third party servers located in external networks. The MEC platform 1337 may receive traffic rules from the MEC platform manager 1331, applications, or services, and instruct the data plane accordingly (see e.g., Traffic Rules Control 1337*b*). The MEC platform 1337 may send instructions to the DP 1338 within the VI 1338 via the Mp2 reference point. The Mp2 reference point between the MEC platform 1337 and the DP 1338 of the VI 1338 may be used to instruct the DP 1338 on how to route traffic among applications, networks, services, etc. In some implementations, the MEC platform 1337 may translate tokens representing UEs XP01 in the traffic rules into specific IP addresses. The MEC platform 1337 also receives DNS records from the MEC platform manager 1331 and configures a DNS proxy/server accordingly. The MEC platform 1337 hosts MEC services 1337*a* including the multi-access edge services discussed infra, and provide access to persistent storage and time of day information. Furthermore, the MEC platform 1337 may communicate with other MEC platforms 1337 of other MEC servers 1236 via the Mp3 reference point.

The VI 1338 may represent the totality of all hardware and software components which build up the environment in which MEC Apps 1336 and/or MEC platform 1337 are deployed, managed and executed. The VI 1338 may span across several locations, and the network providing connectivity between these locations is regarded to be part of the VI 1338. The physical hardware resources of the VI 1338 includes computing, storage and network resources that provide processing, storage and connectivity to MEC Apps 1336 and/or MEC platform 1337 through a virtualization layer (e.g., a hypervisor, VM monitor (VMM), or the like). The virtualization layer may abstract and/or logically partition the physical hardware resources of the MEC server 1236 as a hardware abstraction layer. The virtualization layer may also enable the software that implements the MEC Apps 1336 and/or MEC platform 1337 to use the underlying VI 1338, and may provide virtualized resources to the MEC Apps 1336 and/or MEC platform 1337, so that the MEC Apps 1336 and/or MEC platform 1337 can be executed.

The MEC Apps 1336 are applications that can be instantiated on a MEC host/server 1236 within the MEC system 1300 and can potentially provide or consume MEC services 1337*a*. The term "MEC service" refers to a service provided via a MEC platform 1337 either by the MEC platform 937 itself or by a MEC App 1336. MEC Apps 1336 may run as VM on top of the VI 1338 provided by the MEC server 1236, and can interact with the MEC platform 1337 to consume and provide the MEC services 1337*a*. The MEC Apps 1336 are instantiated on the VI 1338 of the MEC server 1236 based on configuration or requests validated by the ME management 1330. In some embodiments, the MEC Apps 1336 can also interact with the MEC platform 1337 to perform certain support procedures related to the lifecycle of the MEC Apps 1336, such as indicating availability, preparing relocation of user state, etc. The MEC Apps 1336 may have a certain number of rules and requirements associated to them, such as required resources, maximum latency, required or useful services, etc. These requirements may be validated by the ME management 1330, and can be assigned to default values if missing. MEC services 1337-1*a* and 1337-2*a* (collectively referred to as "MEC services "437*a*" or the like) are services provided and/or consumed either by the MEC platform 1337 and/or MEC Apps 1336. The service consumers (e.g., MEC Apps 1336 and MEC platform 1337) may communicate with particular MEC services 1337*a* over individual APIs (including MEC V2X API 1351-1, 1351-2 and various APIs 1353-1, 1353-2 in FIG. 13). When provided by an application, a MEC service 1337*a* can be registered in a list of services in the service registries 1337-1*d* and 1337-2*d* (collectively referred to as "service registry 1337*d*" or the like) to a respective the MEC platform 1337 over the Mp1 reference point. Additionally, the MEC Apps 1336 can subscribe to one or more services 1337*a* for which it is authorized over the Mp1 reference point.

The MEC system 1300 may support a feature called UserApps. When the MEC system 1300 supports the feature UserApps, the ME management 1330 may support the instantiation of MEC Apps 1336 (or user applications) on multiple MEC hosts 1236 following a single instantiation request, and when required by the operator in response to a request by the user. The application instance may need to fulfil a number of potential constraints predefined for the application 1305. Once instantiated, connectivity may be established between the UE 1320 and the application instance. Potential constraints may include latency, location, compute resources, storage resources, network capability, security conditions, and the like. As part of the user application (or MEC app 1336) instantiation, the MEC system 1300 will create an associated application context that the MEC system 1300 maintains for the lifetime of the user application (or MEC app 1336). The application context is a set of reference data about an application instance that is used to identify it, enable lifecycle management operations and associate it with its device application, The term "user context" in the context of MEC refers to application-specific runtime data maintained by a MEC app 1336, which is associated with a user of that application. The application context contains information specific to the application instance such as its unique identifier within the MEC system 1300 and the address (e.g., URI or the like) provided for clients (e.g., UE 1320) that are external to the MEC system 1300 to interact with the user application.

When the MEC system 1300 supports the feature UserApps, the system 1300 may, in response to a request by a user, support the establishment of connectivity between the UE 1320 and an instance of a specific MEC App 1336 fulfilling the requirements of the MEC App 1336 regarding the UE 1320. If no instance of the MEC App 1336 fulfilling these requirements is currently running, the multi-access edge system management may create a new instance of the application 1305 on a MEC host 1236 that fulfils the requirements of the application 1305. Once instantiated, connectivity is established between the UE 1320 and the new MEC App 1336 instance. Requirements of the application can include latency, location, compute resources, storage resources, network capability, security conditions, and the like. When the MEC system 1300 supports the UserApps feature, the system 1300 may support the onboarding of MEC Apps 1336 during the execution of an instantiation request, may allow the establishment of connectivity between the UE 1320 and a specific instance of an MEC App 1336, may support the capability to terminate the MEC App 1336 instance when no UE 1320 is connected to it anymore, and may support the termination of the MEC App 1336 running on multiple MEC servers 1236 following a single termination request.

As shown by FIG. 13, the Mp1 reference point is between the MEC platform 1337 and the MEC Apps 1336. The Mp1 reference point may provide service registration 1337*d*, service discovery, and communication support for various services, such as the MEC services 1337-1*a* provided by MEC host 1236-1 and MEC services 1337-2*a* provided by MEC Host 1236-2 (collectively referred to as "MEC services 1337*a*" or the like). In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MEC services 1337*a* include Radio Network Information Service (RNIS), location services, and bandwidth management services. The RNIS, when available, provides authorized MEC Apps 1336 with radio network related information, and expose appropriate up-to-date radio network information to the MEC Apps 1336. The radio network information (RNI) may include, inter alia, radio network conditions, measurement and statistics information related to the user plane, information related to UEs 1320 served by the radio node(s) associated with the MEC host 1236 (e.g., UE context and radio access bearers), changes on information related to UEs 1320 served by the radio node(s) associated with the MEC host 1236, and/or the like. The RNI may be provided at the relevant granularity (e.g., per UE 1320, per cell, per period of time).

The service consumers (e.g., MEC Apps 1336 and MEC platform 1337) may communicate with the RNIS over an RNI API 1353 to obtain contextual information from a corresponding RAN. RNI may be provided to the service consumers via an access node (e.g., (R)AN nodes 1231, 1232, or AP 1233 of FIG. 12). The RNI API 1353 may support both query and subscription (e.g., a pub/sub) based mechanisms that are used over a Representational State Transfer (RESTful) API 1353 or over a message broker of the MEC platform 1337 (not shown by FIG. 13). A MEC App 1336 may query information on a message broker via a transport information query procedure, wherein the transport information may be pre-provisioned to the MEC App 1336 via a suitable configuration mechanism. The various messages communicated via the RNI API 1353 may be in XML, JSON, Protobuf, or some other suitable format.

The RNI may be used by MEC Apps 1336 and MEC platform 1337 to optimize the existing services and to provide new types of services that are based on up to date information on radio conditions. As an example, a MEC App 1336 may use RNI to optimize current services such as video throughput guidance. In throughput guidance, a radio analytics MEC App 1336 may use MEC services to provide a backend video server with a near real-time indication on the throughput estimated to be available at the radio downlink interface in a next time instant. The throughput guidance radio analytics application 1336 computes throughput guidance based on the required radio network information it obtains from a multi-access edge service running on the MEC server 1236. RNI may be also used by the MEC platform 1337 to optimize the mobility procedures required to support service continuity, such as when a certain MEC App 1336 requests a single piece of information using a simple request-response model (e.g., using RESTful mechanisms) while other MEC Apps 1336 subscribe to multiple different notifications regarding information changes (e.g., using a pub/sub mechanism and/or message broker mechanisms).

The location services (LS), when available, may provide authorized MEC Apps 1336 with location-related information, and expose such information to the MEC Apps 1336. With location related information, the MEC platform 1337 or one or more MEC Apps 1336 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 1320 currently served by the radio node(s) associated with the MEC server 1236, information about the location of all UEs 1320 currently served by the radio node(s) associated with the MEC server 1236, information about the location of a certain category of UEs 1320 currently served by the radio node(s) associated with the MEC server 1236, a list of UEs 1320 in a particular location, information about the location of all radio nodes currently associated with the MEC server 1236, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 1236, or a subset thereof, according to a desired deployment. In this regard, the OMA Zonal Presence API 1353 provides means for MEC Apps 1336 to retrieve information about a zone, the access points associated to the zones and the users that are connected to the access points. In addition, the OMA Zonal Presence API 1353, allows authorized application to subscribe to a notification mechanism, reporting about user activities within a zone. In various embodiments, a MEC server 1236 may access location information or zonal presence information of individual UEs 1320 using the OMA Zonal Presence API 1353 to identify the relative location or positions of the UEs 1320.

The bandwidth management services (BWMS) provides for the allocation of bandwidth to certain traffic routed to and from MEC Apps 1336, and specify static/dynamic up/down bandwidth resources, including bandwidth size and bandwidth priority. MEC Apps 1336 may use the BWMS to update/receive bandwidth information to/from the MEC platform 1337. In some embodiments, different MEC Apps 1336 running in parallel on the same MEC server 1236 may be allocated specific static, dynamic up/down bandwidth resources, including bandwidth size and bandwidth priority. The BWMS includes a bandwidth management (BWM) API 1353 to allowed registered applications to statically and/or dynamically register for specific bandwidth allocations per session/application. The BWM API 1353 includes HTTP protocol bindings for BWM functionality using RESTful services or some other suitable API mechanism.

Referring back to FIG. 13, multi-access edge management comprises multi-access edge system level management and the multi-access edge host level management 1330. The ME management 1330 comprises the MEC platform manager 1331 and the VI manager (VIM) 1332, and handles the management of MEC-specific functionality of a particular MEC server 1236 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure.

The MEC platform manager 1331 is responsible for managing the life cycle of applications including informing the multi-access edge orchestrator (MEC O) 1321 of relevant application related events. The MEC platform manager 1331 may also provide MEP element management functions 1331*a* to the MEC platform 1337, manage MEC App rules and requirements 1331*b* including service authorizations, traffic rules, DNS configuration and resolving conflicts, and manage MEC App 1336 lifecycles (MEALC mgmt 1331*c*). The MEC platform manager 1331 may also receive virtualized resources fault reports and performance measurements from the VIM 1332 for further processing. The Mm5 reference point between the MEC platform manager 1331 and the MEC platform 1337 is used to perform platform configuration, configuration of the MEPE mgmt 1331*a*, the MERR mgmt 1331*b*, the MEALC mgmt 1331*c*, management of application relocation, etc.

The VIM 1332 may be an entity that allocates, manages and releases virtualized (compute, storage and networking) resources of the VI 1338, and prepares the VI 1338 to run a software image. To do so, the VIM 1332 may communicate with the VI 1338 over the Mm7 reference point between the VIM 1332 and the VI 1338. Preparing the VI 1338 may include configuring the VI 1338, and receiving/storing the software image. When supported, the VIM 1332 may provide rapid provisioning of applications, such as described in "Openstack++ for Cloudlet Deployments", available at http://reports-archive.adm.cs.cmu.edu/anon/2015/CMU-CS-15-123.pdf. The VIM 1332 may also collect and report performance and fault information about the virtualized resources, and perform application relocation when supported. For application relocation from/to external cloud environments, the VIM 1332 may interact with an external cloud manager to perform the application relocation, for example using the mechanism described in "Adaptive VM Handoff Across Cloudlets", and/or possibly through a proxy. Furthermore, the VIM 1332 may communicate with the MEC platform manager 1331 via the Mm6 reference point, which may be used to manage virtualized resources, for example, to realize the application lifecycle management. Moreover, the VIM 1332 may communicate with the MEC O 1321 via the Mm4 reference point, which may be used to manage virtualized resources of the MEC server 1236, and to manage application images. Managing the virtualized resources may include tracking available resource capacity, etc.

The multi-access edge system level management includes the MEC O 1321 as a core component, which has an overview of the complete MEC system 1300. The MEC-O 1321 may maintain an overall view of the MEC system 1300 based on deployed multi-access edge hosts 901, available resources, available MEC services 1337*a*, and topology. The Mm3 reference point between the MEC-O 1321 and the MEC platform manager 1331 may be used for the management of the application lifecycle, application rules and requirements and keeping track of available MEC services 1337*a*. The MEC-O 1321 may communicate with the user application lifecycle management proxy (UALMP) 1325 via the Mm9 reference point in order to manage MEC Apps 1336 requested by UE application 1305.

The MEC-O 1321 may also be responsible for on-boarding of application packages, including checking the integrity and authenticity of the packages, validating application rules and requirements and if necessary adjusting them to comply with operator policies, keeping a record of on-boarded packages, and preparing the VIM(s) 1302 to handle the applications. The MEC-O 1321 may select appropriate MEC host(s) 901 for application instantiation based on constraints, such as latency, available resources, and available services. The MEC-O 1321 may also trigger application instantiation and termination, as well as trigger application relocation as needed and when supported.

The Operations Support System (OSS) 1322 refers to the OSS of an operator that receives requests via the Customer Facing Service (CFS) portal 1306 (and over the Mx1 reference point) and from UE applications 1305 for instantiation or termination of MEC Apps 1336, and decides on the granting of these requests. The CFS portal 1306 (and the Mx1 interface) may be used by third-parties to request the MEC system 1300 to run applications 1306 in the MEC system 1300. Granted requests may be forwarded to the MEC-O 1321 for further processing. When supported, the OSS 1322 also receives requests from UE applications 1305 for relocating applications between external clouds and the MEC system 1300. The Mm2 reference point between the OSS 1322 and the MEC platform manager 1331 is used for the MEC platform manager 1331 configuration, fault and performance management. The Mm1 reference point between the MEC-O 1321 and the OSS 1322 is used for triggering the instantiation and the termination of multi-access edge applications 1336 in the MEC system 1300.

The UE app(s) 1305 (also referred to as "device applications" or the like) is one or more applications running in a device, computing system, etc. (e.g., UE 1320), that has the capability to interact with the MEC system 900 via the user application lifecycle management proxy 1325. The UE app(s) 1305 may be, include, or interact with one or more client applications, which in the context of MEC, is application software running on a device, computing system, etc. that utilizes functionality provided by one or more specific MEC application(s) 1336. The user application lifecycle management proxy ("user app LCM proxy") 1325 may authorize requests from UE applications 1305 in the UE and interacts with the OSS 1322 and the MEC-O 1321 for further processing of these requests. The term "lifecycle management," in the context of MEC, refers to a set of functions required to manage the instantiation, maintenance and termination of a MEC application 1336 instance. The user app LCM proxy 1325 may interact with the OSS 1322 via the Mm8 reference point, and is used to handle UE applications 1305 requests for running applications in the MEC system 1300. A user application 1305 may be an MEC App 1336 that is instantiated in the MEC system 1300 in response to a request of a user via an application running in the UE 1320 (e.g., UE application 1305). The user app LCM proxy 1325 allows UE applications 1305 to request on-boarding, instantiation, termination of user applications and when supported, relocation of user applications in and out of the MEC system 1300. It also allows informing the UE applications 1305 about the state of the user applications 1305. The user app LCM proxy 1325 is only accessible from within the mobile network, and may only be available when supported by the MEC system 1300. A UE application 1305 may use the Mx2 reference point between the user app LCM proxy 1325 and the UE application 1305 to request the MEC system 1300 to run an application in the MEC system 1300, or to move an application in or out of the MEC system 1300. The Mx2 reference point may only be accessible within the mobile network and may only be available when supported by the multi-access edge system.

In order to run an MEC App 1336 in the MEC system 1300, the MEC-O 1321 receives requests triggered by the OSS 1322, a third-party, or a UE application 1305. In response to receipt of such requests, the MEC-O 1321 selects a MEC server 1236 to host the MEC App 1336 for computational offloading. These requests may include information about the application to be run, and possibly other information, such as the location where the application needs to be active, other application rules and requirements, as well as the location of the application image if it is not yet on-boarded in the MEC system 1300.

In various embodiments, the MEC-O 1321 selects one or more MEC servers 1236 for computational intensive tasks. The selected one or more MEC servers 1236 may offload computational tasks of a UE application 1305 based on various operational parameters, such as network capabilities and conditions, computational capabilities and conditions, application requirements, and/or other like operational parameters. The application requirements may be rules and requirements associated to/with one or more MEC Apps 1336, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 1336 to be able to run; multi-access edge services that the MEC Apps 1336 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's MEC system deployment or mobile network deployment (e.g., topology, cost); requirements on access to user traffic; requirements on persistent storage; traffic rules 1337b; DNS rules 1337c; etc.

The MEC-O 1321 considers the requirements and information listed above and information on the resources currently available in the MEC system 1300 to select one or several MEC servers 1236 within the MEC system 901 to host MEC Apps 1336 and/or for computational offloading. After one or more MEC servers 1236 are selected, the MEC-O 1321 requests the selected MEC host(s) 1236 to instantiate the application(s) or application tasks. The actual algorithm used to select the MEC servers 1236 depends on the implementation, configuration, and/or operator deployment. In various embodiments, the selection algorithm may be based on the task offloading embodiments discussed herein, for example, by taking into account network, computational, and energy consumption requirements for performing tasks of application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 1321 may decide to select one or more new MEC servers 1236 to act as a master node, and initiates the transfer of an application instance or application-related state information from the one or more source MEC servers 1236 to the one or more target MEC servers 1236.

In addition, the MEC system architecture 1300 also provides support for applications. In the context of FIG. 13, the UE app 1305 is an application instance running on a vehicle or vUE 1320, and requesting V2X service to the system. MEC hosts 1236 are co-located with edge infrastructure (e.g., nodes 1231-133 of FIG. 12) and communicate with each other through the Mp3 interface. The example of FIG. 13 also uses V2X Information Services (VIS) 1352-1 and 1352-1 (collectively referred to as "MEC VIS 1352"). FIG. 13 is an example of application instances in a V2X service with MEC V2X API 1351a and 1351b (collectively referred to as "MEC V2X API 1351"). In the framework of V2X services, a vehicle UE 1320 is hosting a client application, and is connected to a certain MEC host 1236 (and a related MEC App 1336). In presence of multiple MEC host/server 1236, the VIS 1352 permits to expose information between MEC Apps 1336 running on different MEC hosts 1236. In addition, other remote application server instances can be located somewhere else (e.g., private clouds owned by the operator or by the OEM such as cloud 1244). The VIS 1352 may be produced by the MEC platform 1337 or by the MEC Apps 1336.

In particular, the VIS 1352 permits information exposure, pertinent to the support of automotive use cases, to MEC application instances. VIS 1352 also permits a single V2X/ITS operator to offer a V2X service(s) over a region that may span different countries and involve multiple network operators, MEC systems 1300 and MEC apps 1336 providers. For that purpose, the MEC VIS 1352 includes the following functionalities.

In some aspects, the MEC platform 1337 can include a MEC V2X API 1351 and provide MEC VIS 1352, which can include the following functionalities: (a) gathering of PC5 V2X relevant information from the 3GPP network for purposes of performing UE authorization for V2X communications (e.g., obtaining a list of V2X authorized UEs 1320, obtaining relevant information about the authorization based on the UE subscription, and obtaining V2X configuration parameters such as a common set of V2X configuration parameters which can include PC5 configuration parameters); (b) exposure of the information obtained in (a) to MEC apps 1336 in the same host or MEC apps in other MEC hosts; (c) enablement of MEC apps 1336 to communicate securely with the V2X-related 3GPP core network logical functions (e.g., enabling communication between the MEC host and a V2X control function in the core network); (d) enablement of MEC apps 1336 in different MEC systems 1300 to communicate securely with each other; and (e) gathering and processing information available in other MEC APIs 1353 (e.g., gathering and processing information obtained from a RNI API, Location API, WLAN API, and other APIs that may be implemented within the MEC platform 1337) in order to predict radio network congestion, and provide suitable notifications to the UE 1320.

From that perspective, the VIS 1352 is relevant to Mp1 and Mp3 reference points in the MEC architecture 1300. In particular, the relevant information is exposed to MEC apps 1336 via the Mp1 reference point, and the Mp3 reference point may enable the possibility to transfer this information between different MEC platforms 1337. The MEC V2X API 1351 provides information to MEC apps 1336 in a standardized way, which provides interoperability in multi-vendor scenarios. Nevertheless, MEC apps 1336 may communicate in a direct way (e.g., without the use of MEC platform 1337). Inter-system communication may be realized between MEC Orchestrators 1321. As an alternative, or, in addition to that, possible Mp3 enhancements (or new reference points between MEC systems 1300) may be defined.

In some aspects, the MEC Host 1236-2 in FIG. 13 can also implement a MEC V2X API 1351 2, which can provide an interface to one or more of the apps instantiated within MEC Host 1236-2, such as MEC App 1336-2b. In this regard, MEC host 1236-1 and MEC Host 1236-2 can communicate with each other via the Mp3 interface as well as the MEC V2X APIs 1351-1, 1351-2. Additionally, one or more of the MEC apps 1336-1 instantiated within MEC host 1236-1 can communicate with one or more of the MEC apps 1336-2 instantiated within MEC Host 1236-2 via the MEC V2X APIs 1351 1, 1351-2 as well as the Mp3 interface between the MEC host 1236-1 and MEC Host 1236-2.

In some aspects, each of the MEC hosts 1236 can be owned/managed by a different mobile services operator (while it can be operated directly by a MEC vendor or a third party). In some aspects, MEC apps 1336 instantiated on MEC host 1236-1 and MEC Host 1236-2 can be used to provide V2X-related services, and can be operated by the mobile services operator, by a MEC vendor, or by a third party (e.g., OEM, or OEM supplier, or system integrator).

In some aspects, the MEC V2X APIs 1351 can be provided as a general middleware service, providing information gathered from vehicles and other V2X elements, and exposed as a service within the hosts (e.g., as a RESTful API) for the higher layers (e.g., the MEC apps instantiated within the hosts). In some aspects, the MEC V2X APIs 1351 can be configured to gather information and data from sensors. In this regard, the deployment of the MEC V2X APIs 1351 is ensuring continuity of the service across different mobile networks, for the same OEM (e.g., automobile manufacturer). If a standard implementation of a V2X API 1351 is introduced (e.g., by ETSI MEC), this functionality can ensure the same basic V2X service characteristics for all OEMs in a 5G communication system with MEC functionalities.

In some aspects, MEC app 1336a and MEC app 1336b can use the corresponding MEC V2X APIs 1351 to retrieve information from the 3GPP network. In some aspects, MEC apps 1336 can be configured to host V2X configuration parameters such as PC5 configuration parameters (or a common set of V2X configuration parameters that can be available within a multi-PLMN communication environment). The availability of these V2X configuration parameters also in absence of network coverage is ensured by the usage of an Mp3 interface (or another type of interface) between the hosts. In some aspects, MEC app 1336-1 can be configured to connect to MEC Host 1236-2 (through V2X MEC API 1351-2 in MEC Host 1236-2), and MEC app 1336-2 can be configured to connect to MEC host 1236-1 (through V2X MEC API 1351-1 in MEC host 1236-1). In case of a multi-operator architecture, multiple MEC hosts can be configured to communicate with each other via the MEC V2X APIs 1351 and synchronize in order to transfer the relevant V2X configuration parameters, so that they can be available across the multi-operator architecture in absence of cellular coverage (e.g., outside of the 3GPP domain). In this way, a UE 1320 can have access to V2X configuration parameters even when the UE is not under coverage of its 3GPP network.

In some aspects, one or more ME apps within a MEC host 1236 can be instantiated to perform functionalities of a V2X application function, which may include providing VIS 1352. Additionally, MEC hosts can use MEC V2X APIs 1351 to perform various V2X or VIS 1352 functions. In particular, one or more ME apps can be instantiated within a MEC host to perform functionalities associated with a V2X application function. In some aspects, these ME apps can be configured to perform the following V2X application functions: obtaining V2X subscription information for a vUE 1320, determining whether the vUE 1320 is authorized to perform V2X communications in response to a request for V2X services, communicating V2X configuration parameters such as a common set of V2X configuration parameters, and so forth.

Edge Orchestration/Virtualization

The deployment of a multi-stakeholder edge computing system may be arranged and orchestrated to enable the deployment of multiple services and virtual edge instances, among multiple edge nodes and subsystems, for use by multiple tenants and service providers. In a system example applicable to a cloud service provider (CSP), the deployment of an edge computing system may be provided via an "over-the-top" approach, to introduce edge computing nodes as a supplemental tool to cloud computing. In a contrasting system example applicable to a telecommunications service provider (TSP), the deployment of an edge computing system may be provided via a "network-aggregation" approach, to introduce edge computing nodes at locations in which network accesses (from different types of data access networks) are aggregated. Moreover, these over-the-top and network aggregation approaches can also be implemented together in a hybrid or merged approach or configuration.

Figure 14:
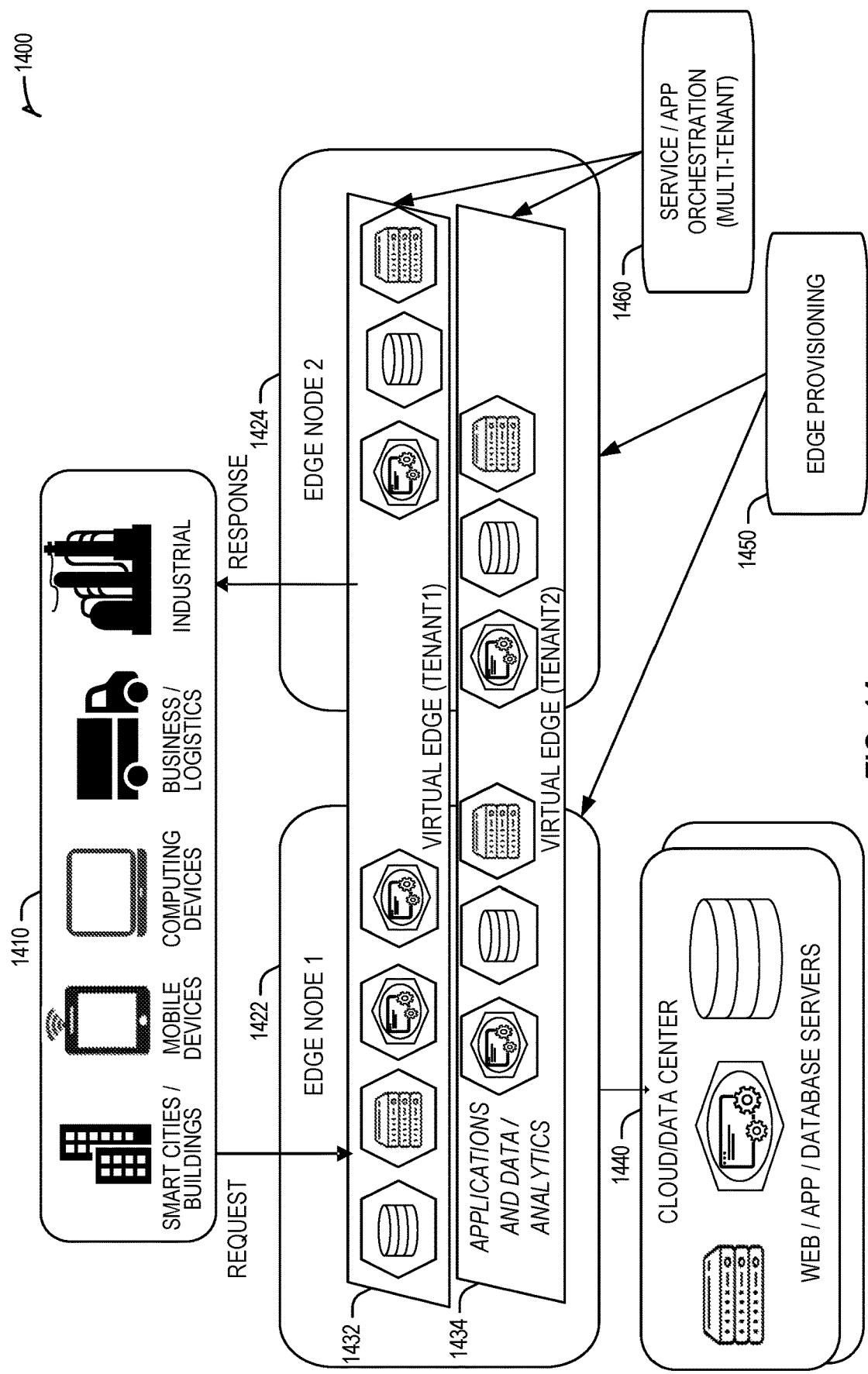
FIGS. 14-15 illustrate deployment and orchestration for virtual edge configurations across an edge computing system operated among multiple edge nodes and multiple tenants.
Figure 15:
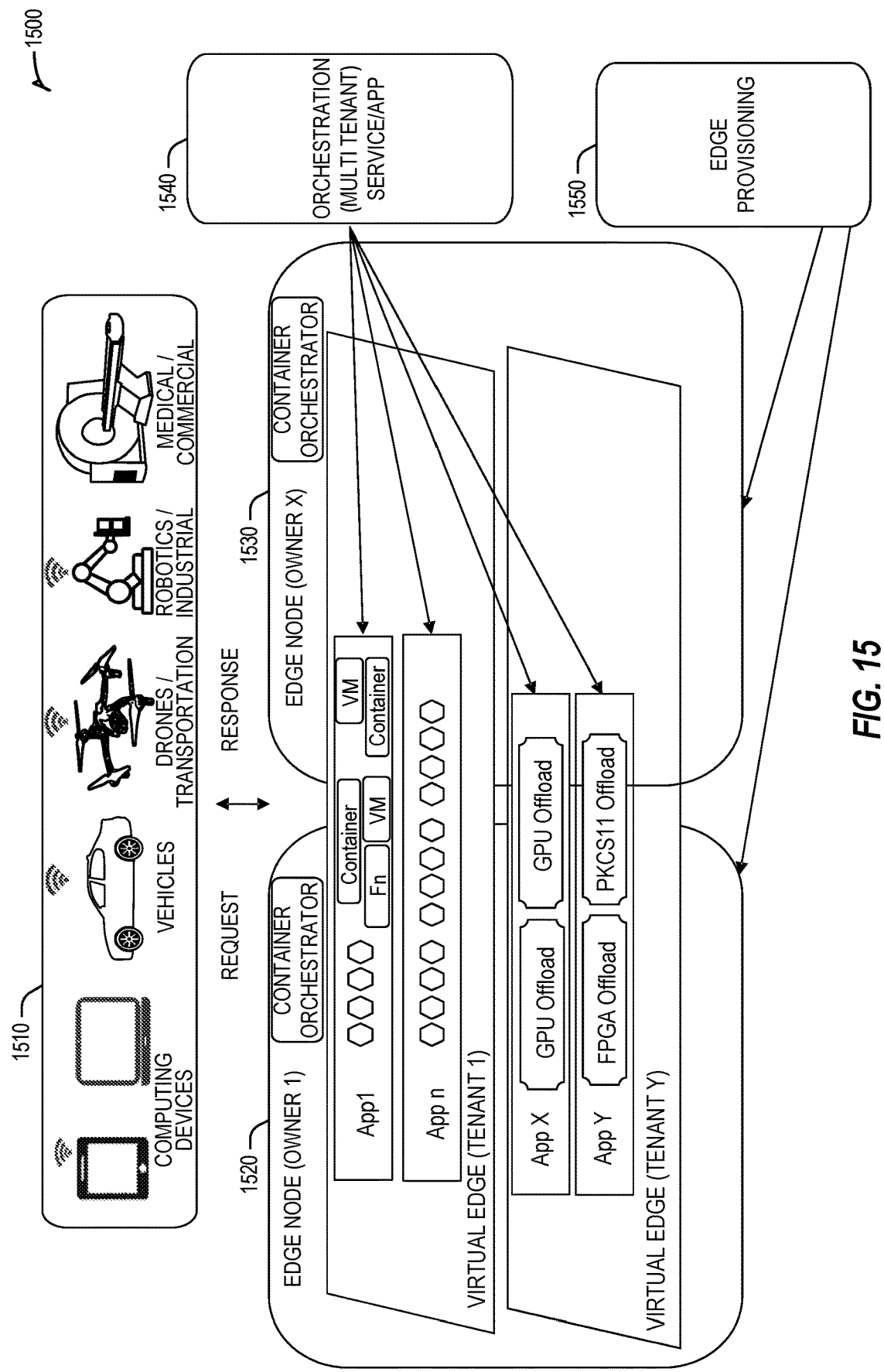

As an extension of either CSP or TSP configurations, FIGS. 14-15 illustrate deployment and orchestration for virtual edge configurations across an edge computing system operated among multiple edge nodes and multiple tenants. Specifically, FIG. 14 depicts coordination of a first edge node 1422 and a second edge node 1424 in an edge computing system 1400, to fulfill requests and responses for various client endpoints 1410 (e.g., smart cities/building systems, mobile devices, computing devices, business/logistics systems, industrial systems, etc.) which access various virtual edge instances. The virtual edge instances provide edge compute capabilities and processing in an edge cloud, with access to a cloud/data center 1440 for higher-latency requests for websites, applications, database servers, etc. However, the edge cloud enables coordination of processing among multiple edge nodes for multiple tenants or entities.

In the example of FIG. 14, these virtual edge instances include: a first virtual edge 1432, offered to a first tenant (Tenant 1), which offers a first combination of edge storage, computing, and services; and a second virtual edge 1434, offering a second combination of edge storage, computing, and services. The virtual edge instances 1432, 1434 are distributed among the edge nodes 1422, 1424, and may include scenarios in which a request and response are fulfilled from the same or different edge nodes. The configuration of the edge nodes 1422, 1424 to operate in a distributed yet coordinated fashion occurs based on edge provisioning functions 1450. The functionality of the edge nodes 1422, 1424 to provide coordinated operation for applications and services, among multiple tenants, occurs based on orchestration functions 1460.

It should be understood that some of the devices in 1410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way down to specific hardware features). A trusted multi-tenant device may further contain a tenant specific cryptographic key such that the combination of key and slice may be considered a "root of trust" (RoT) or tenant specific RoT. A RoT may further be computed or dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1422, 1424 may operate as loadable security module (LSM) or security feature enforcement points for local resources allocated to multiple tenants per node. Additionally, tenant runtime and application execution (e.g., in instances 1432, 1434) may serve as an enforcement point for an LSM or other security feature that creates a virtual edge abstraction of resources spanning potentially multiple physical hosting platforms. Finally, the orchestration functions 1460 at an orchestration entity may operate as an LSM or security feature enforcement point for marshalling resources along tenant boundaries.

Edge computing nodes may partition resources (memory, CPU, GPU, interrupt controller, I/O controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 1410, 1422, and 1440 may coordinate the establishment of a distributed trusted computing base (DTCB) such that a tenant-specific virtual trusted secure channel linking all elements end to end can be established.

In the example of FIG. 15, an edge computing system 1500 is extended to provide for orchestration of multiple applications through the use of containers (a contained, deployable unit of software that provides code and needed dependencies) in a multi-owner, multi-tenant environment.

A multi-tenant orchestrator may be used to perform key management, trust anchor management, and other security functions related to the provisioning and lifecycle of the trusted 'slice' concept in FIG. 14. An orchestrator may use a DICE layering and fan-out construction to create a root of trust context that is tenant specific. Thus, orchestration functions 1540, provided by an orchestrator discussed below, may participate as a tenant-specific orchestration provider.

Similar to the scenario of FIG. 14, the edge computing system 1500 is configured to fulfill requests and responses for various client endpoints 1510 from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

Within the edge cloud, a first edge node 1520 (operated by a first owner) and a second edge node 1530 (operated by a second owner) respectively operate an orchestrator to coordinate the execution of various applications within the virtual edge instances offered for respective tenants. The edge nodes 1520, 1530 are coordinated based on edge provisioning functions 1550, while the operation of the various applications are coordinated with orchestration functions 1540. Furthermore, the orchestrator may identify specific hardware features that are offered to one owner but hidden from a second owner, however offered across the ownership boundaries in order to ensure that services complete according to their SLA(s). Accordingly, the virtual edge, container orchestrator, and service/app orchestrator may provide an LSM or other security enforcement point, for node-specific resources tied to specific tenants.

Figure 16:
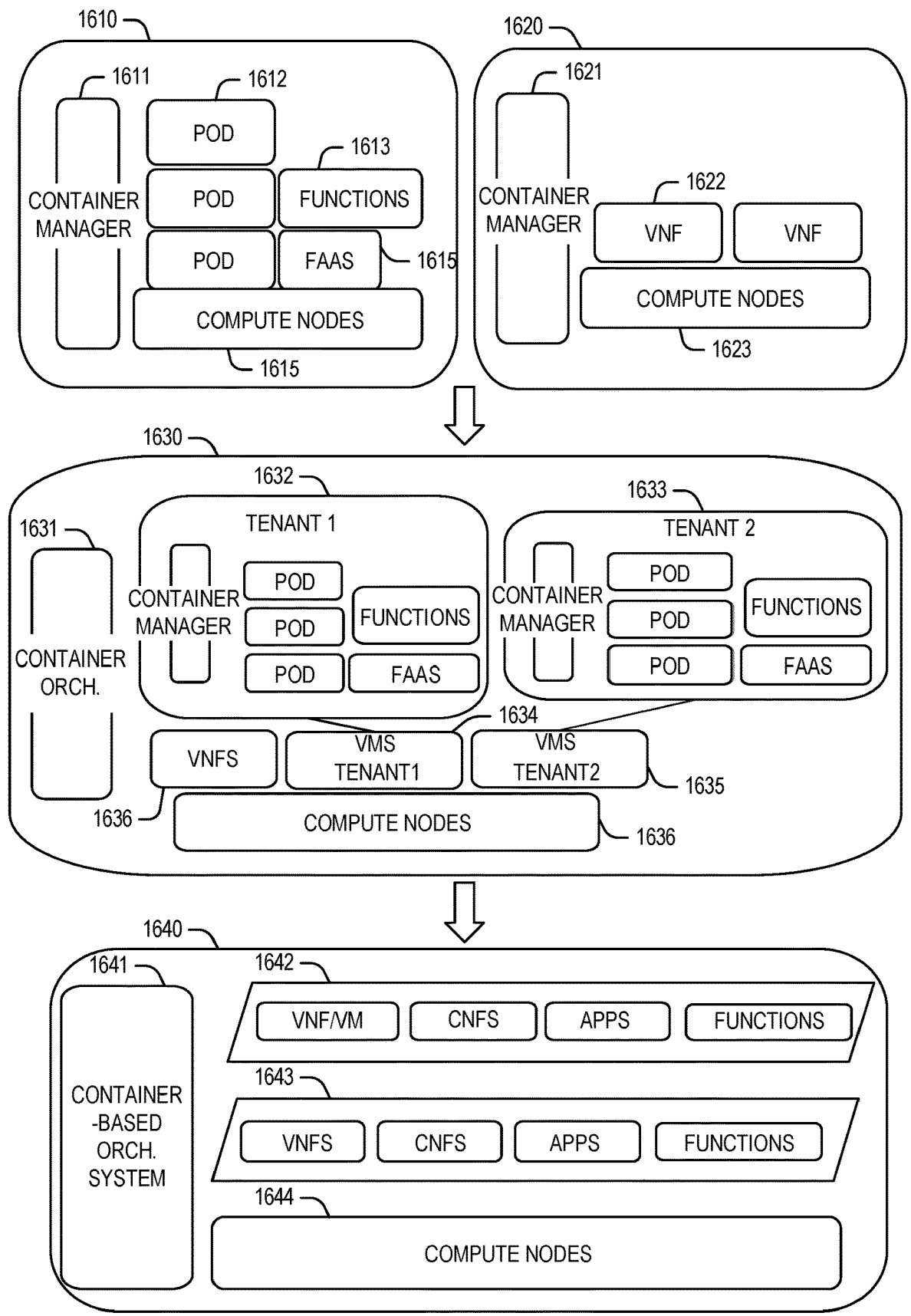
FIG. 16 illustrates various compute arrangements deploying containers in an edge computing system.

FIG. 16 illustrates various compute arrangements deploying containers in an edge computing system. As a simplified example, system arrangements 1610, 1620 depict settings in which a container manager (e.g., container managers 1611, 1621, 1631) is adapted to launch containerized pods, functions, and functions-as-a-service instances through execution via compute nodes (1615 in arrangement 1610), or to separately execute containerized virtualized network functions through execution via compute nodes (1623 in arrangement 1620). This arrangement is adapted for use of multiple tenants in system arrangement 1630 (using compute nodes 1636), where containerized pods (e.g., pods 1612), functions (e.g., functions 1613, VNFs 1622, 1636), and functions-as-a-service instances (e.g., FaaS instance 1615) are launched within virtual machines (e.g., VMs 1634, 1635 for tenants 1632, 1633) specific to respective tenants (aside the execution of virtualized network functions). This arrangement is further adapted for use in system arrangement 1640, which provides containers 1642, 1643, or execution of the various functions, applications, and functions on compute nodes 1644, as coordinated by a container-based orchestration system 1641.

The system arrangements of depicted in FIGS. 15-16 provide an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 16, the container manager, container orchestrator, and individual nodes may provide an LSM or other security enforcement point. However in either of the configurations of FIGS. 15-16, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by Edge owners to enforce tenancy. Other isolation environments may include: bare metal (dedicated) equipment, virtual machines, containers, virtual machines on containers, or combinations thereof. Functions, such as those provided in a FaaS environment, discussed further below, may run in any of these isolation environments to enforce tenant boundaries.

Edge Security

In further examples, advanced methods of security and privacy procedures may be extended to a variety of edge computing settings.

Implicit Attestation Examples

Performance agreements, such as service level agreements (SLAs) or tenant SLAs often include an assumption upon which requirements are made—which may include legal or financial implications—regarding how services are supplied or how tenant (e.g., subscriber) data will be protected. Multi-stakeholder edge environments may have several, and evenly remotely associated, interested parties. Implicit attestation may be used by edge stakeholders to attest to these and other relevant service provider SLA terms.

Implicit attestation, in the following examples, may be accomplished by using a Device Identifier Composition Engine (DICE) architecture. Here, for example, workload specific signing keys may be derived that include the SLA terms in an attestation profile. The DICE signing key derivation may be particularly useful to enable edge deployments to scale in capability as well as in multi-tenant hosting. A third-party verifiable assertion of a service completion per the SLA may become an important element in these multi-party interactions, such as billing, network monitoring, quality of service (QoS) evaluations, etc.

To implement an implicit attestation with an SLA profile, a workload may be executed in a tenant enclave, container, or other tenant isolated environment, which may be implemented on a trusted computing base (TCB) or other trusted computing hardware arrangement. The hosting environment may derive a workload specific attestation key. Part of this derivation includes computing a compound device identity (CDI). In an example, the CDI calculation includes an expected trustworthiness parameter taken from an SLA. For example, an edge consortium and testing facility may examine hosting platforms for security, safety, or privacy protection capabilities and issue a compliance statement based on the examination. An SLA may require a specified level of compliance or that the level of compliance requires proof or verification as part of workload execution. When the workload executes in a tenant environment, the tenant environment may request a workload specific attestation key from the root-of-trust (RoT) or TCB layer. The RoT or TCB computes the key for a next layer n where n identifies the tenant environment hosting the workload. In an example, the layer n CDI is computed by hashing a current TCB context (CTC) with the compliance certificate identified by the SLA. The attestation key is used to sign the workload results (and, potentially the telemetry from the execution), thereby implicitly attesting the compliance status of the workload execution.

Figure 17:
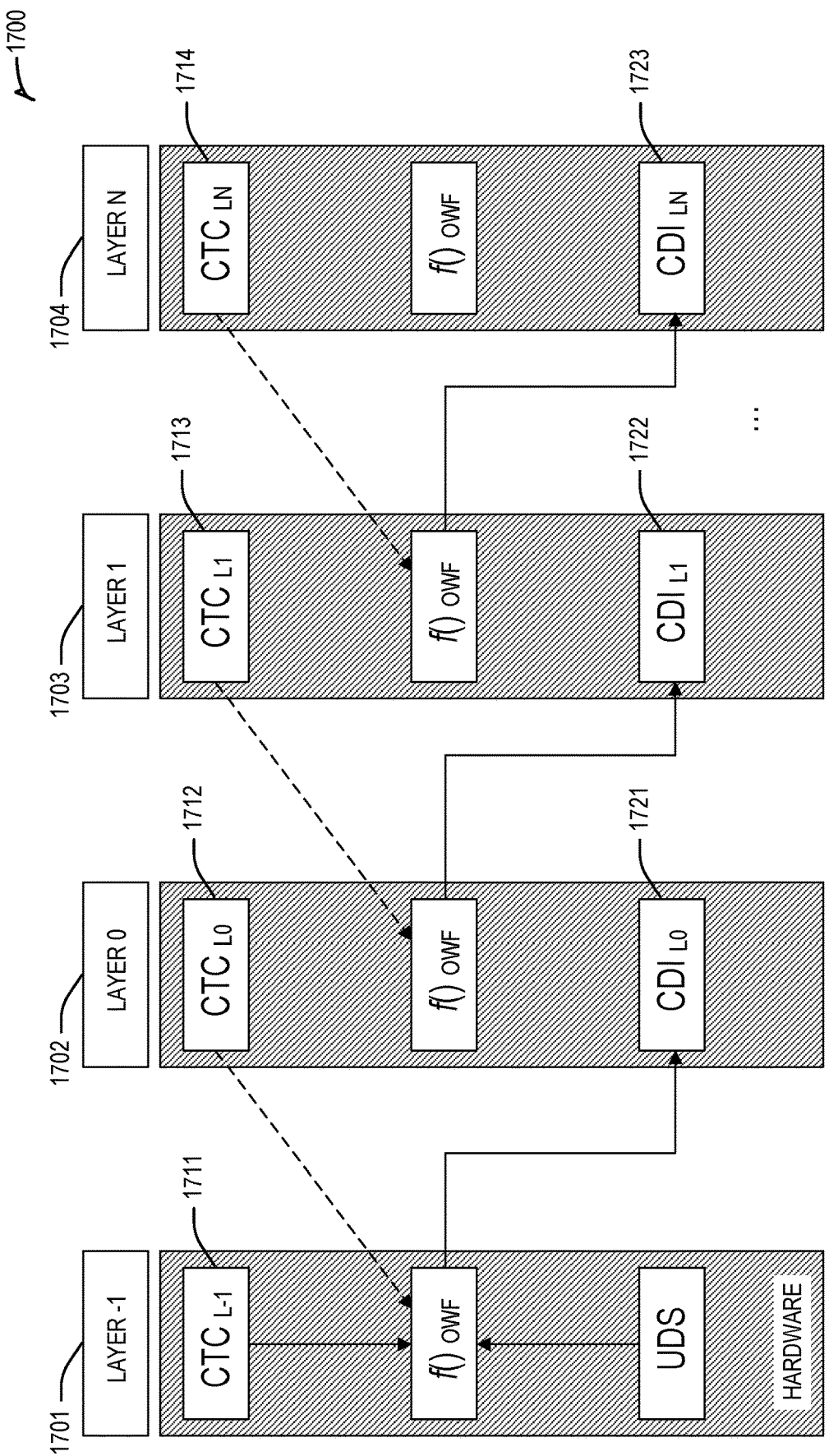
FIG. 17 illustrates an example of an architecture with a Device Identifier Composition Engine (DICE) layering and compound device identity (CDI) computation.
Figure 18:
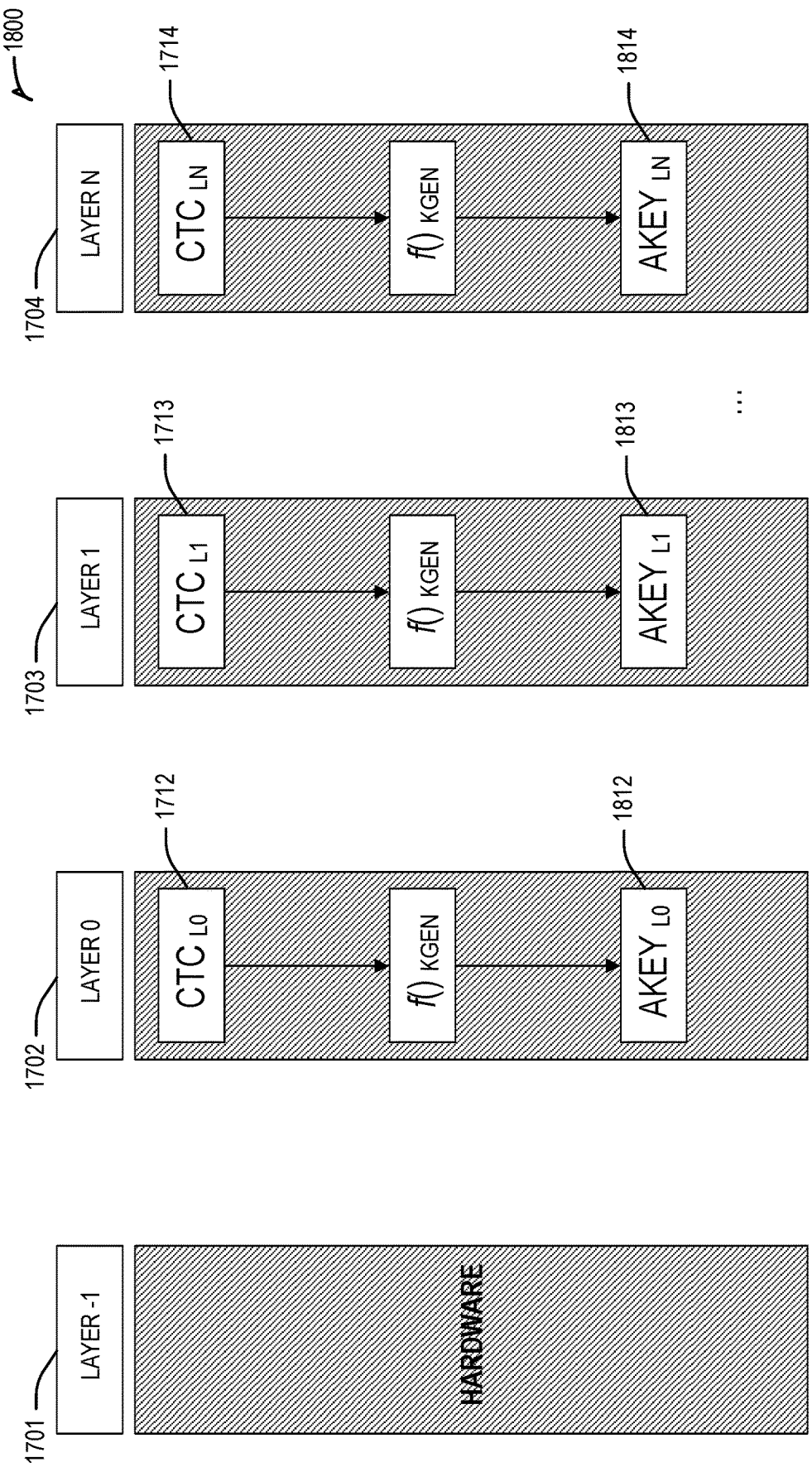
FIG. 18 illustrates an example of an architecture with DICE layering using asymmetric key generation.

FIG. 17 illustrates an example of CDI computation 1700 with respect to DICE layers 1701, 1702, 1703, 1704. As illustrated, a layer's CTC 1711, 1712, 1713, 1714 is computed by an attesting layer and returned as a CDI 1721, 1722, 1723. This is contrasted to FIG. 18, depicting computation 1800 in which an asymmetric key 1812, 1813, 1814 is computed for the CTC 1711, 1712, 1713, 1714 by each layer. In FIG. 18, there is no cross-layer validation of the CTC.

Figure 19:
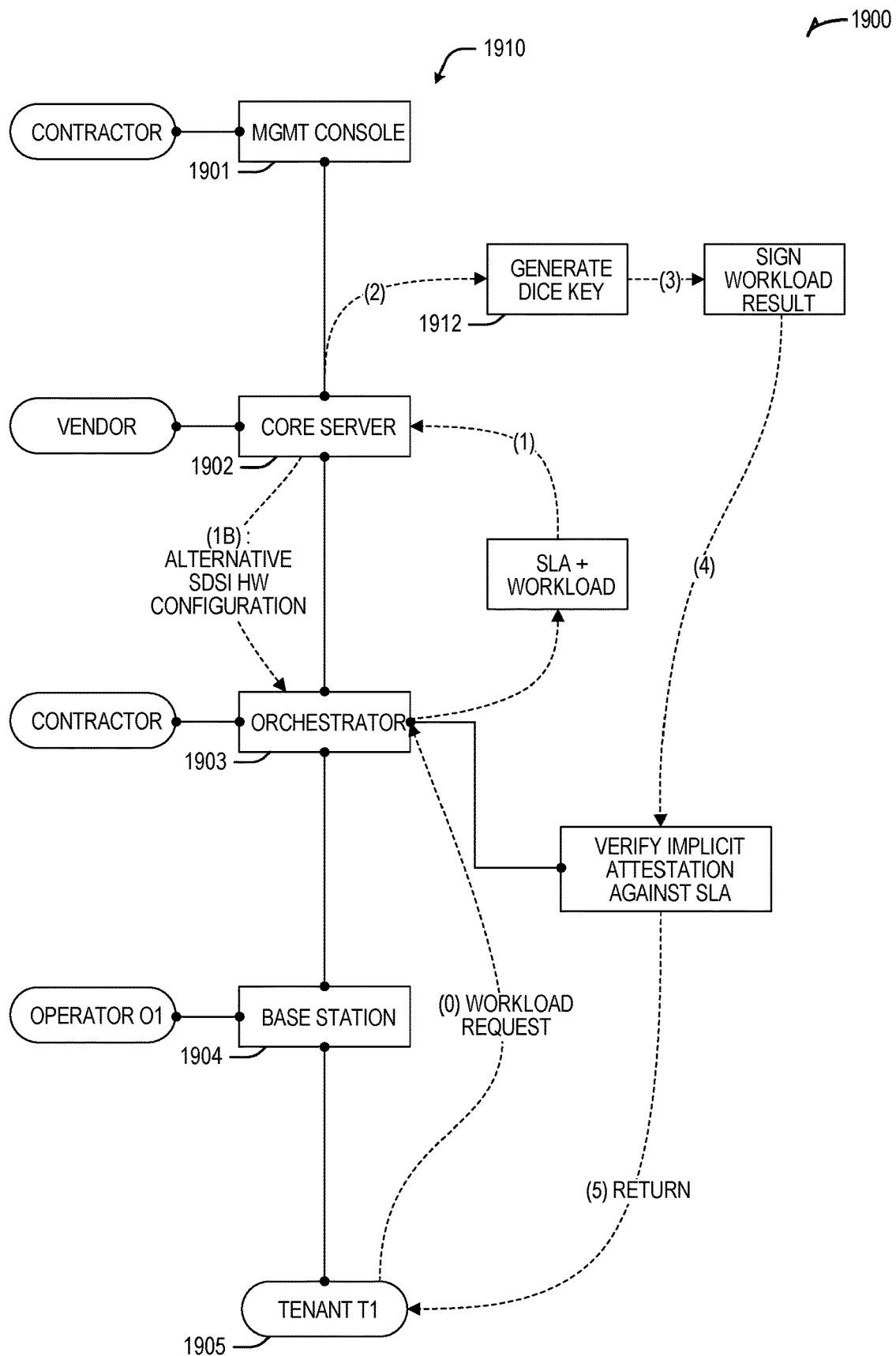
FIG. 19 illustrates an example of a flow for implicit attestation of SLA parameters using DICE layering to generate workload specific attestation keys.

FIG. 19 illustrates a data flow 1900 through edge computing entities 1910 (e.g., console 1901, core server 1902, orchestrator 1903, base station 1904, tenant 1905) that are using implicit attestation of SLA parameters using DICE layering to generate a workload specific attestation key. Within FIG. 19, specific data flow operations are depicted; but it will be understood that other variations and sequences of operations may be applied within this framework. In an example, the core server 1902 or the base station 1904 may include general processors or other system-on-a-chip (SoC) components. In an example, these entities may also include accelerator hardware. In an example, the accelerators are installed directly on the platform (e.g., SoC, mother board, etc.) or accessible via a platform bus (e.g., add in a peripheral component interconnect express (PCIe) card for crypto, AI, field programmable gate array (FPGA) etc.).

In the context of FIG. 19, the DICE key 1912 may provide an LSM enforcement point. DICE key generation can include LSM context such that only an LSM specific key will exist. If the LSM changes the node is incapable of participating with other nodes expecting the LSM specific key. Additionally, orchestrators (such orchestrator 1903) can provision attestation LSMs to attestation verifiers, and Attestation verifier operates as an LSM enforcement point, whether tied to a DICE-LSM key or other key. For instance, an LSM can describe acceptable or unacceptable attestation values.

In some scenarios, specific attributes of the SLA may be secret or obscured. If SLA values are not to be revealed by the workload itself, then the workload should not reveal it has an SLA of, for instance, thirty gigabits (Gbps) of the input-output (I/O) Ethernet bandwidth. In such a scenario, the signed SLA may provide a normalized value with respect to the registered SLA. For example, the normalized value merely indicates that the SLA was satisfied, rather than reporting the metrics or measurements that led to the determination that the SLA was satisfied. In an example, the normalized value may indicate the metric in a way that does not reveal the metric. Thus, for example, the normalized value may be a percent of the SLA value, such as showing that the SLA is satisfied with 110% (e.g., 35 Gbps) or 90% (e.g., 28 Gbps).

In deployment scenarios where the tenant workload is executing on compute core(s) together with one or more accelerator slices, virtual functions, or physical functions, the workload specific attestation key derivation may include specific SLA parameters of the accelerators or functions. For instance, for a smart network interface controller (Smart-NIC), the SLA parameters may include throughput delivered, number of virtual queues, number of security associations, etc. For an, artificial intelligence (AI) accelerator, the SLA parameters may include model storage size, execution units, or dedicated runtime memory among others. In such cases the CDI may be derived using the accelerator specific parameters.

The implicit attestation described herein may be particularly useful for SLA parameters that are common or apply across a broad set of use cases. This usefulness results because any change to the parameters invalidates the attestation key, requiring re-deployment or re-onboarding of the device or service. Thus, if a component service provider (CSP) requires an operator to run a security protocol (e.g., Cerberus), then access to the tenant environment would be denied unless an attacker could also break the DICE key without modifying the platform, all while achieving the SLA requirements.

In still further examples, the implicit attestation examples may be applied for different domains or types of trust, or for the use of different levels of required trust. As a result, many scenarios of attestation may be applied for data or derivative properties.

Attestation Edge Name Service Examples

Edge cloud infrastructures may be used to scale attestation data across the globe. Previous approaches for attestation have been based on software solutions and discovering mechanisms which are exposed by various software stacks. One limitation with these previous approaches is that when low latency discovery and resource selection mechanisms are needed, some accelerated or infrastructure acceleration schemes are required. The following techniques, applicable in an edge computing system, provide a name-based access to discover resources or provide SLAs. These resources or SLAs may be registered to each of the hierarchical domains to receive callbacks when changes happen in a level of the architecture. The respective tiers and resource properties may be certified by a group of edges using blockchain, in an example.

Edge attestation is used to determine the best ways to discover and trust service deployments within edge architectures. Edge Attestation Name Service (EANS) techniques may be used to build a global view of where thousands of service providers and dependent resources may be located (e.g., topographically, geographically, or lexographically, such as for ICNs). Location information may be used to help predict expected access latency. In various examples, the respective services may be associated with different level of attestation or trust depending on how the different entities of the edge validate or provide a value of trust to each service. Further, such services may be associated with entities that are globally trusted to provide a level of attestation to services.

The following techniques provide a registration service, resembling a Domain Name Service (DNS), but as configured to be applied to edge architectures. For example, a set of distributed ledgers are responsible to deploy monitoring and attestation software elements in the respective distributed edges. These monitoring elements may be used to track services, such as when a particular service is executed.

Figure 20:
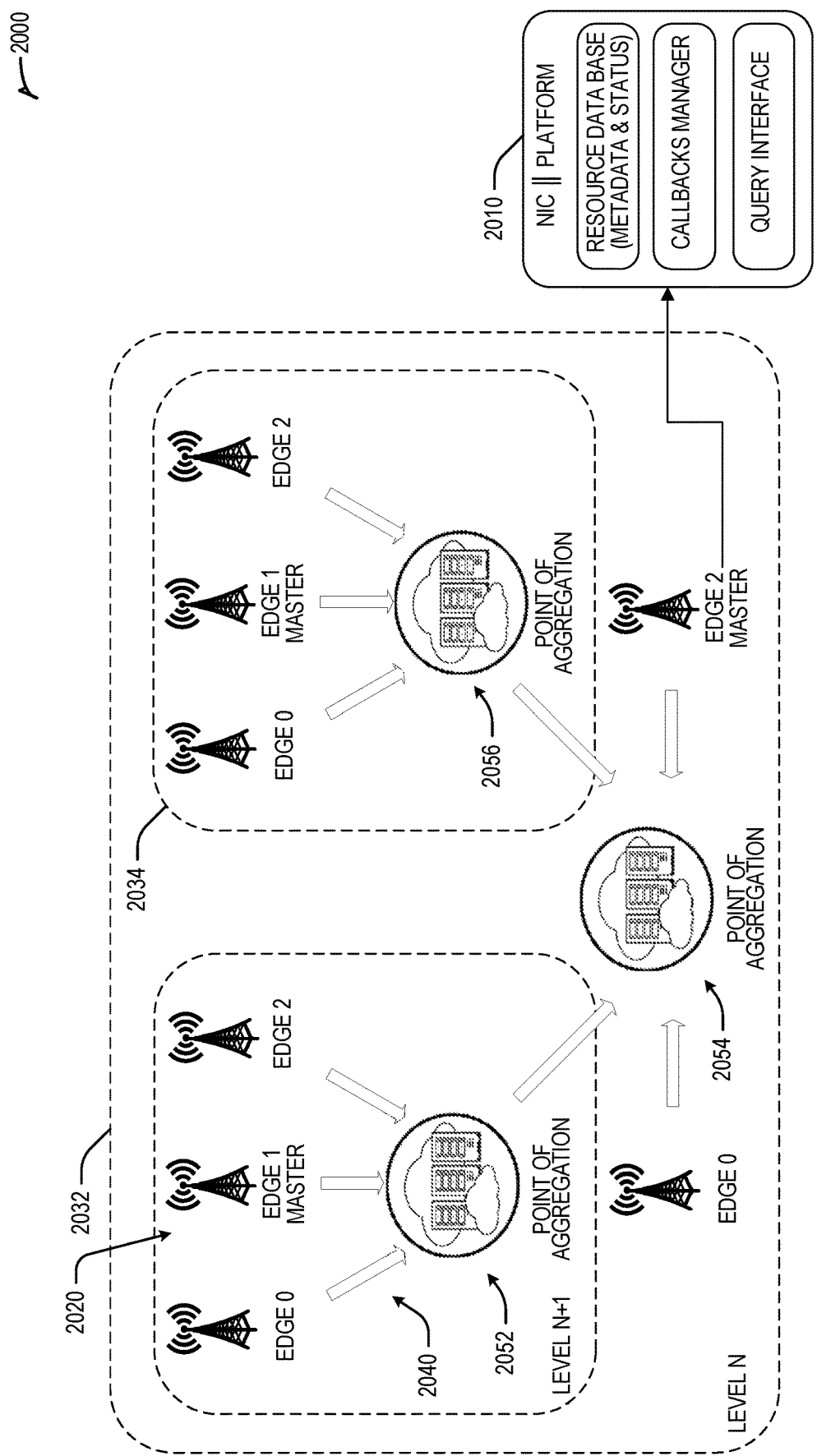
FIG. 20 illustrates a system providing an Edge Attestation Name Service (EANS) architecture.

FIG. 20 illustrates a system providing an Edge Attestation Name Service (EANS) architecture 2000. The EANS architecture 2000 is shown in FIG. 20 with example nodes 2020, levels 2032, 2034, connections 2040, and aggregation points 2052, 2054, 2056, but the EANS may be used with other architectures, setups, or components as well.

The EANS architecture 2000 may describe nodes, EANS providers, devices, etc. For example, a Master EANS node may be a starting point for vetting the trust of subordinate EANS nodes. This hierarchy may be used to support dynamic or elastic deployment of an EANS system.

The EANS may provide a set of distributed ledger services to monitor and attest hardware or software computing resources accessible via edge access networks or edge core networks. EANS providers may be responsible for tracking each service that executes within an edge network. Information tracked may include individual or particular sets of computational resources, firmware or software deployed to or executing on computational resources, workloads with a particular set of SLAs or their location, tenant (e.g., subscriber) identities (e.g., cryptographic keys used to authenticate) or their location, intrinsic trustworthiness attributes that are ascribed to tracked resources, other policy restrictions, or the like.

The EANS monitoring elements may be responsible for certification or propagation of monitored information to a hierarchical information system. For example, a system organized hierarchically following the edge architecture's north-south hierarchy. In an example, a device or edge system (e.g., platform 2010) that wants to execute something in the edge system architecture may make a specific query for a particular service, which may be provided by a particular service provider under particular circumstances, and optionally validate the actual expected performance and service quality attested by the overall edge system. The specific query may include an EANS address or name.

In an example, the EANS architecture 2000 may include more information than just directory infrastructure type information (e.g., the information may also include attestable claims). For example, the EANS architecture 2000 may include data such as telemetry, resources, IP addresses, or the like. This information may be passed in response to a query or selected information may be passed, for example, according to parameters of the query.

In an example, virtual domains may be created dynamically, for example within a hierarchy. In another example, virtual domains may use different topologies other than the hierarchy shown in FIG. 20. The virtual domains may include a set of trusted entities which are responsible to attest or validate any resource data that is changed at the domain (e.g., new resource, change on status, etc.). When new data is attested, then the data may be propagated to a master EANS which is responsible for performing callbacks to peers in case of subscription to the current domain. In another example, the master EANS may update a local repository of meta-data.

In an example, data or attributes contained in the repository may be attested data. In another example, the data may be known to be correct and may be compared to attested data to determine its validity and relevance.

A further technique for EANS architecture support may include the following operations. The technique includes a first operation to receive, for example at a master edge device, a query, from a device, for information about a service in an edge architecture. The technique includes a second operation to, in response to the query, access (for example at the master edge device) Edge Attestation Name Services (EANS) data in a repository.

The technique includes a third operation to send, for example to the device from the master edge device, a response to the query, the response including attestation data for the service and at least one of an address or a name of an edge device providing the service. The response may include certification or propagation of monitored information for the service. The response may include location information for the edge device providing the service (e.g., for latency). The location information may include the address or may include additional information (e.g., a shortest path time). In an example, the attestation data is stored in the repository at the master edge device.

In an example, the device and the master edge device share a level within the edge architecture. In an example, the edge device providing the service is in a different virtual domain than the master edge device within the edge architecture. In this example, the operation may include identifying a second master edge device on a lower level of the edge architecture. The technique may further include receiving the attestation data for the service and the at least one of the address or the name from the second master edge device.

Attestation-Aware SLAs Using Acceleration

One of the challenges in a distributed architecture is how to perform administrative tasks such as attestation and service level agreement tasks on varying hardware that may have limited resources. For example, a field programmable gate array (FPGA) may be configured to perform a specific processing task and may not include traditional processing components to perform administrative tasks efficiently. However, the FPGA may be in the best position to perform the administrative tasks. The following configurations and techniques provide the FPGA with instruction sets (e.g., via an instruction set architecture (ISA), etc.) needed to perform the administrative tasks locally with increased efficiency.

SLAs and Attestation procedures in edge settings (e.g., within the edge services and functions depicted and described with relation to FIGS. 14-16) may be non-static dynamic functions or more generally, "code" that must be executed to define the actual constraints which then need to be satisfied. For a general-purpose processor (e.g., central processing unit (CPU)), this may not be an issue because executing code is what a CPU is designed to do. Usually, executing a policy representation is a small fraction of the overall time it takes to perform the function that is governed by the policy. However, an FPGA may be configured for a specific processing task and SLA and Attestation overhead may burden the FPGA and reduce efficiency. To combat the issue of SLA and Attestation tasks overburdening the FPGA a micro instruction set architecture (ISA) emulator may be implemented to simulate a CPU and thus perform any SLA or attestation process in the emulator (e.g., a very constrained but general-purpose instruction execution unit) for performing a reasonable set of currying functions that represent SLA evaluation and attestation protocols. A tiny ISA is sufficient to offload the SLA tasks from the main processing flow of the FPGA.

In some embodiments, for SDSi-aware hardware, the configuration and attestation features may be performed when the hardware is in a mutex state/mode that only allows configuration/re-configuration (and not general purpose execution), and then when a mutex switches state, it may only allow execution of a workload (but may still allow attestation code in separable Attesting Environments such as in a DICE layering architecture) but may not allow SDSi hardware re-configuration.

Figure 21:
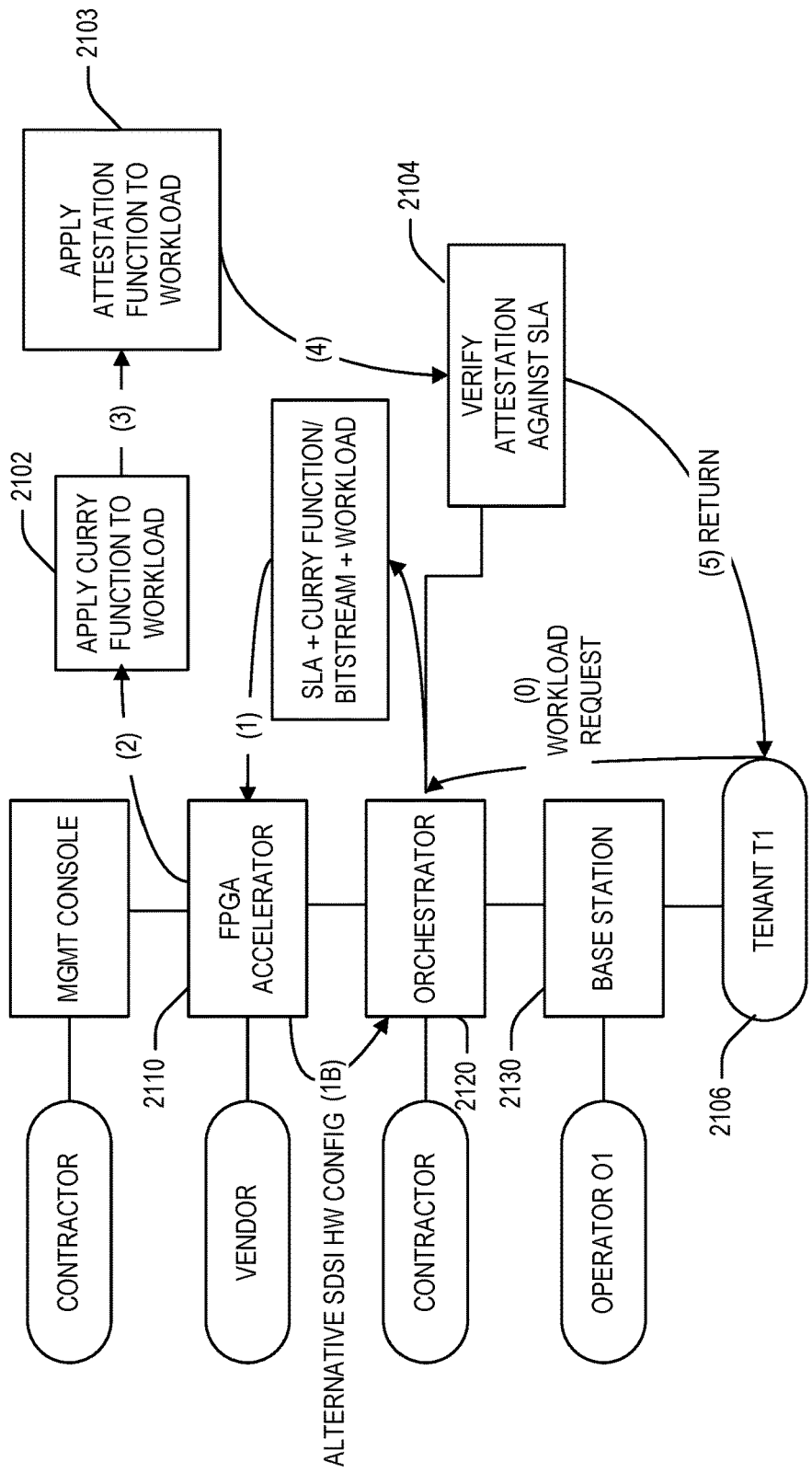
FIG. 21 illustrates a system diagram for an edge architecture showing an accelerator that accepts a curry function and a workload.

FIG. 21 illustrates a system 2100 for an edge architecture, including a Field Programmable Gate Array (FPGA) accelerator 2110 that accepts a curry function (e.g., represented by a bitstream) as well as a workload that executes using the bitstream and a service level agreement (SLA) that describes attestation requirements. In other examples, other types of hardware accelerators may be utilized with these techniques.

In an example process sequence, a tenant 2106 may request a workload from an orchestrator 2120 (e.g., via a base station 2130 or other edge node) at process (0). The orchestrator 2120 may supply an SLA, curry function(s), and a workload at process (1). The FPGA 2110 may install bitstreams/curry functions and may process the workload 2102 at process (2). The FPGA 2110 may apply an attestation curry function that, for example, signs the workload 2103 at process (3). In an example, the FPGA 2110 may have an out of band connection that goes into a trusted server that may validate the bitstream. This may be beneficial in situations where the FPGA 2110 cannot validate the bit stream itself. The orchestrator 2120 verifies attestation 2104 according to SLA requirements at process (4). A workload result is returned to the tenant 2106 at process (5). In further examples, the entity that validates the SLA may be an orchestrator 2120 or another management entity. This may happen in situations where multiple orchestrators belong to the same edge appliance (and the edge appliance is partitioned for multiple tenants). In other examples, the process sequence and the sequence or type of operations may be varied.

The FPGA 2110 can be an LSM enforcement point by obtaining an LSM that describes acceptable or unacceptable curry functions; workload context; or tenant context. Likewise, an orchestrator 2120 could provision LSMs dynamically to LSM enforcement points.

In an example, the attestation function may be embedded in the FPGA 2110 or may be dynamically loaded as a bitstream. If the attestation function is loaded dynamically, a layering architecture (e.g., Device Identifier Composition Engine (DICE), etc.) could be applied to dynamically extend the trust that pre-exists as embedded layers in the FPGA 2110. If the embedded layer is layer 1 then the dynamic attestation bitstream may be linked in as layer 2. A layer 2 attestation key may be generated. The curry function/bitstream may be dynamically added as layer 3. The layer 2 attestation component may hash the layer 3 bitstream as part of the layer 2 device id (e.g., composite device identifier (CDI), etc.) computation. Layer 2 may compute an attestation key and sign the layer 3 results that are passed to layer 2. Alternatively, layer 3 might compute an attestation key and sign the results directly.

There is a possibility that for some reason the FPGA 2110 does not have enough information to perform the attestation. In such a case, the architecture may be expanded by having an out of band secured connection to a trusted server that may perform the attestation and provide the result to the curry function (e.g., delegated curry functions, etc.). Thus, the attestation key may be protected using protection techniques known only to the attestation bitstream provider. The layer 3 bitstream provider may not wish to incorporate attestation functions because this may involve added licensing fees.

SLAs may function like applets or curry functions that provide processing instructions to the FPGA 2110 (e.g., run this bitstream within these parameters and output the result, etc.). The attestation-aware SLA may check an attestation manifest. The SLA may install a bitstream image and may need access to the image. The SLA may be used to describe to the embedded layer 1 system how to accommodate the curry functions for attestation and workload processing. Each bitstream may include or be associated with a UUID, in order to ensure an attested bitstream or binary refers to a unique instance and can be always referenced.

The way in which the SLA is used to accommodate the curry functions may itself contribute to the attestable assertions. For example, the layer 1 CDI may include a hash of the SLA that is then supplied to layer 2. Thus, the FPGA 2110 may be provided with functionality to perform attestation and SLA related tasks without the need for general purpose processing functionality.

In further examples, attestation data includes a timestamp that can be used to attest when the attestation is performed. This may include use of a time stamp that is concatenated to a random number, to ensure that the attestation was not faked or re-used from the past.

Example Computing Systems, Platforms, and Devices

FIG. 22 illustrates an example of infrastructure equipment 2200 in accordance with various embodiments. The infrastructure equipment 2200 (or "system 2200") may be implemented as a base station, radio head, access network node (e.g., the edge nodes 1230 shown and described previously), MEC servers 1236, server(s) 1250, and/or any other element/device discussed herein. In other examples, the system 2200 could be implemented in or by an intermediate node 1220 or endpoint 1210.

The system 2200 includes application circuitry 2205, baseband circuitry 2210, one or more RFEMs 2215, memory circuitry 2220, PMIC 2225, power tee circuitry 2230, network controller circuitry 2235, network interface connector 2240, positioning circuitry 2245, and user interface 2250. In some embodiments, the device 2200 may include additional elements such as, for example, memory/storage, display, camera, sensor, or I/O interface. In other embodiments, the components described below may be included in more than one device. For example, said circuitries may be separately included in more than one device for CRAN, vBBU, or other like implementations.

Application circuitry 2205 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose I/O, memory card controllers such as Secure Digital (SD) MultiMediaCard (MMC) or similar, USB interfaces, Mobile Industry Processor Interface (MIPI) interfaces and Joint Test Access Group (JTAG) test access ports. The processors (or cores) of the application circuitry 2205 may be coupled with or may include memory/storage elements and may be configured to execute instructions stored in the memory/storage to enable various applications or operating systems to run on the system 2200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2205 may include, for example, one or more processor cores, CPUs, application processors, GPUs, RISC processors, one or more Acorn RISC Machine (ARM) processors, CISC processors, one or more DSPs, one or more FPGAs, one or more PLDs, one or more ASICs, one or more microprocessors or controllers, or any suitable combination thereof. In some embodiments, the application circuitry 2205 may comprise, or may be, a special-purpose processor/controller to operate according to the various embodiments herein. As examples, the processor(s) of application circuitry 2205 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 2200 may not utilize application circuitry 2205, and instead may include a special-purpose processor/controller to process IP data received from an EPC or 5GC, for example.

In some implementations, the application circuitry 2205 may include one or more hardware accelerators, which may be microprocessors, programmable processing devices, or the like. The one or more hardware accelerators may include, for example, computer vision and/or deep learning accelerators. As examples, the programmable processing devices may be one or more FPGAs; programmable logic devices PLDs such as CPLDs, HCPLDs, and the like; ASICs such as structured ASICs and the like; programmable SoCs; and/or the like. In such implementations, the circuitry of application circuitry 2205 may comprise logic blocks or logic fabric, and other interconnected resources that may be programmed to perform various functions, such as the procedures, methods, functions, etc. of the various embodiments discussed herein. In such embodiments, the circuitry of application circuitry 2205 may include memory cells (e.g., EPROM, EEPROM, flash memory, static memory (e.g., SRAM, anti-fuses, etc.)) used to store logic blocks, logic fabric, data, etc. in look-up-tables (LUTs) and the like.

In some implementations, such as implementations where subsystems of the edge nodes 1230, intermediate nodes 1220, and/or endpoints 1210 of FIG. 12 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 2205 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 2210 may be implemented, for example, as a solder-down substrate including one or more integrated circuits, a single packaged integrated circuit soldered to a main circuit board or a multi-chip module containing two or more integrated circuits. The baseband circuitry 2210 includes one or more processing devices (e.g., baseband processors) to carry out various protocol and radio control functions. Baseband circuitry 2210 may interface with application circuitry of system 2200 for generation and processing of baseband signals and for controlling operations of the RFEMs 2215. The baseband circuitry 2210 may handle various radio control functions that enable communication with one or more radio networks via the RFEMs 2215. The baseband circuitry 2210 may include circuitry such as, but not limited to, one or more single-core or multi-core processors (e.g., one or more baseband processors) or control logic to process baseband signals received from a receive signal path of the RFEMs 2215, and to generate baseband signals to be provided to the RFEMs 2215 via a transmit signal path. In various embodiments, the baseband circuitry 2210 may implement a RTOS to manage resources of the baseband circuitry 2210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 22, in one embodiment, the baseband circuitry 2210 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 2215 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 2215 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 2210 and/or RFEMs 2215. The baseband circuitry 2210 may also support radio communications for more than one wireless protocol.

Continuing with the aforementioned embodiment, the baseband circuitry 2210 includes individual processing device(s) to implement PHY including HARQ functions, scrambling and/or descrambling, (en)coding and/or decoding, layer mapping and/or demapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include FFT, precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 2250 may include one or more user interfaces designed to enable user interaction with the system 2200 or peripheral component interfaces designed to enable peripheral component interaction with the system 2200. User interfaces may include, but are not limited to, one or more physical or virtual buttons (e.g., a reset button), one or more indicators (e.g., LEDs), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a USB port, an audio jack, a power supply interface, etc.

The RFEMs 2215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 2215, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 2210 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 2220 may include one or more of volatile memory including DRAM and/or SDRAM, and nonvolatile memory including high-speed electrically erasable memory (commonly referred to as Flash memory), PRAM, MRAM, etc., and may incorporate the 3D crosspoint (XPOINT) memories from Intel® and Micron®. Memory circuitry 2220 may be implemented as one or more of solder down packaged integrated circuits, socketed memory modules and plug-in memory cards. The memory circuitry 2220 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 2200, an operating system of infrastructure equipment 2200, one or more applications, and/or for carrying out the embodiments discussed herein. The computational logic may be stored or loaded into memory circuitry 2220 as instructions for execution by the processors of the application circuitry 2205 to provide or perform the functions described herein. The various elements may be implemented by assembler instructions supported by processors of the application circuitry 2205 or high-level languages that may be compiled into such instructions. The permanent copy of the programming instructions may be placed into persistent storage devices of memory circuitry 2220 in the factory during manufacture, or in the field through, for example, a distribution medium (not shown), through a communication interface (e.g., from a distribution server), and/or OTA.

The PMIC 2225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 2230 may provide for electrical power drawn from a network cable to provide both power supply and data connectivity to the infrastructure equipment 2200 using a single cable.

The network controller circuitry 2235 provides connectivity to a network using a standard network interface protocol such as Ethernet, Ethernet over GRE Tunnels, Ethernet over MPLS, or some other suitable protocol, such as those discussed herein. Network connectivity may be provided to/from the infrastructure equipment 2200 via network interface connector 2240 using a physical or wired connection, such as electrical (e.g., a "copper interconnect"), optical (e.g., fiber optic), and/or any other type of conductive/transmissive physical communication medium, or using a wireless connection, such as electromagnetic and/or radio frequency (RF) transmissions.

The network controller circuitry 2235 may include one or more dedicated processors and/or FPGAs to communicate using one or more of the aforementioned protocols. In some implementations, the network controller circuitry 2235 may include multiple controllers to provide connectivity to other networks using the same or different protocols. In various embodiments, the network controller circuitry 2235 enables communication with associated equipment and/or with a backend system (e.g., server(s) 1230 of FIG. 12), which may take place via a suitable gateway device.

The positioning circuitry 2245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2245 may include a Micro-Technology for Positioning, Navigation, and Timing (Micro-PNT) IC that uses a master timing clock to perform position tracking/estimation without GNSS assistance. The positioning circuitry 2245 may also be part of, or interact with, the baseband circuitry 2210 and/or RFEMs 2215 to communicate with the nodes and components of the positioning network. The positioning circuitry 2245 may also provide position data and/or time data to the application circuitry 2205, which may use the data to synchronize operations with various other infrastructure equipment, or the like. Additionally, when a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In ITSC implementations, the facilities layer of the road side ITS-S includes an ITS-S positioning service facility that provides and updates the geographical positioning of the ITS-S and/or other ITS-Ss in real time. Any of the aforementioned positioning technologies can be used to determine in real time the geographic position, with variable accuracy level for road safety ITS applications. In these implementations, the ITS-S positioning service facility may operate the positioning augmentation technology The components shown by FIG. 22 may communicate with one another using interface circuitry 2206 or IX 2206, which may include any number of bus and/or IX technologies such as ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

FIG. 23 illustrates an example of a computing platform 2300 (also referred to as "system 2300," "device 2300," "appliance 2300," or the like) in accordance with various embodiments. In embodiments, the platform 2300 may be suitable for use as intermediate nodes 1220, endpoints 1210, and/or IoT devices 1211 of FIG. 12, and/or any other element/device discussed herein with regard any other figure shown and described herein. Platform 2300 may also be implemented in or as a server computer system or some other element, device, or system discussed herein. The platform 2300 may include any combinations of the components shown in the example. The components of platform 2300 may be implemented as integrated circuits (ICs), portions thereof, discrete electronic devices, or other modules, logic, hardware, software, firmware, or a combination thereof adapted in the computer platform 2300, or as components otherwise incorporated within a chassis of a larger system. The example of FIG. 23 is intended to show a high level view of components of the computer platform 2300. However, some of the components shown may be omitted, additional components may be present, and different arrangement of the components shown may occur in other implementations.

The platform 2300 includes processor circuitry 2302. The processor circuitry 2302 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI)

interfaces and Joint Test Access Group (JTAG) test access ports. In some implementations, the processor circuitry 2302 may include one or more hardware accelerators 2362, which may be microprocessors, programmable processing devices (e.g., FPGA, ASIC, etc.), or the like. The one or more hardware accelerators 2362 may include, for example, computer vision and/or deep learning accelerators. In some implementations, the processor circuitry 2302 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 2302 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radiofrequency integrated circuits (RFIC), one or more microprocessors or controllers, or any suitable combination thereof. The processors (or cores) of the processor circuitry 2302 may be coupled with or may include memory/storage and may be configured to execute instructions stored in the memory/storage to enable various applications or operating systems to run on the platform 2300. In these embodiments, the processors (or cores) of the processor circuitry 2302 is configured to operate application software to provide a specific service to a user of the platform 2300. In some embodiments, the processor circuitry 2302 may be a special-purpose processor/controller to operate according to the various embodiments herein.

As examples, the processor circuitry 2302 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 2302 may be a part of a system on a chip (SoC), System-in-Package (SiP), a multi-chip package (MCP), and/or the like, in which the processor circuitry 2302 and other components are formed into a single integrated circuit, or a single package, such as the Edison™ or Galileo™ SoC boards from Intel® Corporation. Other examples of the processor circuitry 2302 are mentioned elsewhere in the present disclosure.

Additionally or alternatively, processor circuitry 2302 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 2302 may comprise logic blocks or logic fabric including and other interconnected resources that may be programmed to perform various functions, such as the procedures, methods, functions, etc. of the various embodiments discussed herein. In such embodiments, the circuitry of processor circuitry 2302 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 2302 may communicate with system memory circuitry 2304 over an interconnect 2306 (e.g., a bus). Any number of memory devices may be used to provide for a given amount of system memory. As examples, the memory circuitry 2304 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 2304 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 2304 may also comprise persistent storage devices, which may be temporal and/or persistent storage of any type, including, but not limited to, non-volatile memory, optical, magnetic, and/or solid state mass storage, and so forth.

The individual memory devices of memory circuitry 2304 may be implemented as one or more of solder down packaged integrated circuits, socketed memory modules, and plug-in memory cards. The memory circuitry 2304 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. In embodiments, the memory circuitry 2304 may be disposed in or on a same die or package as the processor circuitry 2302 (e.g., a same SoC, a same SiP, or soldered on a same MCP as the processor circuitry 2302).

To provide for persistent storage of information such as data, applications, operating systems (OS), and so forth, a storage circuitry 2308 may also couple to the processor circuitry 2302 via the interconnect 2306. In an example, the storage circuitry 2308 may be implemented via a solid-state disk drive (SSDD). Other devices that may be used for the storage circuitry 2308 include flash memory cards, such as SD cards, microSD cards, xD picture cards, and the like, and USB flash drives. In low power implementations, the storage circuitry 2308 may be on-die memory or registers associated with the processor circuitry 2302. However, in some examples, the storage circuitry 2308 may be implemented using a micro hard disk drive (HDD). Further, any number of new technologies may be used for the storage circuitry 2308 in addition to, or instead of, the technologies described, such resistance change memories, phase change memories, holographic memories, or chemical memories, among others.

The storage circuitry 2308 store computational logic 2383 (or "modules 2383") in the form of software, firmware, or hardware commands to implement the techniques described herein. The computational logic 2383 may be employed to store working copies and/or permanent copies of computer programs, or data to create the computer programs, for the operation of various components of platform 2300 (e.g., drivers, etc.), an OS of platform 2300 and/or one or more applications for carrying out the embodiments discussed herein. The computational logic 2383 may be stored or loaded into memory circuitry 2304 as instructions 2382, or data to create the instructions 2382, for execution by the processor circuitry 2302 to provide the functions described herein. The various elements may be implemented by assembler instructions supported by processor circuitry 2302 or high-level languages that may be compiled into such instructions (e.g., instructions 2370, or data to create the instructions 2370). The permanent copy of the programming instructions may be placed into persistent storage devices of storage circuitry 2308 in the factory or in the field through, for example, a distribution medium (not shown), through a communication interface (e.g., from a distribution server (not shown)), or over-the-air (OTA).

In an example, the instructions 2382 provided via the memory circuitry 2304 and/or the storage circuitry 2308 of FIG. 23 are embodied as one or more non-transitory computer readable storage media (see e.g., NTCRSM 2360) including program code, a computer program product or data to create the computer program, with the computer program or data, to direct the processor circuitry 2302 of platform 2300 to perform electronic operations in the platform 2300, and/or to perform a specific sequence or flow of actions, for example, as described with respect to the flowchart(s) and block diagram(s) of operations and functionality depicted previously. The processor circuitry 2302 accesses the one or more non-transitory computer readable storage media over the interconnect 2306.

In alternate embodiments, programming instructions (or data to create the instructions) may be disposed on multiple NTCRSM 2360. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 2360 may be embodied by devices described for the storage circuitry 2308 and/or memory circuitry 2304. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 2383, instructions 2382, 2370 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 2300, partly on the system 2300, as a stand-alone software package, partly on the system 2300 and partly on a remote computer or entirely on the remote computer or server. In the latter scenario, the remote computer may be connected to the system 2300 through any type of network, including a LAN or WAN, or the connection may be made to an external computer (e.g., through the Internet using an Internet Service Provider).

In an example, the instructions 2370 on the processor circuitry 2302 (separately, or in combination with the instructions 2382 and/or logic/modules 2383 stored in computer-readable storage media) may configure execution or operation of a trusted execution environment (TEE) 2390. The TEE 2390 operates as a protected area accessible to the processor circuitry 2302 to enable secure access to data and secure execution of instructions. In some embodiments, the TEE 2390 may be a physical hardware device that is separate from other components of the system 2300 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 2390 may be implemented as secure enclaves, which are isolated regions of code and/or data within the processor and/or memory/storage circuitry of the system 2300. Only code executed within a secure enclave may access data within the same secure enclave, and the secure enclave may only be accessible using the secure application (which may be implemented by an application processor or a tamper-resistant microcontroller). Various implementations of the TEE 2390, and an accompanying secure area in the processor circuitry 2302 or the memory circuitry 2304 and/or storage circuitry 2308 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 2300 through the TEE 2390 and the processor circuitry 2302.

In some embodiments, the memory circuitry 2304 and/or storage circuitry 2308 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 2304 and/or storage circuitry 2308 may be divided into one or more trusted memory regions for storing applications or software modules of the TEE 2390.

Although the instructions 2382 are shown as code blocks included in the memory circuitry 2304 and the computational logic 2383 is shown as code blocks in the storage circuitry 2308, it should be understood that any of the code blocks may be replaced with hardwired circuits, for example, built into an FPGA, ASIC, or some other suitable circuitry. For example, where processor circuitry 2302 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 2304 and/or storage circuitry 2308 may store program code of an operating system (OS), which may be a general purpose OS or an OS specifically written for and tailored to the computing platform 2300. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "μC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 2300, attached to the platform 2300, or otherwise communicatively coupled with the platform 2300. The drivers may include individual drivers allowing other components of the platform 2300 to interact or control various I/O devices that may be present within, or connected to, the platform 2300. For example, the drivers may include a display driver to control and allow access to a display device, a touchscreen driver to control and allow access to a touchscreen interface of the platform 2300, sensor drivers to obtain sensor readings of sensor circuitry 2321 and control and allow access to sensor circuitry 2321, actuator drivers to obtain actuator positions of the actuators 2322 and/or control and allow access to the actuators 2322, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the platform 2300 (not shown).

The components may communicate over the IX 2306. The IX 2306 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, Open-CAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (UP) system, a FlexRay system, and/or any number of other IX technologies. The IX 2306 may be a proprietary bus, for example, used in a SoC based system.

The interconnect 2306 couples the processor circuitry 2302 to the communication circuitry 2309 for communications with other devices. The communication circuitry 2309 is a hardware element, or collection of hardware elements, used to communicate over one or more networks (e.g., cloud 2301) and/or with other devices (e.g., mesh devices/fog 2364). The communication circuitry 2309 includes baseband circuitry 2310 (or "modem 2310") and RF circuitry 2311 and 2312.

The baseband circuitry 2310 includes one or more processing devices (e.g., baseband processors) to carry out various protocol and radio control functions. Baseband circuitry 2310 may interface with application circuitry of platform 2300 (e.g., a combination of processor circuitry 2302, memory circuitry 2304, and/or storage circuitry 2308) for generation and processing of baseband signals and for controlling operations of the RF circuitry 2311 or 2312. The baseband circuitry 2310 may handle various radio control functions that enable communication with one or more radio networks via the RF circuitry 2311 or 2312. The baseband circuitry 2310 may include circuitry such as, but not limited to, one or more single-core or multi-core processors (e.g., one or more baseband processors) or control logic to process baseband signals received from a receive signal path of the RF circuitry 2311 and/or 2312, and to generate baseband signals to be provided to the RF circuitry 2311 or 2312 via a transmit signal path. In various embodiments, the baseband circuitry 2310 may implement an RTOS to manage resources of the baseband circuitry 2310, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 23, in one embodiment, the baseband circuitry 2310 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the communication circuitry 2309 is a cellular radiofrequency communication system, such as millimeter wave (mmWave) communication circuitry or some other suitable cellular communication circuitry. In the first example, the protocol processing circuitry 2302 would operate MAC, RLC, PDCP, SDAP, RRC, and NAS functions. In a second example, the protocol processing circuitry may operate one or more IEEE-based protocols when the communication circuitry 2309 is WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 2310 and/or RF circuitry 2311 and 2312. The baseband circuitry 2310 may also support radio communications for more than one wireless protocol.

Continuing with the aforementioned embodiment, the baseband circuitry 2310 includes individual processing device(s) to implement PHY including HARQ functions, scrambling and/or descrambling, (en)coding and/or decoding, layer mapping and/or demapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 2309 also includes RF circuitry 2311 and 2312 to enable communication with wireless networks using modulated electromagnetic radiation through a non-solid medium. Each of the RF circuitry 2311 and 2312 include a receive signal path, which may include circuitry to convert analog RF signals (e.g., an existing or received modulated waveform) into digital baseband signals to be provided to the baseband circuitry 2310. Each of the RF circuitry 2311 and 2312 also include a transmit signal path, which may include circuitry configured to convert digital baseband signals provided by the baseband circuitry 2310 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 2311 or 2312 using metal transmission lines or the like.

The RF circuitry 2311 (also referred to as a "mesh transceiver") is used for communications with other mesh or fog devices 2364. The mesh transceiver 2311 may use any number of frequencies and protocols, such as 2.4 GHz transmissions under the IEEE 802.15.4 standard, using the Bluetooth® low energy (BLE) standard, as defined by the Bluetooth® Special Interest Group, or the ZigBee® standard, among others. Any number of RF circuitry 2311, configured for a particular wireless communication protocol, may be used for the connections to the mesh devices 2364. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 2311 may communicate using multiple standards or radios for communications at different ranges. For example, the platform 2300 may communicate with close/proximate devices, e.g., within about 10 meters, using a local transceiver based on BLE, or another low power radio, to save power. More distant mesh devices 2364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 2312 (also referred to as a "wireless network transceiver," a "cloud transceiver," or the like) may be included to communicate with devices or services in the cloud 2301 via local or wide area network protocols. The wireless network transceiver 2312 includes one or more radios to communicate with devices in the cloud 2301. The cloud 2301 may be the same or similar to cloud 144 discussed previously. The wireless network transceiver 2312 may be a LPWA transceiver that follows the IEEE 802.15.4, or IEEE 802.15.4g standards, among others, such as those discussed herein. The platform 2300 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 1002.15.4e specification may be used.

Any number of other radio communications and protocols may be used in addition to the systems mentioned for the mesh transceiver 2311 and wireless network transceiver 2312, as described herein. For example, the radio transceivers 2311 and 2312 may include an LTE or other cellular transceiver that uses spread spectrum (SPA/SAS) communications for implementing high-speed communications. Further, any number of other protocols may be used, such as WiFi® networks for medium speed communications and provision of network communications.

The transceivers 2311 and 2312 may include radios that are compatible with, and/or may operate according to any one or more of the following radio communication technologies and/or standards including but not limited to those discussed herein.

Network interface circuitry/controller (NIC) 2316 may be included to provide wired communication to the cloud 2301 or to other devices, such as the mesh devices 2364 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 2300 via NIC 2316 using a physical or wired connection, such as electrical (e.g., a "copper interconnect"), optical (e.g., fiber optics, and/or any other type of conductive or transmissive physical communication medium. The physical connection also includes suitable input connectors (e.g., ports, receptacles, sockets, etc.) and output connectors (e.g., plugs, pins, etc.). The NIC 2316 may include one or more dedicated processors and/or FPGAs to communicate using one or more of the aforementioned network interface protocols. In some implementations, the NIC 2316 may include multiple controllers to provide connectivity to other networks using the same or different protocols. For example, the platform 2300 may include a first NIC 2316 providing communications to the cloud over Ethernet and a second NIC 2316 providing communications to other devices over another type of network.

The interconnect 2306 may couple the processor circuitry 2302 to an external interface 2318 (also referred to as "I/O interface circuitry" or the like) that is used to connect external devices or subsystems. The external devices include, inter alia, sensor circuitry 2321, actuators 2322, and positioning circuitry 2345.

The sensor circuitry 2321 may include devices, modules, or subsystems whose purpose is to detect events or changes in its environment and send the information (sensor data) about the detected events to some other a device, module, subsystem, etc. Examples of such sensors 2321 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 2318 connects the platform 2300 to actuators 2322, allow platform 2300 to change its state, position, and/or orientation, or move or control a mechanism or system. The actuators 2322 comprise electrical and/or mechanical devices for moving or controlling a mechanism or system, and converts energy (e.g., electric current or moving air and/or liquid) into some kind of motion. The actuators 2322 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2322 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 2300 may be configured to operate one or more actuators 2322 based on one or more captured events and/or instructions or control signals received from a service provider and/or various client systems.

The positioning circuitry 2345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2345 may include a Micro-Technology for Positioning, Navigation, and Timing (Micro-PNT) IC that uses a master timing clock to perform position tracking/estimation without GNSS assistance. The positioning circuitry 2345 may also be part of, or interact with, the communication circuitry 2309 to communicate with the nodes and components of the positioning network. The positioning circuitry 2345 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS).

In some implementations, the positioning circuitry 2345 is, or includes an INS, which is a system or device that uses sensor circuitry 2321 (e.g., motion sensors such as accelerometers, rotation sensors such as gyroscopes, and altimeters, magentic sensors, and/or the like to continuously calculate (e.g., using dead by dead reckoning, triangulation, or the like) a position, orientation, and/or velocity (including direction and speed of movement) of the platform 2300 without the need for external references.

In some examples, various I/O devices may be present within, or connected to, the platform 2300, which are referred to as input device circuitry 2386 and output device circuitry 2384 in FIG. 23. The input device circuitry 2386 and output device circuitry 2384 include one or more user interfaces designed to enable user interaction with the platform 2300 and/or peripheral component interfaces designed to enable peripheral component interaction with the platform 2300. Input device circuitry 2386 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 2384 may be included to show information or otherwise convey information, such as sensor readings, actuator position(s), or other like information. Data and/or graphics may be displayed on one or more user interface components of the output device circuitry 2384. Output device circuitry 2384 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2300. The output device circuitry 2384 may also include speakers or other audio emitting devices, printer(s), and/or the like. In some embodiments, the sensor circuitry 2321 may be used as the input device circuitry 2386 (e.g., an image capture device, motion capture device, or the like) and one or more actuators 2322 may be used as the output device circuitry 2384 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

A battery 2324 may be coupled to the platform 2300 to power the platform 2300, which may be used in embodiments where the platform 2300 is not in a fixed location. The battery 2324 may be a lithium ion battery, a lead-acid automotive battery, or a metal-air battery, such as a zinc-air battery, an aluminum-air battery, a lithium-air battery, a lithium polymer battery, and/or the like. In embodiments where the platform 2300 is mounted in a fixed location, the platform 2300 may have a power supply coupled to an electrical grid. In these embodiments, the platform 2300 may include power tee circuitry to provide for electrical power drawn from a network cable to provide both power supply and data connectivity to the platform 2300 using a single cable.

PMIC 2326 may be included in the platform 2300 to track the state of charge (SoCh) of the battery 2324, and to control charging of the platform 2300. The PMIC 2326 may be used to monitor other parameters of the battery 2324 to provide failure predictions, such as the state of health (SoH) and the state of function (SoF) of the battery 2324. The PMIC 2326 may include voltage regulators, surge protectors, power alarm detection circuitry. The power alarm detection circuitry may detect one or more of brown out (under-voltage) and surge (over-voltage) conditions. The PMIC 2326 may communicate the information on the battery 2324 to the processor circuitry 2302 over the interconnect 2306. The PMIC 2326 may also include an analog-to-digital (ADC) convertor that allows the processor circuitry 2302 to directly monitor the voltage of the battery 2324 or the current flow from the battery 2324. The battery parameters may be used to determine actions that the platform 2300 may perform, such as transmission frequency, mesh network operation, sensing frequency, and the like. As an example, the PMIC 2326 may be a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX A power block 2328, or other power supply coupled to a grid, may be coupled with the PMIC 2326 to charge the battery 2324. In some examples, the power block 2328 may be replaced with a wireless power receiver to obtain the power wirelessly, for example, through a loop antenna in the platform 2300. A wireless battery charging circuit, such as an LTC4020 chip from Linear Technologies of Milpitas, California, among others, may be included in the PMIC 2326. The specific charging circuits chosen depend on the size of the battery 2324, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

EXAMPLES

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

Example 1 includes a computing device, comprising: memory circuitry to store a plurality of container images, wherein the plurality of container images comprises: a first container image comprising a first set of applications, wherein the first set of applications is to be executed on a host operating system; and a second container image comprising a virtual machine, a guest operating system, and a second set of applications, wherein the guest operating system is to be executed on the virtual machine and the second set of applications is to be executed on the guest operating system; and processing circuitry to: instantiate a plurality of containers on the host operating system, wherein the plurality of containers correspond to the plurality of container images, and wherein the plurality of containers comprises a first container corresponding to the first container image and a second container corresponding to the second container image; execute the first set of applications in the first container, wherein the first set of applications is to be executed on the host operating system; and execute the virtual machine in the second container, wherein the guest operating system is to be executed on the virtual machine and the second set of applications is to be executed on the guest operating system.

Example 2 includes the computing device of Example 1, wherein the processing circuitry to execute the virtual machine in the second container is further to: detect a set of hardware characteristics on the computing device; and dynamically configure the virtual machine based on the set of hardware characteristics detected on the computing device.

Example 3 includes the computing device of Example 2, wherein the processing circuitry to execute the virtual machine in the second container is further to: identify a set of hardware requirements for the virtual machine; and determine that the set of hardware characteristics detected on the computing device satisfy the set of hardware requirements for the virtual machine.

Example 4 includes the computing device of Example 3, wherein the set of hardware characteristics detected on the computing device comprises a central processing unit (CPU) type, a number of available CPU cores, and a memory capacity.

Example 5 includes the computing device of Example 1, wherein the memory circuitry comprises persistent memory circuitry, and wherein the persistent memory circuitry is to persistently store an operating system image for the host operating system in an immutable state.

Example 6 includes the computing device of Example 5, wherein the persistent memory circuitry is further to persistently store an initial RAM disk of the host operating system in the immutable state.

Example 7 includes the computing device of Example 1, wherein the processing circuitry is further to perform, upon boot of the computing device, an integrity verification on: a system BIOS of the computing device; an operating system image of the host operating system; and the plurality of container images.

Example 8 includes the computing device of Example 1, wherein the processing circuitry is further to instantiate, upon boot of the host operating system, a container runtime environment to bootstrap user space on the host operating system.

Examples 9 includes the computing device of Example 1, wherein the processing circuitry is further to configure, via a software-defined silicon interface, one or more hardware configuration controls of the computing device with a per-container scope.

Example 10 includes at least one non-transitory machine-readable storage medium having instructions stored thereon, wherein the instructions, when executed on processing circuitry of a computing device, cause the processing circuitry to: retrieve, from memory circuitry, a plurality of container images, wherein the plurality of container images comprises: a first container image comprising a first set of applications, wherein the first set of applications is to be executed on a host operating system; and a second container image comprising a virtual machine, a guest operating system, and a second set of applications, wherein the guest operating system is to be executed on the virtual machine and the second set of applications is to be executed on the guest operating system; instantiate a plurality of containers on the host operating system, wherein the plurality of containers correspond to the plurality of container images, and wherein the plurality of containers comprises a first container corresponding to the first container image and a second container corresponding to the second container image; execute the first set of applications in the first container, wherein the first set of applications is to be executed on the host operating system; and execute the virtual machine in the second container, wherein the guest operating system is to be executed on the virtual machine and the second set of applications is to be executed on the guest operating system.

Example 11 includes the storage medium of Example 10, wherein the instructions that cause the processing circuitry to execute the virtual machine in the second container further cause the processing circuitry to: detect a set of hardware characteristics on the computing device; and dynamically configure the virtual machine based on the set of hardware characteristics detected on the computing device.

Example 12 includes the storage medium of Example 11, wherein the instructions that cause the processing circuitry to execute the virtual machine in the second container further cause the processing circuitry to: identify a set of hardware requirements for the virtual machine; and determine that the set of hardware characteristics detected on the computing device satisfy the set of hardware requirements for the virtual machine.

Example 13 includes the storage medium of Example 12, wherein the set of hardware characteristics detected on the computing device comprises a central processing unit (CPU) type, a number of available CPU cores, and a memory capacity.

Example 14 includes the storage medium of Example 10, wherein the memory circuitry comprises persistent memory circuitry, and wherein the persistent memory circuitry is to persistently store an operating system image for the host operating system in an immutable state.

Example 15 includes the storage medium of Example 14, wherein the persistent memory circuitry is further to persistently store an initial RAM disk of the host operating system in the immutable state.

Example 16 includes the storage medium of Example 10, wherein the instructions further cause the processing circuitry to perform, upon boot of the computing device, an integrity verification on: a system BIOS of the computing device; an operating system image of the host operating system; and the plurality of container images.

Example 17 includes the storage medium of Example 10, wherein the instructions further cause the processing circuitry to instantiate, upon boot of the host operating system, a container runtime environment to bootstrap user space on the host operating system.

Example 18 includes the storage medium of Example 10, wherein the instructions further cause the processing circuitry to configure, via a software-defined silicon interface, one or more hardware configuration controls of the computing device with a per-container scope.

Example 19 includes a system, comprising: means for storing a plurality of container images, wherein the plurality of container images comprises: a first container image comprising a first set of applications, wherein the first set of applications is to be executed on a host operating system; and a second container image comprising a virtual machine, a guest operating system, and a second set of applications, wherein the guest operating system is to be executed on the virtual machine and the second set of applications is to be executed on the guest operating system; means for instantiating a plurality of containers on the host operating system, wherein the plurality of containers correspond to the plurality of container images, and wherein the plurality of containers comprises a first container corresponding to the first container image and a second container corresponding to the second container image; means for executing the first set of applications in the first container, wherein the first set of applications is to be executed on the host operating system; and means for executing the virtual machine in the second container, wherein the guest operating system is to be executed on the virtual machine and the second set of applications is to be executed on the guest operating system.

Example 20 includes a method, comprising: retrieving, from memory circuitry of a computing device, a plurality of container images, wherein the plurality of container images comprises: a first container image comprising a first set of applications, wherein the first set of applications is to be executed on a host operating system; and a second container image comprising a virtual machine, a guest operating system, and a second set of applications, wherein the guest operating system is to be executed on the virtual machine and the second set of applications is to be executed on the guest operating system; instantiating a plurality of containers on the host operating system, wherein the plurality of containers correspond to the plurality of container images, and wherein the plurality of containers comprises a first container corresponding to the first container image and a second container corresponding to the second container image; executing the first set of applications in the first container, wherein the first set of applications is to be executed on the host operating system; and executing the virtual machine in the second container, wherein the guest operating system is to be executed on the virtual machine and the second set of applications is to be executed on the guest operating system.

Example 21 includes the method of Example 20, wherein executing the virtual machine in the second container comprises: detecting a set of hardware characteristics on the computing device; and dynamically configuring the virtual machine based on the set of hardware characteristics detected on the computing device.

Example 22 includes the method of Example 21, wherein executing the virtual machine in the second container comprises: identifying a set of hardware requirements for the virtual machine; and determining that the set of hardware characteristics detected on the computing device satisfy the set of hardware requirements for the virtual machine.

Example 23 includes the method of Example 22, wherein the set of hardware characteristics detected on the computing device comprises a central processing unit (CPU) type, a number of available CPU cores, and a memory capacity.

Example 24 includes the method of Example 20, further comprising performing, upon boot of the computing device, an integrity verification on: a system BIOS of the computing device; an operating system image of the host operating system; and the plurality of container images.

Example 25 includes the method of Example 20, wherein the instructions further cause the processing circuitry to instantiate, upon boot of the host operating system, a container runtime environment to bootstrap user space on the host operating system.

Example 26 includes the method of Example 20, further comprising configuring, via a software-defined silicon interface, one or more hardware configuration controls of the computing device with a per-container scope.

Example 27 includes an edge computing system, comprising a plurality of edge computing nodes, the plurality of edge computing nodes configured to perform any of the methods of Examples 20-26.

Example 28 includes an edge computing node, operable in an edge computing system, comprising processing circuitry configured to implement any of the methods of Examples 20-26.

Example 29 includes an edge computing node, operable as a server in an edge computing system, configured to perform any of the methods of Examples 20-26.

Example 30 includes an edge computing node, operable as a client in an edge computing system, configured to perform any of the methods of Examples 20-26.

Example 31 includes an edge computing node, operable in a layer of an edge computing network as an aggregation node, network hub node, gateway node, or core data processing node, configured to perform any of the methods of Examples 20-26.

Example 32 includes an edge computing network, comprising networking and processing components configured to provide or operate a communications network, to enable an edge computing system to implement any of the methods of Examples 20-26.

Example 33 includes an access point, comprising networking and processing components configured to provide or operate a communications network, to enable an edge computing system to implement any of the methods of Examples 20-26.

Example 34 includes a base station, comprising networking and processing components configured to provide or operate a communications network, to enable an edge computing system to implement any of the methods of Examples 20-26.

Example 35 includes a road-side unit, comprising networking components configured to provide or operate a communications network, to enable an edge computing system to implement any of the methods of Examples 20-26.

Example 36 includes an on-premise server, operable in a private communications network distinct from a public edge computing network, the server configured to enable an edge computing system to implement any of the methods of Examples 20-26.

Example 37 includes a 3GPP 4G/LTE mobile wireless communications system, comprising networking and processing components configured to enable an edge computing system to implement any of the methods of Examples 20-26.

Example 38 includes a 5G network mobile wireless communications system, comprising networking and processing components configured to enable an edge computing system to implement any of the methods of Examples 20-26.

Example 39 includes a user equipment device, comprising networking and processing circuitry, configured to connect with an edge computing system configured to implement any of the methods of Examples 20-26.

Example 40 includes a client computing device, comprising processing circuitry, configured to coordinate compute operations with an edge computing system, the edge computing system configured to implement any of the methods of Examples 20-26.

Example 41 includes an edge provisioning node, operable in an edge computing system, configured to implement any of the methods of Examples 20-26.

Example 42 includes a service orchestration node, operable in an edge computing system, configured to implement any of the methods of Examples 20-26.

Example 43 includes an application orchestration node, operable in an edge computing system, configured to implement any of the methods of Examples 20-26.

Example 44 includes a multi-tenant management node, operable in an edge computing system, configured to implement any of the methods of Examples 20-26.

Example 45 includes an edge computing system comprising processing circuitry, the edge computing system configured to operate one or more functions and services to implement any of the methods of Examples 20-26.

Example 46 includes networking hardware with network functions implemented thereupon, operable within an edge computing system, the network functions configured to implement any of the methods of Examples 20-26.

Example 47 includes acceleration hardware with acceleration functions implemented thereupon, operable in an edge computing system, the acceleration functions configured to implement any of the methods of Examples 20-26.

Example 48 includes storage hardware with storage capabilities implemented thereupon, operable in an edge computing system, the storage hardware configured to implement any of the methods of Examples 20-26.

Example 49 includes computation hardware with compute capabilities implemented thereupon, operable in an edge computing system, the computation hardware configured to implement any of the methods of Examples 20-26.

Example 50 includes an edge computing system adapted for supporting vehicle-to-vehicle (V2V), vehicle-to-everything (V2X), or vehicle-to-infrastructure (V2I) scenarios, configured to implement any of the methods of Examples 20-26.

Example 51 includes an edge computing system adapted for operating according to one or more European Telecommunications Standards Institute (ETSI) Multi-Access Edge Computing (MEC) specifications, the edge computing system configured to implement any of the methods of Examples 20-26.

Example 52 includes an edge computing system adapted for operating one or more multi-access edge computing (MEC) components, the MEC components provided from one or more of: a MEC proxy, a MEC application orchestrator, a MEC application, a MEC platform, or a MEC service, according to an European Telecommunications Standards Institute (ETSI) Multi-Access Edge Computing (MEC) configuration, the MEC components configured to implement any of the methods of Examples 20-26.

Example 53 includes an edge computing system, comprising circuitry configured to implement one or more isolation environments provided among dedicated hardware, virtual machines, containers, virtual machines on containers, configured to implement any of the methods of Examples 20-26.

Example 54 includes an edge computing server, configured for operation as an enterprise server, roadside server, street cabinet server, or telecommunications server, configured to implement any of the methods of Examples 20-26.

Example 55 includes an edge computing system configured to implement any of the methods of Examples 20-26 with use cases provided from one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 56 includes an edge computing system, comprising computing nodes operated by multiple owners at different geographic locations, configured to implement any of the methods of Examples 20-26.

Example 57 includes a cloud computing system, comprising data servers operating respective cloud services, the respective cloud services configured to coordinate with an edge computing system to implement any of the methods of Examples 20-26.

Example 58 includes a server, comprising hardware to operate cloudlet, edgelet, or applet services, the services configured to coordinate with an edge computing system to implement any of the methods of Examples 20-26.

Example 59 includes an edge node in an edge computing system, comprising one or more devices with at least one processor and memory to implement any of the methods of Examples 20-26.

Example 60 includes an edge node in an edge computing system, the edge node operating one or more services provided from among: a management console service, a telemetry service, a provisioning service, an application or service orchestration service, a virtual machine service, a container service, a function deployment service, or a compute deployment service, or an acceleration management service, the one or more services configured to implement any of the methods of Examples 20-26.

Example 61 includes a set of distributed edge nodes, distributed among a network layer of an edge computing system, the network layer comprising a close edge, local edge, enterprise edge, on-premise edge, near edge, middle edge, or far edge network layer, configured to implement any of the methods of Examples 20-26.

Example 62 includes an apparatus of an edge computing system comprising: one or more processors and one or more computer-readable media comprising instructions that, when executed by the one or more processors, cause the one or more processors to perform any of the methods of Examples 20-26.

Example 63 includes one or more computer-readable storage media comprising instructions to cause an electronic device of an edge computing system, upon execution of the instructions by one or more processors of the electronic device, to perform any of the methods of Examples 20-26.

Example 64 includes a communication signal communicated in an edge computing system, to perform any of the methods of Examples 20-26.

Example 65 includes a data structure communicated in an edge computing system, the data structure comprising a datagram, packet, frame, segment, protocol data unit (PDU), or message, to perform any of the methods of Examples 20-26.

Example 66 includes a signal communicated in an edge computing system, the signal encoded with a datagram, packet, frame, segment, protocol data unit (PDU), message, or data to perform any of the methods of Examples 20-26.

Example 67 includes an electromagnetic signal communicated in an edge computing system, the electromagnetic signal carrying computer-readable instructions, wherein execution of the computer-readable instructions by one or more processors causes the one or more processors to perform any of the methods of Examples 20-26.

Example 68 includes a computer program used in an edge computing system, the computer program comprising instructions, wherein execution of the program by a processing element in the edge computing system is to cause the processing element to perform any of the methods of Examples 20-26.

Example 69 includes an apparatus of an edge computing system comprising means to perform any of the methods of Examples 20-26.

Example 70 includes an apparatus of an edge computing system comprising logic, modules, or circuitry to perform any of the methods of Examples 20-26.

APPENDIX A

EXAMPLE BASE DOCKERFILE FOR CONTAINERIZED VIRTUAL MACHINE

```
FROM alpine:3.8
MAINTAINER <NAME OF MAINTAINER>
RUN apk update && apk add --no-cache \
  bash \
  qemu-img \
  qemu-system-arm \
  qemu-system-x86_64 \
  qemu-system-i386 \
  qemu-ui-gtk \
  qemu-modules \
  xf86-video-intel \
  xf86-video-qxl \
  mesa-egl \
  mesa-gl \
  mesa-dri-virtio \
  mesa-dri-intel
ADD bootstrapVm.sh /bin/
ADD qemu-ifup /etc/
ADD qemu-ifdown /etc/
```

APPENDIX A-continued

EXAMPLE BASE DOCKERFILE FOR CONTAINERIZED VIRTUAL MACHINE

```
ADD bridge.conf /etc/qemu/
ENV NAME vm0
ENV RAM 1024
ENV SMP 1,sockets=1,cores=1,threads=1
ENV CPU qemu64
ENV KEYBOARD ""
ENV MOUSE ""
ENV DISK_DEVICE ide
ENV IMAGE /data/volumes/vm.img
ENV IMAGE_FORMAT qcow2
ENV IMAGE_SIZE 10G
ENV IMAGE_CACHE none
ENV IMAGE_DISCARD unmap
ENV IMAGE_CREATE 0
ENV ISO_DOWNLOAD 0
ENV NETWORK user
ENV NETWORK_BRIDGE br0
ENV NETWORK_DEVICE e1000
ENV GTK ""
ENV VIDEO none
ENV VNC tcp
ENV VNC_IP ""
ENV VNC_ID 0
ENV VNC_PORT 5900
ENV VNC_SOCK /var/run/kvmvideo/vnc.sock
ENV SPICE tcp
ENV SPICE_IP 127.0.0.1
ENV SPICE_PORT 5900
ENV SPICE_SOCK /var/run/kvmvideo/spice.sock
ENV SPICE_OPTIONS ""
ENV CUSTOM_VIDEO ""
ENV TCP_PORTS ""
ENV UDP_PORTS ""
ENV ADD_FLAGS ""
ENTRYPOINT ["/bin/bootstrapVm.shl"]
```

APPENDIX B

EXAMPLE CHILD DOCKERFILE FOR CONTAINERIZED VIRTUAL MACHINE

```
FROM kvm:1.0.5
ADD disk.img /data/volumes/vm.img
ENV NAME win7
ENV RAM 4096
ENV SMP 4,sockets=1,cores=4,threads=1
ENV CPU max
ENV MOUSE none
ENV DISK_DEVICE ide
ENV IMAGE /data/volumes/vm.img
ENV IMAGE_FORMAT qcow2
ENV IMAGE_CACHE none
ENV IMAGE_DISCARD unmap
ENV IMAGE_CREATE 0
ENV ISO_DOWNLOAD 0
ENV NETWORK bridge
ENV NETWORK_BRIDGE br0
ENV NETWORK_DEVICE e1000
ENV GTK ""
ENV VIDEO spice
ENV VNC tcp
ENV VNC_IP ""
ENV VNC_ID 0
ENV VNC_PORT 5901
ENV VNC_SOCK /var/run/kvmvideo/vnc.sock
ENV SPICE sock
ENV SPICE_IP 0.0.0.0
ENV SPICE_PORT 5901
ENV SPICE_SOCK /var/run/kvmvideo/win7.sock
ENV SPICE_OPTIONS ""
ENV CUSTOM_VIDEO ""
ENV TCP_PORTS ""
ENV UDP_PORTS ""
ENV ADD_FLAGS ""
```

APPENDIX B-continued

EXAMPLE CHILD DOCKERFILE FOR
CONTAINERIZED VIRTUAL MACHINE

ENV RESOLUTION 1920x1080
ENTRYPOINT ["/bin/bootstrapVm.sh"]

What is claimed is:

1. A computing device, comprising:
memory circuitry to store a plurality of container images, wherein the plurality of container images comprises:
a first container image comprising a first set of applications, wherein the first set of applications is to be executed on a host operating system; and
a second container image comprising a virtual machine, a guest operating system, and a second set of applications, wherein the guest operating system is to be executed on the virtual machine and the second set of applications is to be executed on the guest operating system; and
processing circuitry to:
instantiate a plurality of containers on the host operating system, wherein the plurality of containers correspond to the plurality of container images, and wherein the plurality of containers comprises a first container corresponding to the first container image and a second container corresponding to the second container image;
execute the first set of applications in the first container, wherein the first set of applications is to be executed on the host operating system; and
execute the virtual machine in the second container, wherein the guest operating system is to be executed on the virtual machine and the second set of applications is to be executed on the guest operating system.

2. The computing device of claim 1, wherein the processing circuitry to execute the virtual machine in the second container is further to:
detect a set of hardware characteristics on the computing device; and
dynamically configure the virtual machine based on the set of hardware characteristics detected on the computing device.

3. The computing device of claim 2, wherein the processing circuitry to execute the virtual machine in the second container is further to:
identify a set of hardware requirements for the virtual machine; and
determine that the set of hardware characteristics detected on the computing device satisfy the set of hardware requirements for the virtual machine.

4. The computing device of claim 3, wherein the set of hardware characteristics detected on the computing device comprises a central processing unit (CPU) type, a number of available CPU cores, and a memory capacity.

5. The computing device of claim 1, wherein the memory circuitry comprises persistent memory circuitry, and wherein the persistent memory circuitry is to persistently store an operating system image for the host operating system in an immutable state.

6. The computing device of claim 5, wherein the persistent memory circuitry is further to persistently store an initial RAM disk of the host operating system in the immutable state.

7. The computing device of claim 1, wherein the processing circuitry is further to perform, upon boot of the computing device, an integrity verification on:
a system BIOS of the computing device;
an operating system image of the host operating system; and
the plurality of container images.

8. The computing device of claim 1, wherein the processing circuitry is further to instantiate, upon boot of the host operating system, a container runtime environment to bootstrap user space on the host operating system.

9. The computing device of claim 1, wherein the processing circuitry is further to configure, via a software-defined silicon interface, one or more hardware configuration controls of the computing device with a per-container scope.

10. At least one non-transitory machine-readable storage medium having instructions stored thereon, wherein the instructions, when executed on processing circuitry of a computing device, cause the processing circuitry to:
retrieve, from memory circuitry, a plurality of container images, wherein the plurality of container images comprises:
a first container image comprising a first set of applications, wherein the first set of applications is to be executed on a host operating system; and
a second container image comprising a virtual machine, a guest operating system, and a second set of applications, wherein the guest operating system is to be executed on the virtual machine and the second set of applications is to be executed on the guest operating system;
instantiate a plurality of containers on the host operating system, wherein the plurality of containers correspond to the plurality of container images, and wherein the plurality of containers comprises a first container corresponding to the first container image and a second container corresponding to the second container image;
execute the first set of applications in the first container, wherein the first set of applications is to be executed on the host operating system; and
execute the virtual machine in the second container, wherein the guest operating system is to be executed on the virtual machine and the second set of applications is to be executed on the guest operating system.

11. The storage medium of claim 10, wherein the instructions that cause the processing circuitry to execute the virtual machine in the second container further cause the processing circuitry to:
detect a set of hardware characteristics on the computing device; and
dynamically configure the virtual machine based on the set of hardware characteristics detected on the computing device.

12. The storage medium of claim 11, wherein the instructions that cause the processing circuitry to execute the virtual machine in the second container further cause the processing circuitry to:
identify a set of hardware requirements for the virtual machine; and
determine that the set of hardware characteristics detected on the computing device satisfy the set of hardware requirements for the virtual machine.

13. The storage medium of claim 12, wherein the set of hardware characteristics detected on the computing device comprises a central processing unit (CPU) type, a number of available CPU cores, and a memory capacity.

14. The storage medium of claim 10, wherein the memory circuitry comprises persistent memory circuitry, and wherein the persistent memory circuitry is to persistently store an operating system image for the host operating system in an immutable state.

15. The storage medium of claim 14, wherein the persistent memory circuitry is further to persistently store an initial RAM disk of the host operating system in the immutable state.

16. The storage medium of claim 10, wherein the instructions further cause the processing circuitry to perform, upon boot of the computing device, an integrity verification on:
    a system BIOS of the computing device;
    an operating system image of the host operating system; and
    the plurality of container images.

17. The storage medium of claim 10, wherein the instructions further cause the processing circuitry to instantiate, upon boot of the host operating system, a container runtime environment to bootstrap user space on the host operating system.

18. The storage medium of claim 10, wherein the instructions further cause the processing circuitry to configure, via a software-defined silicon interface, one or more hardware configuration controls of the computing device with a per-container scope.

19. A method, comprising:
    retrieving, from memory circuitry of a computing device, a plurality of container images, wherein the plurality of container images comprises:
        a first container image comprising a first set of applications, wherein the first set of applications is to be executed on a host operating system; and
        a second container image comprising a virtual machine, a guest operating system, and a second set of applications, wherein the guest operating system is to be executed on the virtual machine and the second set of applications is to be executed on the guest operating system;
    instantiating a plurality of containers on the host operating system, wherein the plurality of containers correspond to the plurality of container images, and wherein the plurality of containers comprises a first container corresponding to the first container image and a second container corresponding to the second container image;
    executing the first set of applications in the first container, wherein the first set of applications is to be executed on the host operating system; and
    executing the virtual machine in the second container, wherein the guest operating system is to be executed on the virtual machine and the second set of applications is to be executed on the guest operating system.

20. The method of claim 19, wherein executing the virtual machine in the second container comprises:
    detecting a set of hardware characteristics on the computing device; and
    dynamically configuring the virtual machine based on the set of hardware characteristics detected on the computing device.

21. The method of claim 20, wherein executing the virtual machine in the second container comprises:
    identifying a set of hardware requirements for the virtual machine; and
    determining that the set of hardware characteristics detected on the computing device satisfy the set of hardware requirements for the virtual machine.

22. The method of claim 21, wherein the set of hardware characteristics detected on the computing device comprises a central processing unit (CPU) type, a number of available CPU cores, and a memory capacity.

23. The method of claim 19, further comprising performing, upon boot of the computing device, an integrity verification on:
    a system BIOS of the computing device;
    an operating system image of the host operating system; and
    the plurality of container images.

24. The method of claim 19, further comprising instantiating, upon boot of the host operating system, a container runtime environment to bootstrap user space on the host operating system.

25. The method of claim 19, further comprising configuring, via a software-defined silicon interface, one or more hardware configuration controls of the computing device with a per-container scope.

* * * * *